(12) United States Patent
Ishizuya et al.

(10) Patent No.: US 7,177,065 B2
(45) Date of Patent: Feb. 13, 2007

(54) OPTICAL ELEMENT, THIN FILM STRUCTURE, OPTICAL SWITCH, AND METHOD OF MANUFACTURING OPTICAL ELEMENT

(75) Inventors: Tohru Ishizuya, Tokyo (JP); Junji Suzuki, Hachioji (JP); Yoshihiko Suzuki, Funabashi (JP)

(73) Assignee: Nikon Corporation, Tokyo (JP)

( * ) Notice: Subject to any disclaimer, the term of this patent is extended or adjusted under 35 U.S.C. 154(b) by 29 days.

(21) Appl. No.: 10/676,733

(22) Filed: Oct. 2, 2003

(65) Prior Publication Data
US 2004/0125432 A1    Jul. 1, 2004

Related U.S. Application Data

(63) Continuation-in-part of application No. PCT/JP02/13292, filed on Dec. 19, 2002.

(30) Foreign Application Priority Data

| Jan. 9, 2002 | (JP) | ............................. 2002-002729 |
| Oct. 3, 2002 | (JP) | ............................. 2002-291400 |
| Oct. 16, 2002 | (JP) | ............................. 2002-301878 |

(51) Int. Cl.
*G02B 26/08* (2006.01)

(52) U.S. Cl. ...................... 359/291; 359/295; 359/298; 359/224

(58) Field of Classification Search ........ 359/290–292, 359/295, 298, 223, 224
See application file for complete search history.

(56) References Cited

U.S. PATENT DOCUMENTS

| 5,867,297 | A | * | 2/1999 | Kiang et al. ................. 359/198 |
| 5,870,007 | A | * | 2/1999 | Carr et al. ................... 333/262 |
| 5,903,380 | A | * | 5/1999 | Motamedi et al. .......... 359/224 |
| 5,945,898 | A | | 8/1999 | Judy et al. .................... 335/78 |

(Continued)

FOREIGN PATENT DOCUMENTS

EP        1004910 A2    5/2000

(Continued)

OTHER PUBLICATIONS

K. S. J. Pister et al., "Microfabricated Hinges", Sensors and Actuators A, vol. 33 1992, pp. 249-256.

(Continued)

*Primary Examiner*—Evelyn A. Lester
(74) *Attorney, Agent, or Firm*—Morgan, Lewis & Bockius, LLP

(57) ABSTRACT

An optical element which includes a reflection portion capable of reflecting a light beam in a desired direction is provided. The optical element comprises a substrate 21, a light reflection portion 101, and a support portion 102 which supports the light reflection portion 101 over the substrate 21. Each of the light reflection portion 101 and the support portion 102 is constructed of at least one film. The support portion 102 has one end 102c fixed to the substrate 21 and has the other end 102d joined with the film constructing the light reflection portion 101, and it bends from one end 102c toward the other end 102d, thereby to support the principal plane of the film constructing the light reflection portion 101, non-parallelly, for example, perpendicularly to the principal plane of the substrate 21.

46 Claims, 60 Drawing Sheets

SECTIONAL VIEW TAKEN ALONG A - A

U.S. PATENT DOCUMENTS

| | | | |
|---|---|---|---|
| 6,137,623 A * | 10/2000 | Roberson et al. | 359/291 |
| 6,153,839 A * | 11/2000 | Zavracky et al. | 200/181 |
| 6,195,478 B1 | 2/2001 | Fouquet | |
| 6,220,561 B1 * | 4/2001 | Garcia | 248/487 |
| 6,236,491 B1 * | 5/2001 | Goodwin-Johansson | 359/291 |
| 6,275,325 B1 * | 8/2001 | Sinclair | 359/291 |
| 6,292,600 B1 * | 9/2001 | Goldstein et al. | 385/18 |
| 6,299,462 B1 * | 10/2001 | Biegelsen | 439/81 |
| 6,366,414 B1 | 4/2002 | Aksyuk et al. | 359/822 |
| 6,445,488 B1 * | 9/2002 | Lee | 359/291 |
| 6,456,420 B1 * | 9/2002 | Goodwin-Johansson | 359/291 |
| 6,532,093 B2 | 3/2003 | Sun et al. | |
| 6,538,796 B1 * | 3/2003 | Swanson | 359/291 |
| 6,556,318 B1 * | 4/2003 | Goldstein et al. | 398/9 |
| 6,608,714 B2 * | 8/2003 | Hanson et al. | 359/296 |
| 6,654,155 B2 * | 11/2003 | Rosa et al. | 359/290 |
| 6,728,017 B2 * | 4/2004 | Park | 359/224 |
| 6,831,391 B2 * | 12/2004 | Miller et al. | 310/309 |
| 6,931,171 B2 * | 8/2005 | Yoon et al. | 359/291 |
| 2004/0114259 A1 * | 6/2004 | Ishizuya et al. | 359/849 |
| 2004/0246558 A1 * | 12/2004 | Yoon et al. | 359/291 |

FOREIGN PATENT DOCUMENTS

| | | |
|---|---|---|
| EP | 1103835 | 5/2001 |
| EP | 1120677 | 8/2001 |
| JP | 2001-42233 | 2/2001 |
| JP | 2001-142008 | 5/2001 |
| JP | 2001-264651 | 9/2001 |
| JP | 2001-350106 | 12/2001 |
| JP | 2002-23073 | 1/2002 |
| WO | WO 03/060592 A1 | 7/2003 |

OTHER PUBLICATIONS

Miller et al., "Micromachined Electromagnetic Scanning Mirrors" Optical Engineering Soc. of Photo-Optical Instrumentation Engineers. Bellingham, US, vol. 36, No. 5, May 1977, pp. 1399-1407.

* cited by examiner

SECTIONAL VIEW TAKEN ALONG A - A

VIEW SEEN IN DIRECTION OF ARROW D

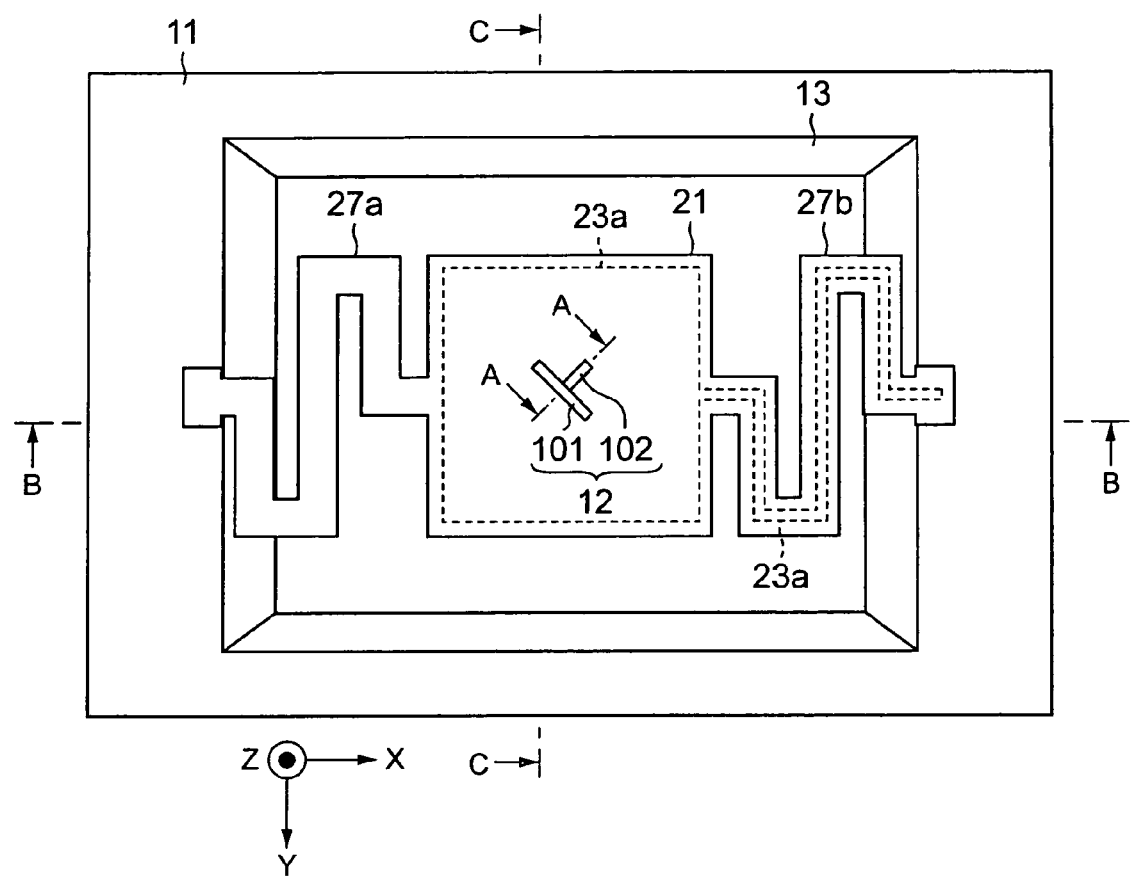

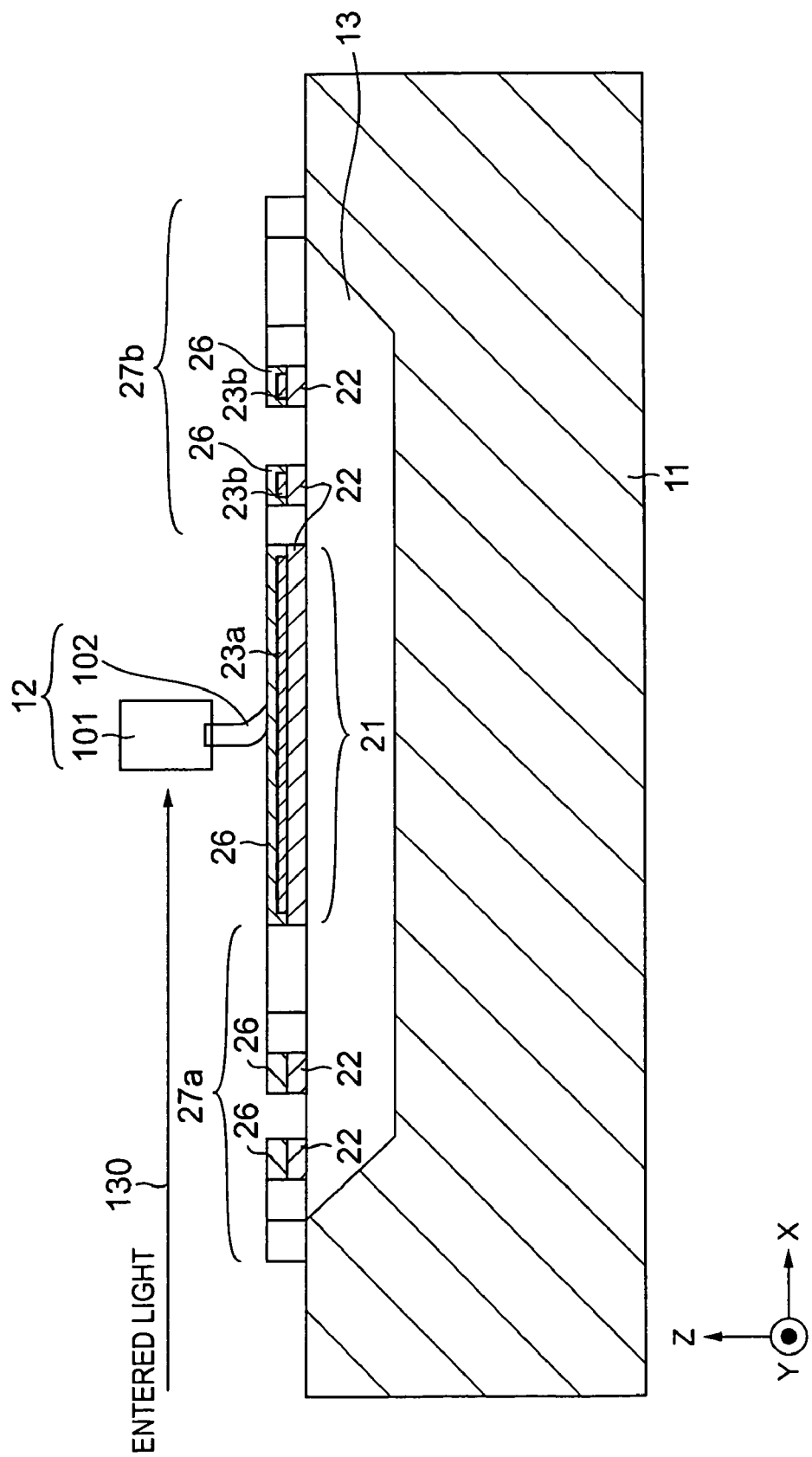

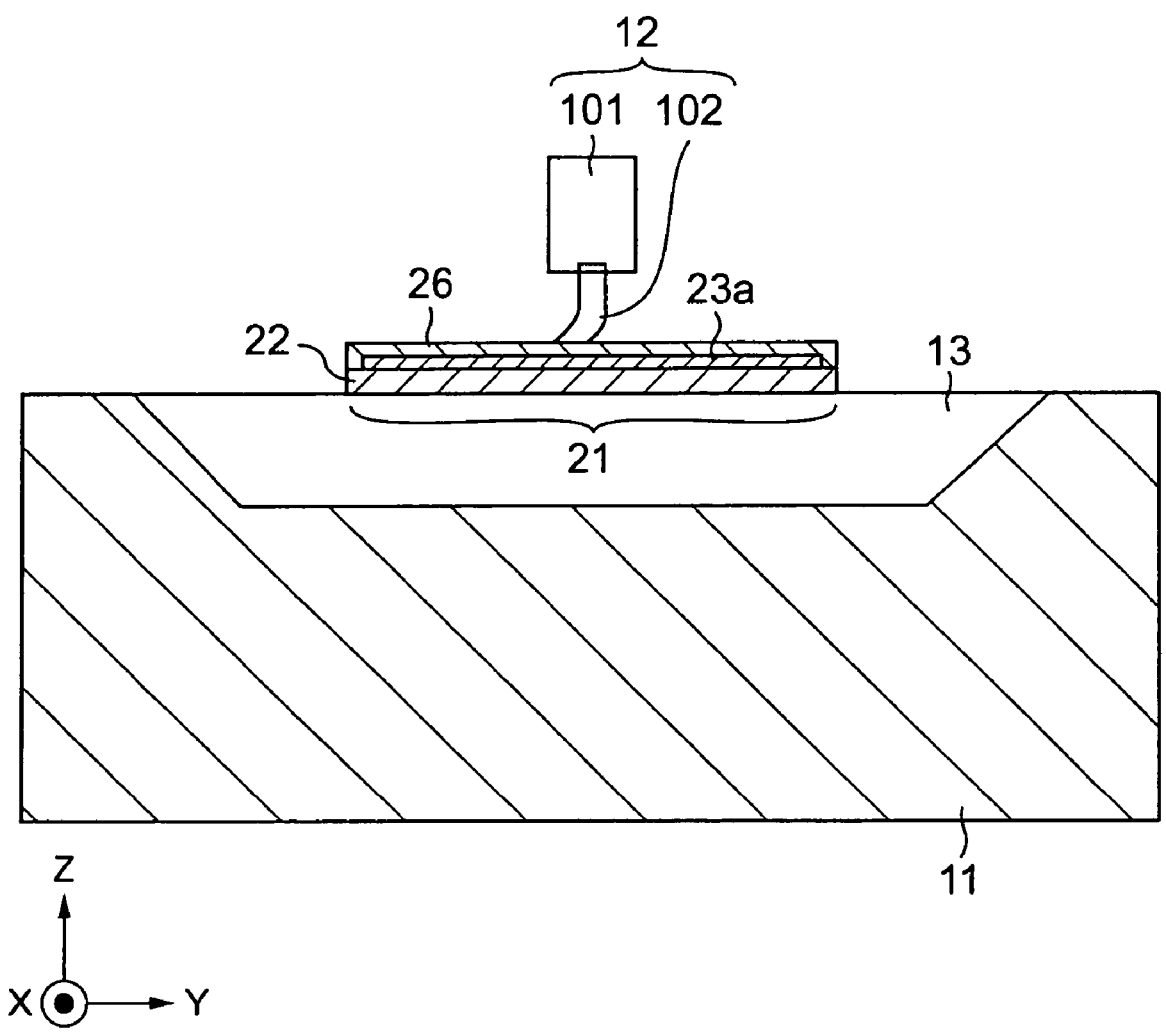

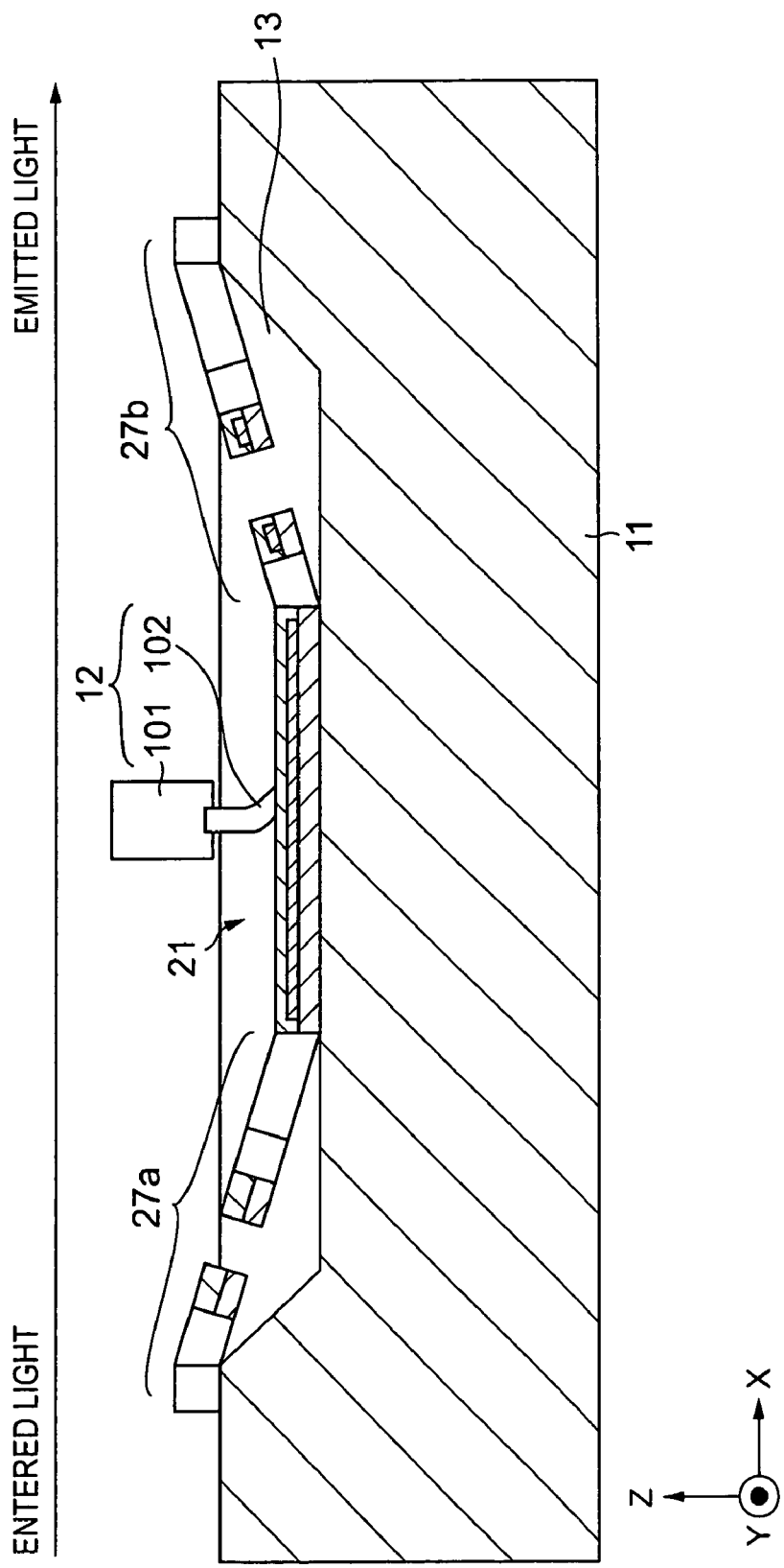

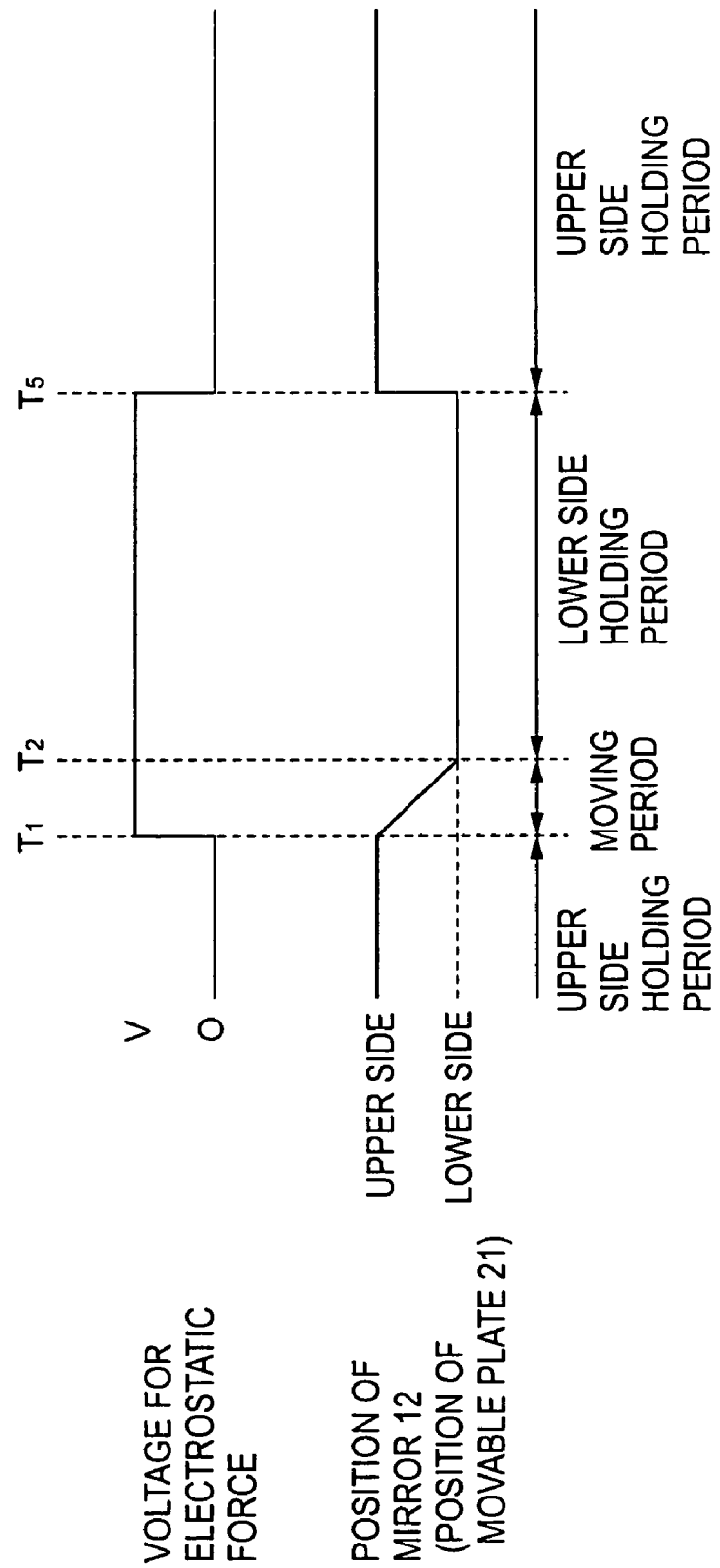

VIEW SEEN IN DIRECTION OF ARROW E

SECTIONAL VIEW TAKEN ALONG F - F

VIEW SEEN IN DIRECTION OF ARROW G

FIG.20A  SECTIONAL VIEW TAKEN ALONG H - H
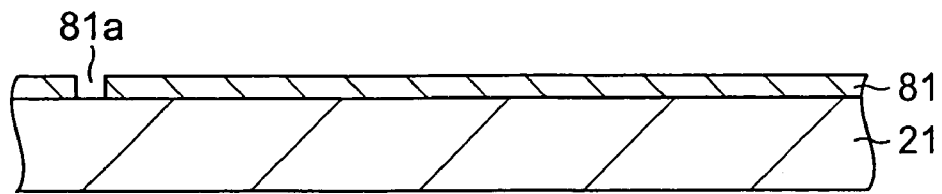
FIG.20B
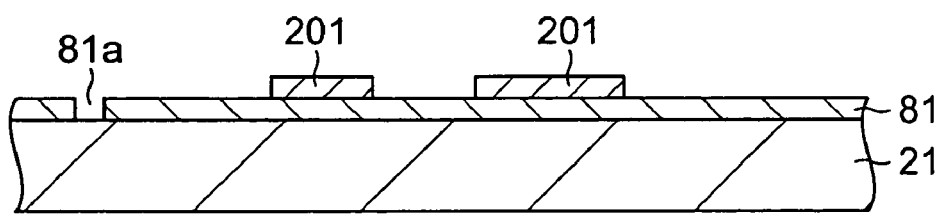
FIG.20C
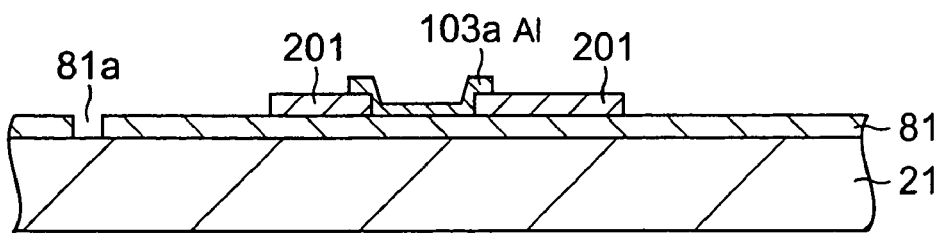

FIG. 21A SECTIONAL VIEW TAKEN ALONG H - H
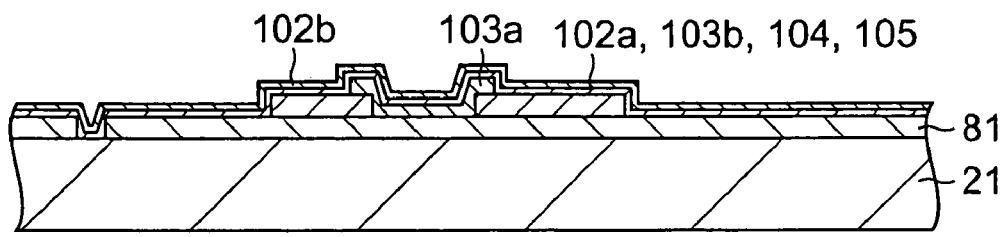
FIG. 21B
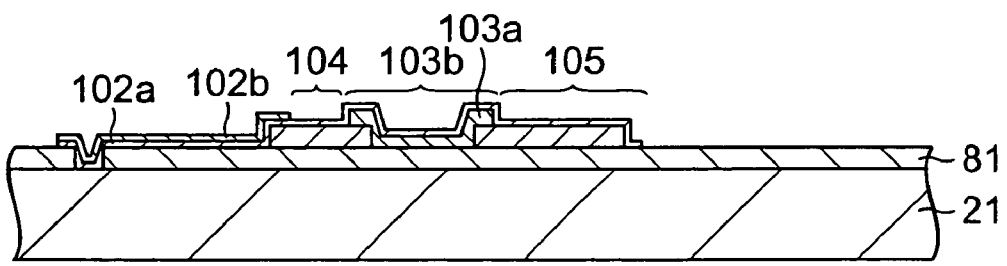
FIG. 21C
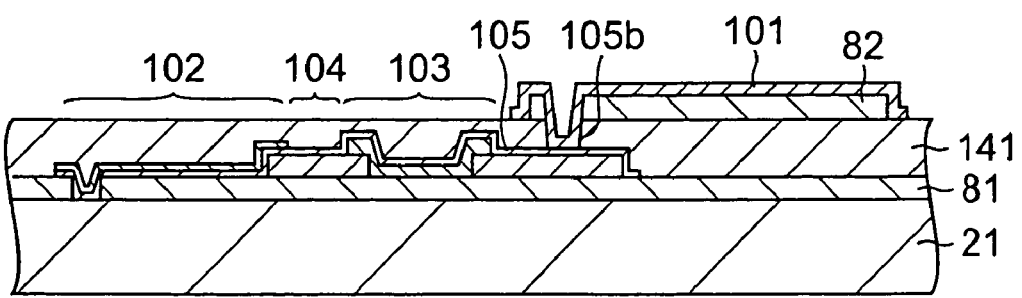

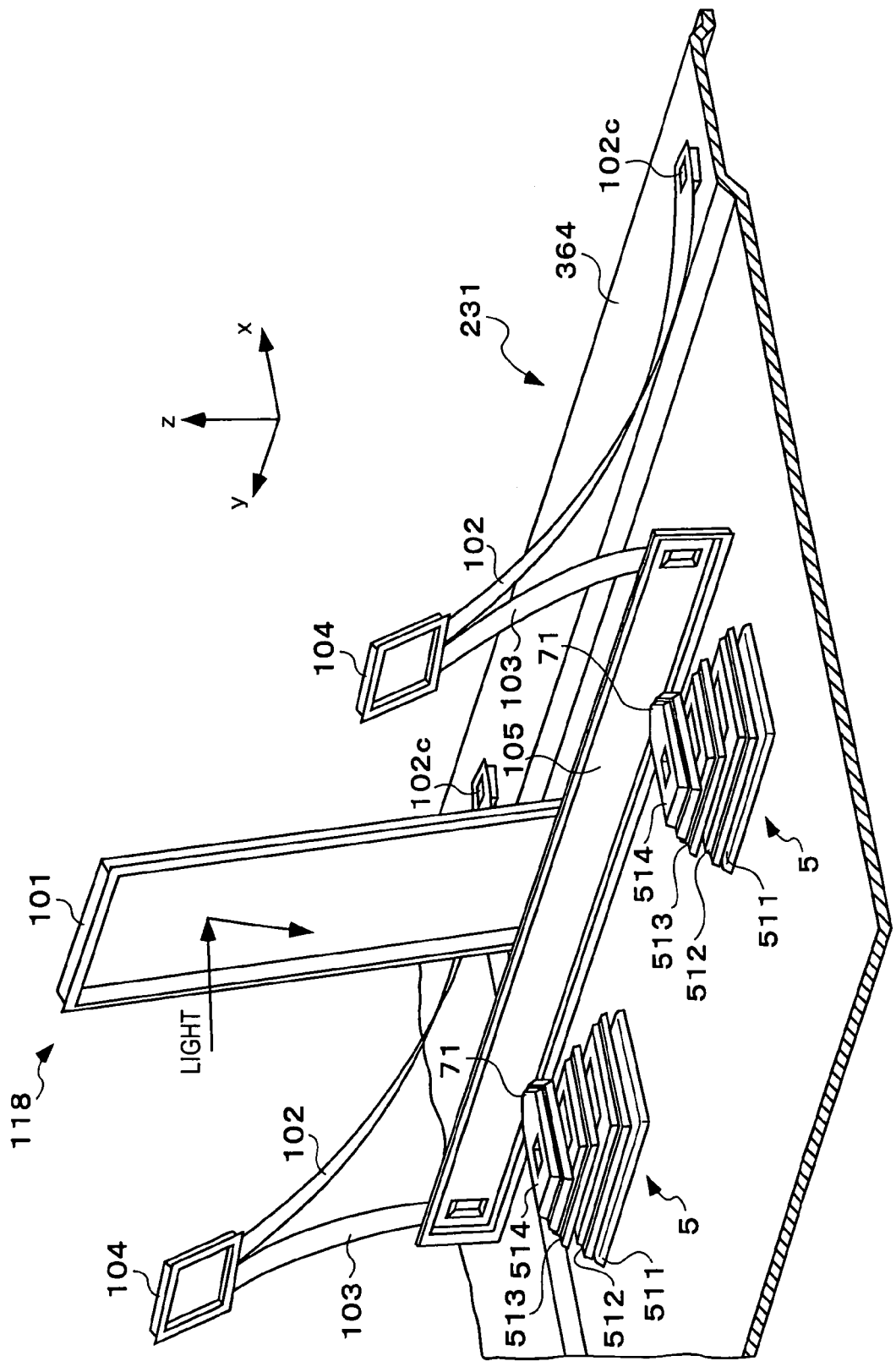

FIG.27A
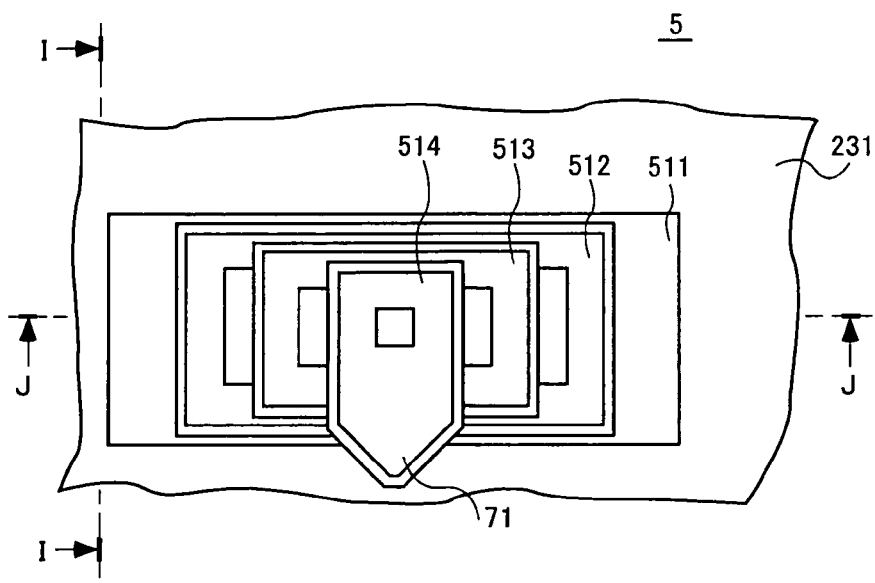
FIG.27B SECTIONAL VIEW TAKEN ALONG I - I
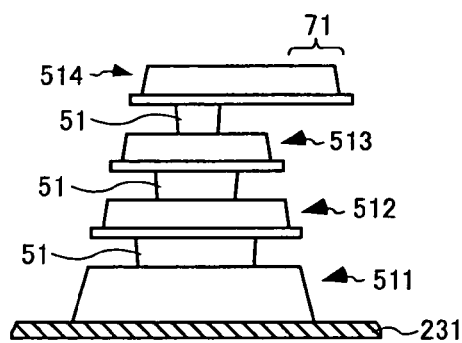
FIG.27C SECTIONAL VIEW TAKEN ALONG J - J
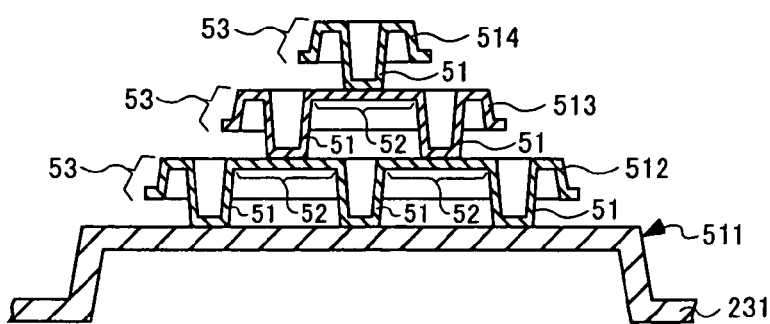

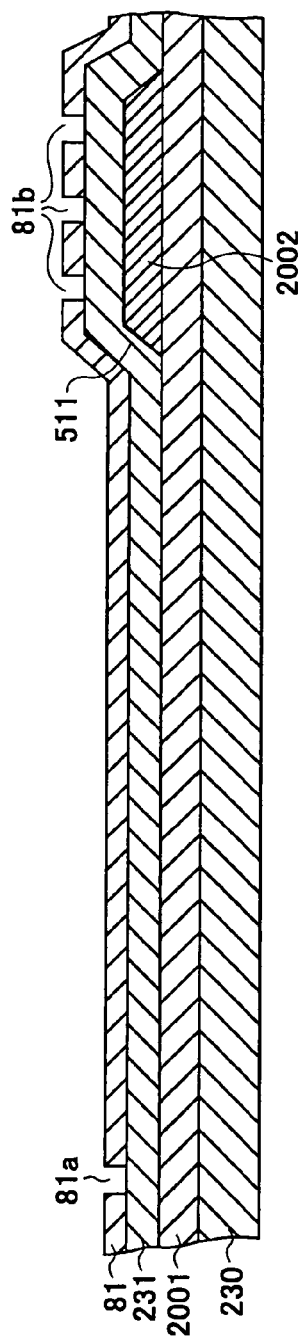
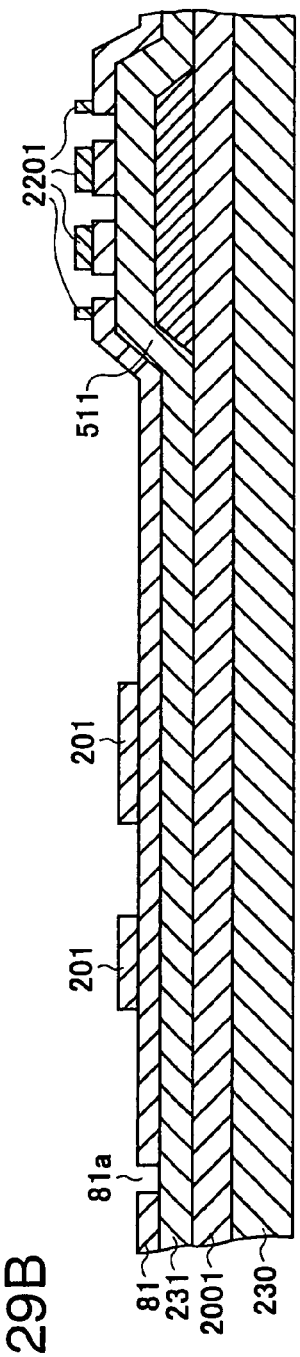
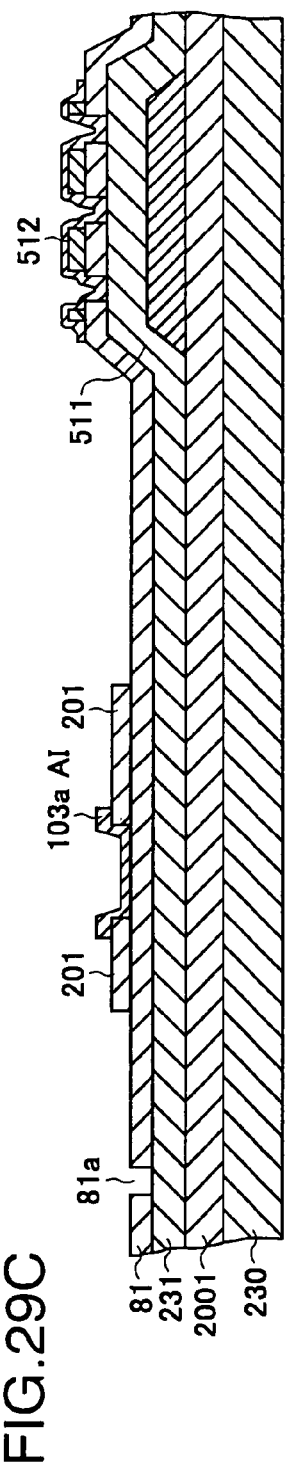
FIG.29A SECTIONAL VIEW TAKEN ALONG K-K
FIG.29B
FIG.29C

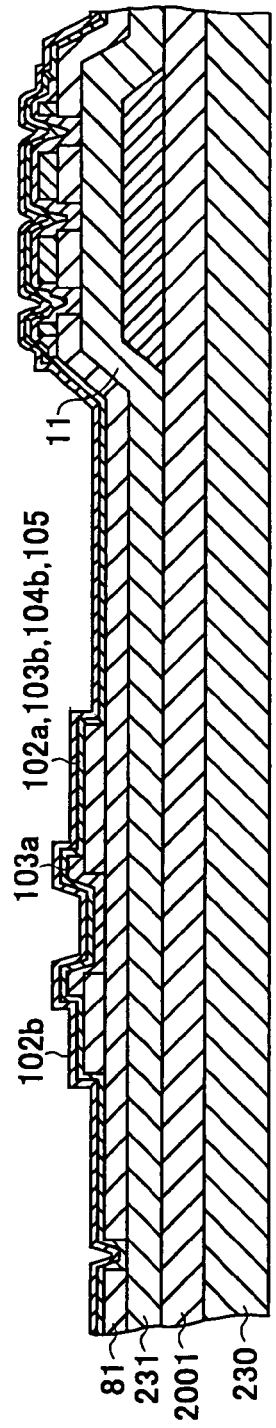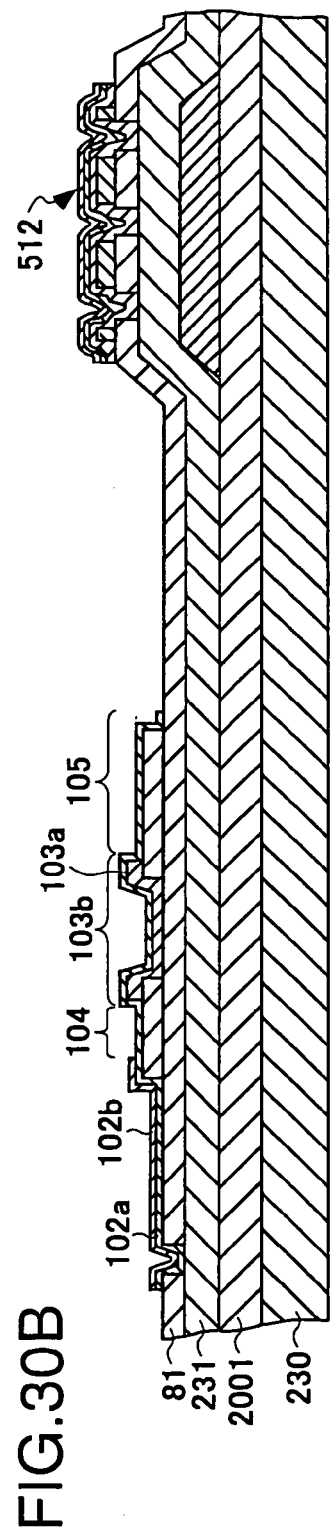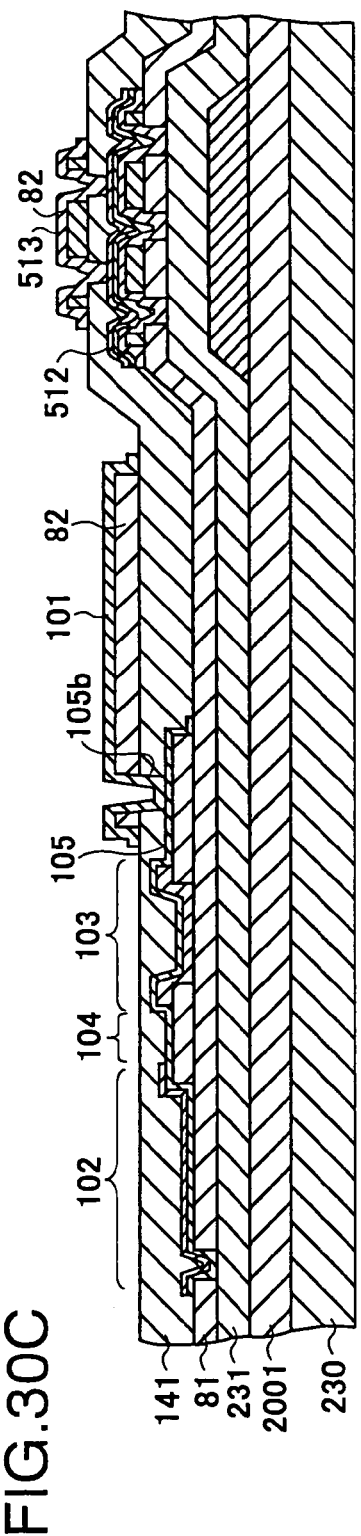
FIG.30A SECTIONAL VIEW TAKEN ALONG K-K
FIG.30B
FIG.30C

VIEW SEEN IN DIRECTION OF ARROW L

SECTIONAL VIEW TAKEN ALONG M - M

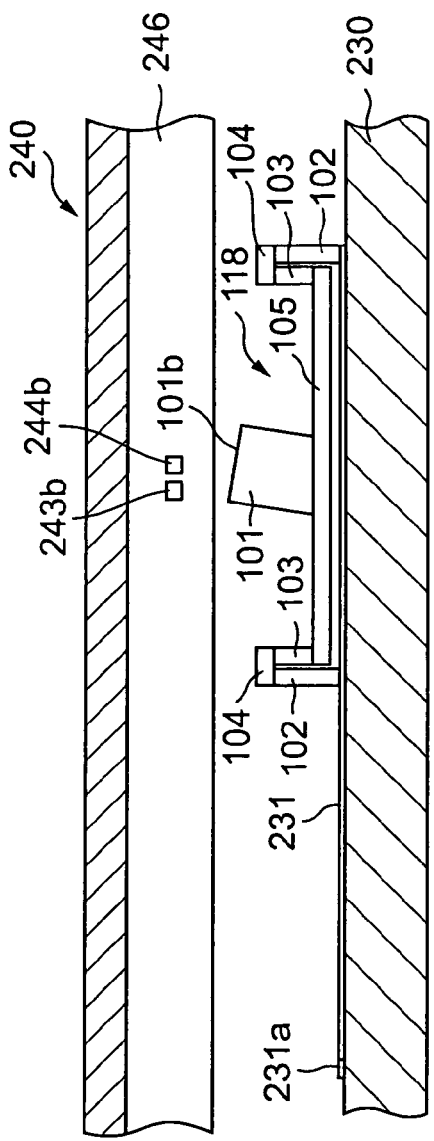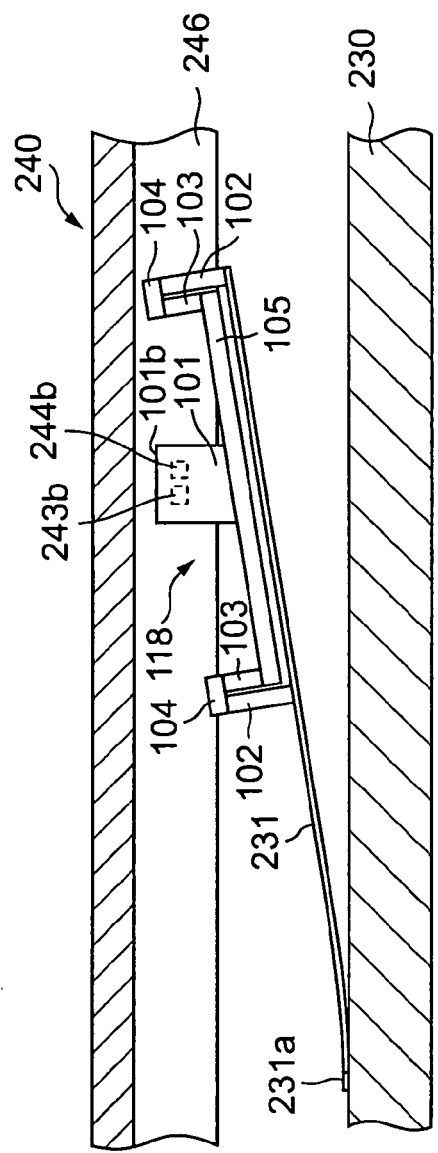
FIG.41A
FIG.41B

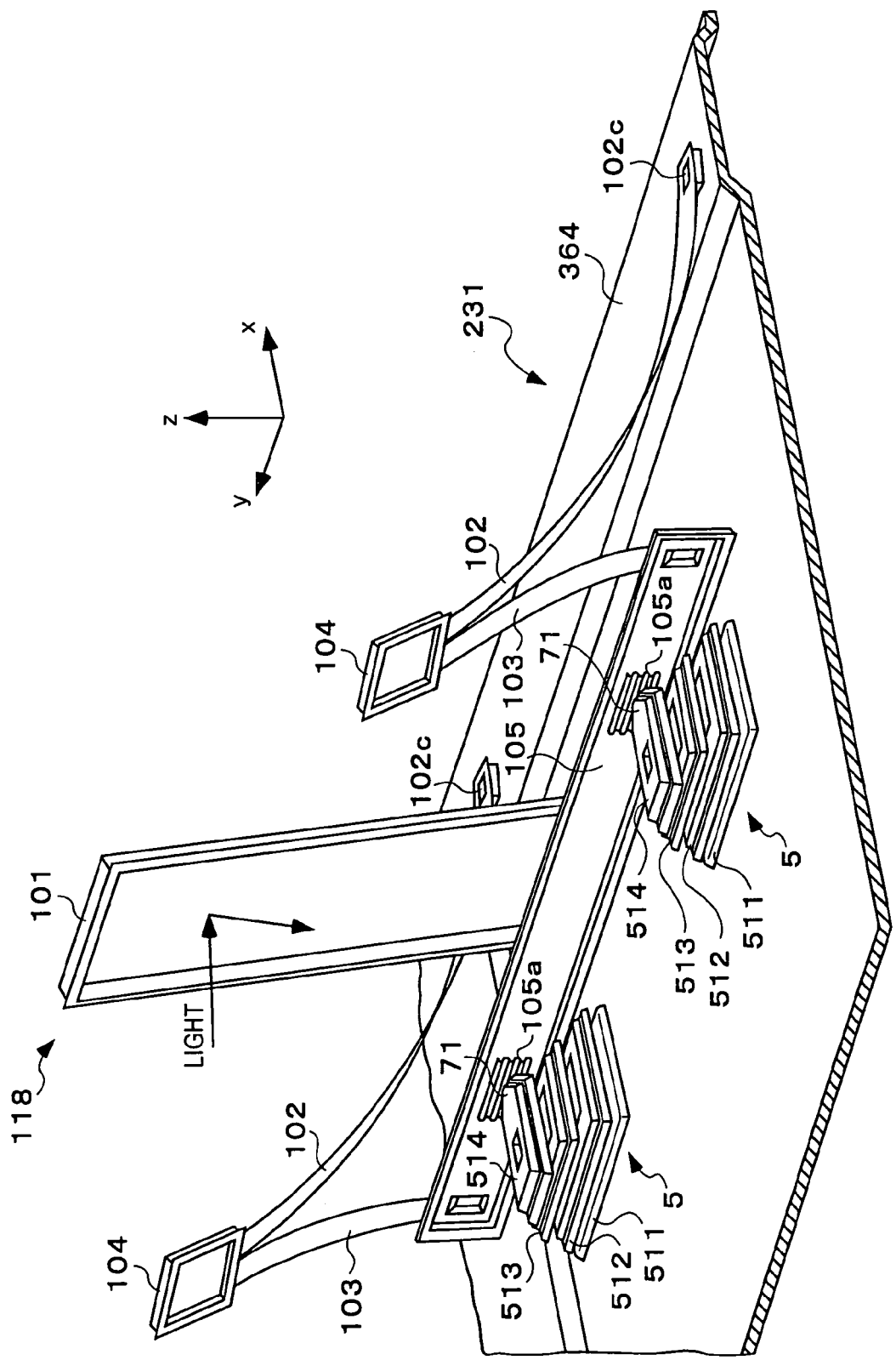

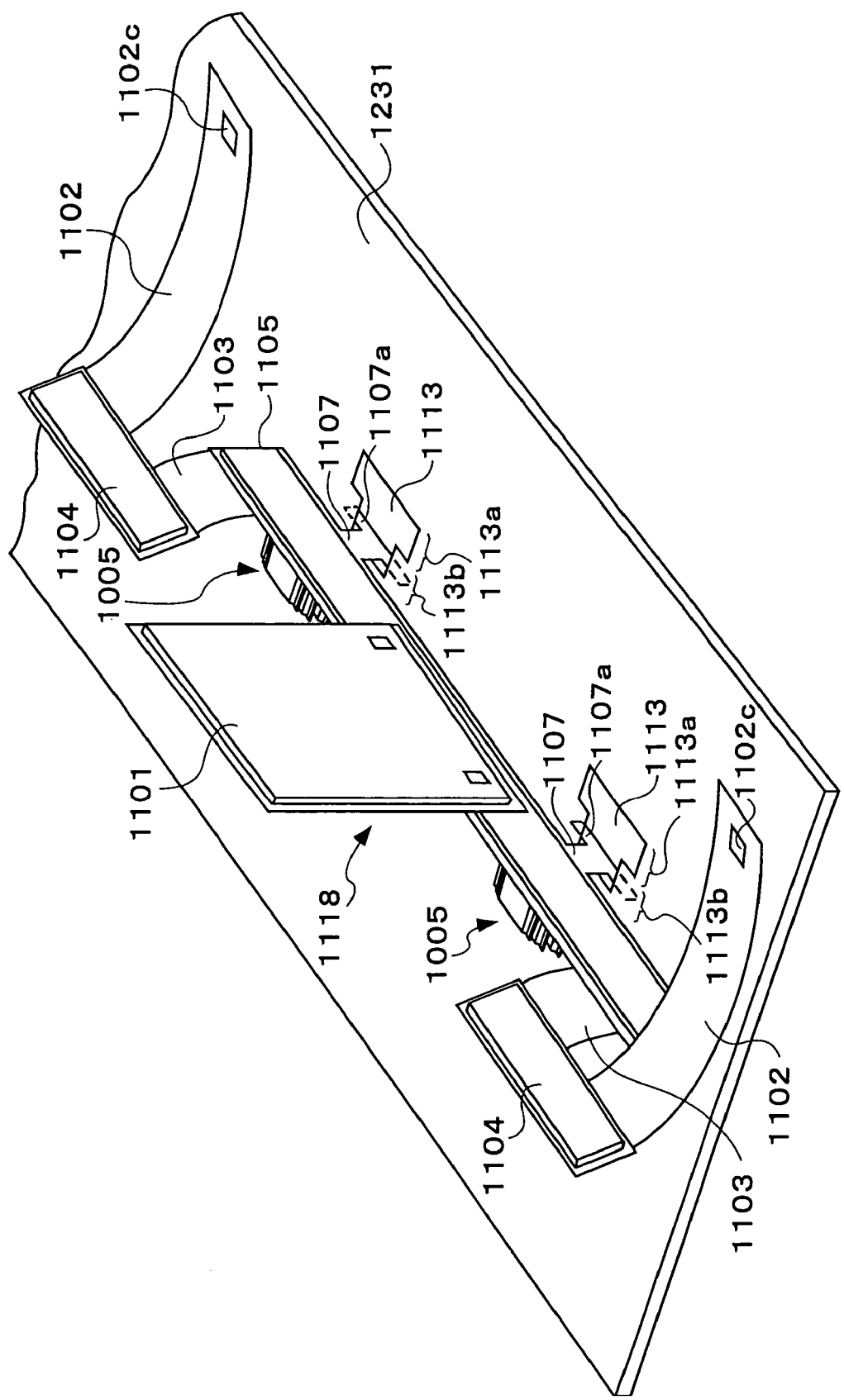

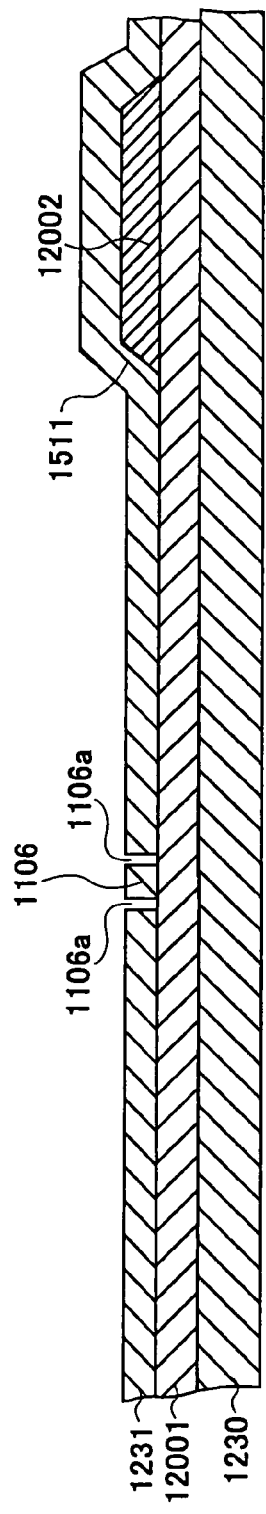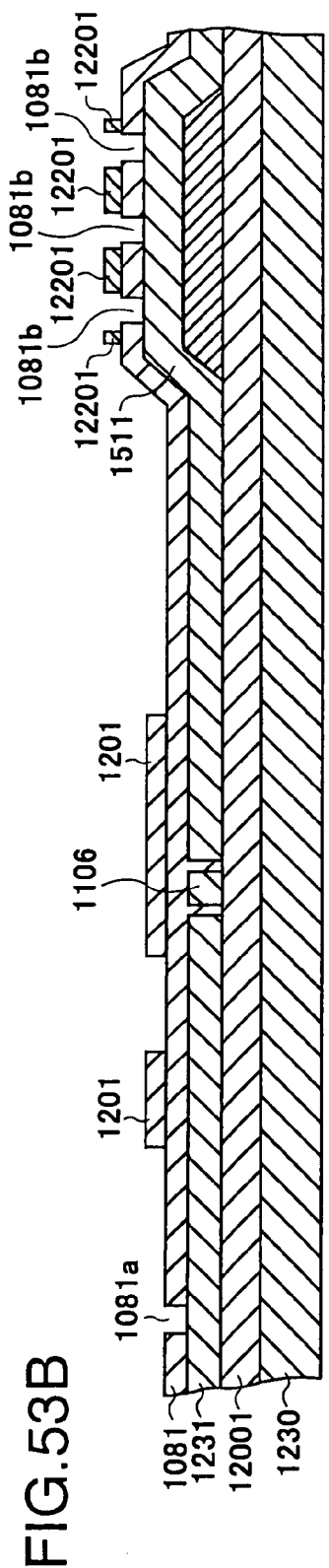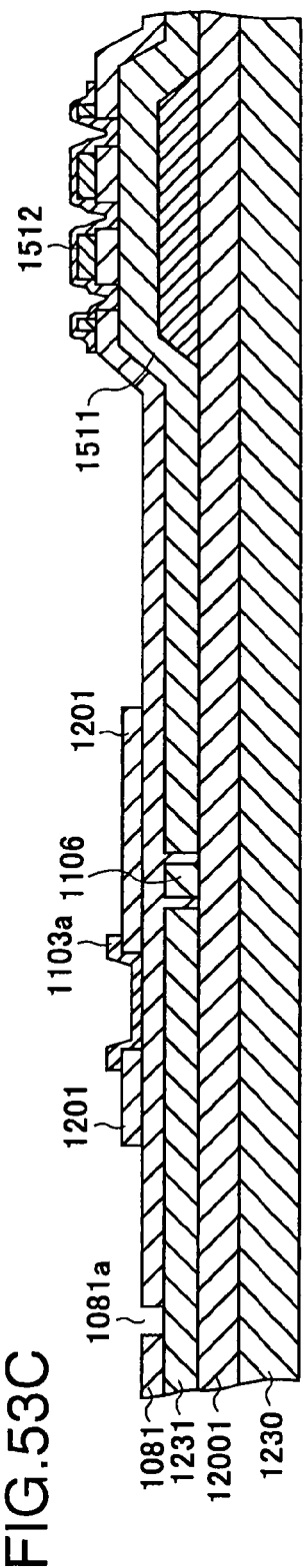

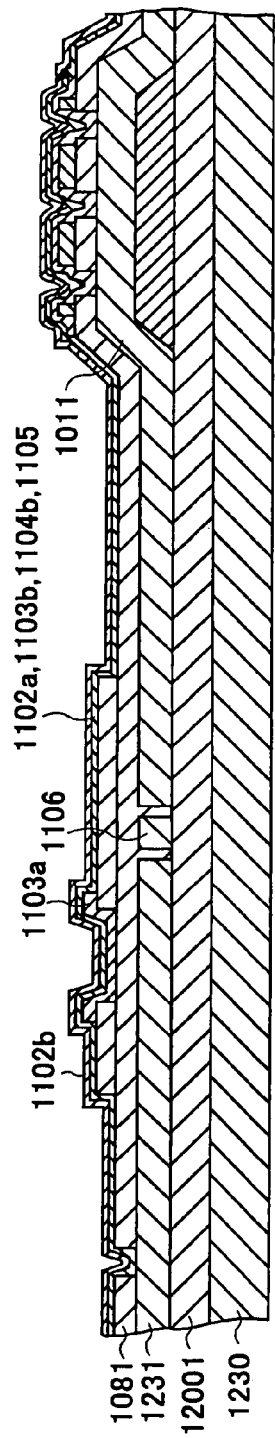
FIG.54A  SECTIONAL VIEW TAKEN ALONG A - A
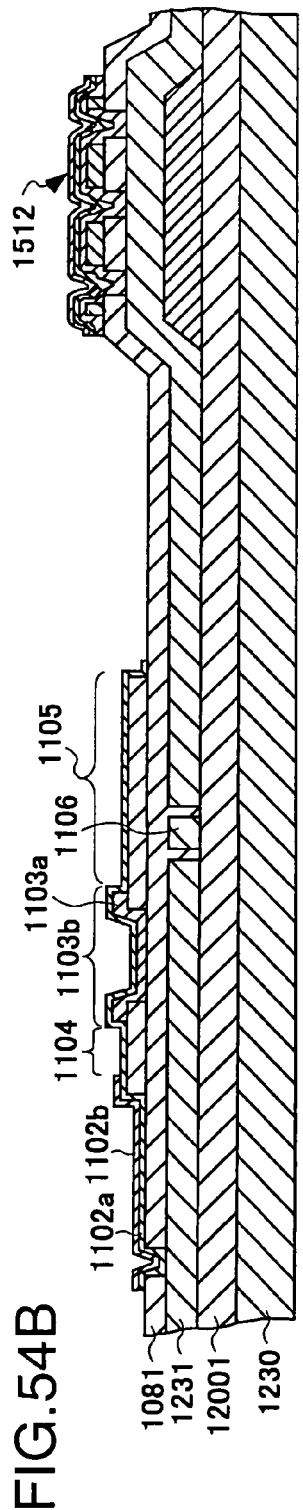
FIG.54B
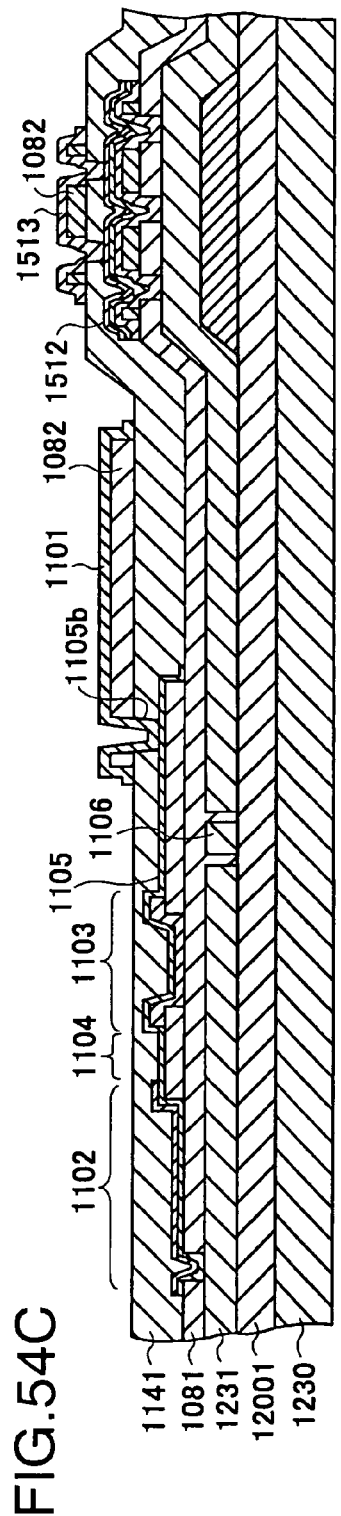
FIG.54C

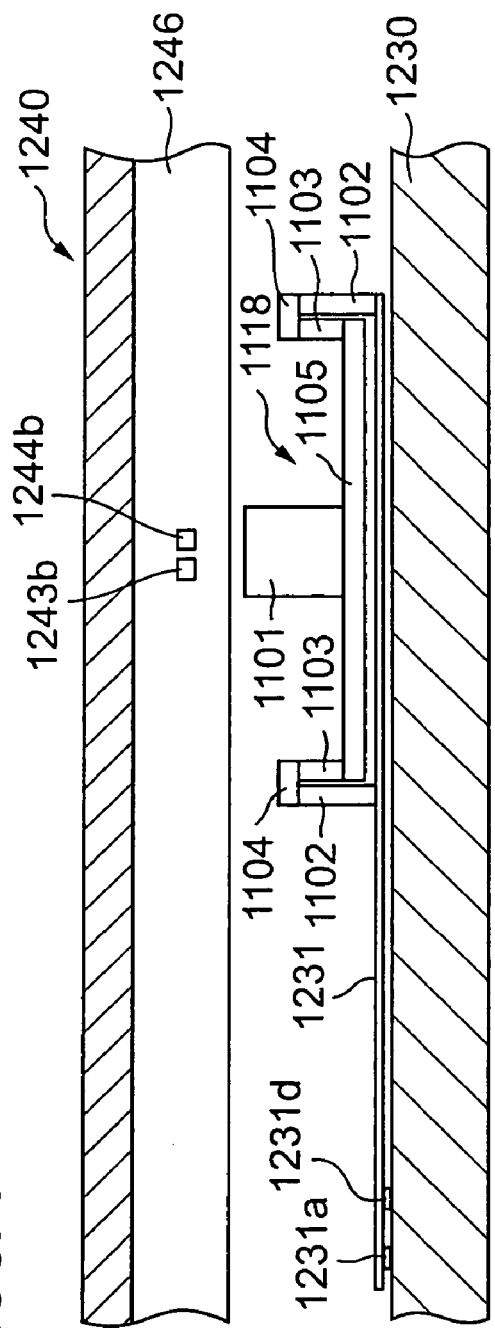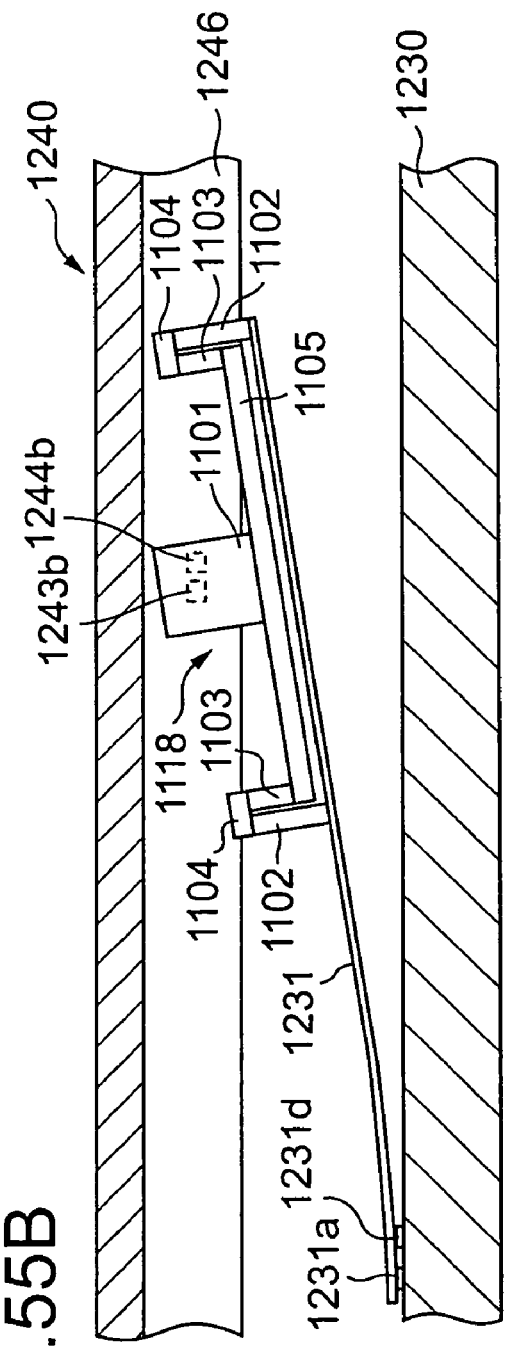

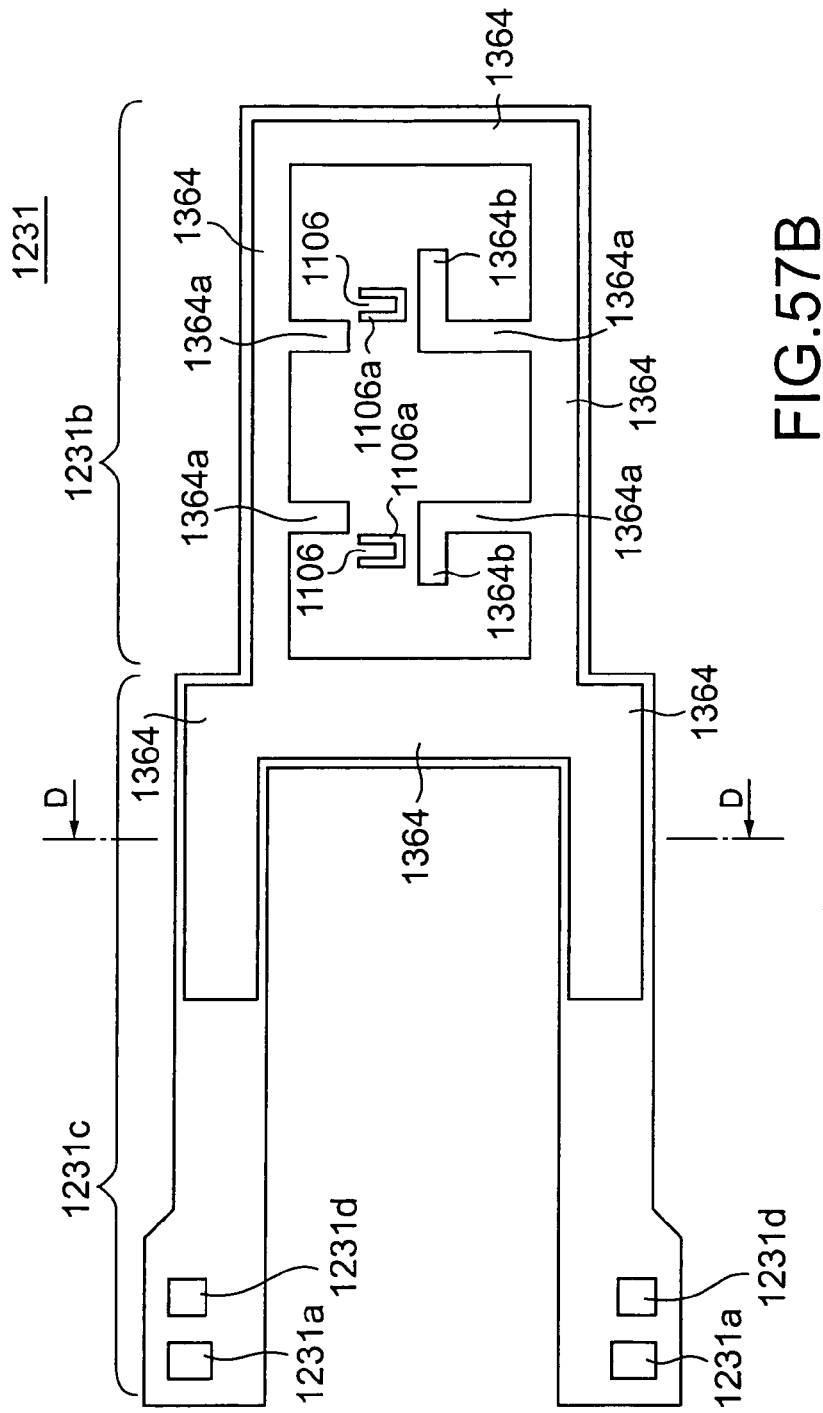
FIG.57A
FIG.57B SECTIONAL VIEW TAKEN ALONG D - D

OPTICAL ELEMENT, THIN FILM STRUCTURE, OPTICAL SWITCH, AND METHOD OF MANUFACTURING OPTICAL ELEMENT

This application claims is a continuation-in-part of application PCT/JP02/13292 filed on Dec. 19, 2002, designating the United States of America, which claims a priority based on Japanese Patent Applications No. 2002-2729 filed on Jan. 9, 2002 and No. 2002-301878 filed on Oct. 16, 2002. And this application claims a priority based on Japanese Patent Applications No. 2002-291400 filed on Oct. 3, 2002, No. 2002-2729, and No. 2002-301878. The entire contents of which are incorporated herein by reference for all purpose.

BACKGROUND OF THE INVENTION

The present invention relates to an optical element formed of a thin film, and an optical switch including the optical element.

An optical switch in which a minute mirror is moved by an actuator and is inserted into an optical path, thereby to change-over the optical path, is described in, for example, the Japanese Patent Application Laid-open No. 2001-42233. With the optical switch, a movable electrode plate on which the minute mirror is mounted is formed by micromachining technology. The minute mirror has a reflective surface which is perpendicular to the principal plane of the movable electrode plate. A fixed electrode is arranged at a position opposite to the movable electrode plate, and a voltage is applied between the movable electrode plate and the fixed electrode, whereby the movable electrode plate is moved by an electrostatic force. Thus, the minute mirror is inserted into the optical path or taken out of the optical path.

With the optical switch described in the Japanese Patent Application Laid-open No. 2001-42233, in order to form the mirror on the movable electrode plate, a photoresist film which has a thickness corresponding to the height of the mirror is formed on a thin film which is to become the movable electrode plate, an etching hole in the shape of the mirror is provided in the photoresist film, and a metal film is grown within the etching hole by plating, whereupon the photoresist film is removed.

Also the Japanese Patent Application Laid-open No. 2001-142008 discloses an optical switch in which a minute mirror is mounted on an actuator and is moved into an optical path by the actuator, thereby to change-over the optical path.

Besides, Sensors and Actuators A, 33 (1992) 249–256, "Microfabricated Hinges" discloses that a film to serve as a plate is formed on a substrate, and that the plate is raised up perpendicularly to the substrate, thereby to form the plate which is perpendicular to the substrate. In a process which forms the film to serves as the plate, a hinge structure which joins one end part of the plate and the substrate is formed. The plate is raised up about the hinge, thereby to finish up a minute vertical structure.

SUMMARY OF THE INVENTION

As explained above, the minute mirror of the optical switch described in the Japanese Patent Application Laid-open No. 2001-42233 is formed in such a way that the etching hole is provided in the photoresist film which is formed to the thickness corresponding to the height of the mirror, and that the etching hole is filled up with the metal film by the plating. Accordingly, a mirror surface comes to have a shape which is reverse to the surface shape of the flank of the etching hole. With the present-day etching technology of the photoresist film, however, it is difficult to control the angle of the flank of the etching hole relative to the principal plane of the movable electrode plate, and it is also difficult to smoothen the surface roughness of the flank. Therefore, the method described in the Japanese Patent Application Laid-open No. 2001-42233 is difficult of manufacturing a mirror whose reflective surface is perpendicular to the movable electrode plate and whose reflection factor is high.

Besides, a minute mirror structure and a manufacturing method therefor are not described in detail in the Japanese Patent Application Laid-open No. 2001-142008.

Further, it is considered to apply to the mirror of an optical switch the construction in which the plate is vertically raised up and supported by the hinge, as described in Sensors and Actuators A, 33 (1992) 249–256, "Microfabricated Hinges". Since, however, the plate formed by a thin-film process is vertically supported by the hinge being a multilevel structure formed by a thin-film process, the construction is liable to become shaky and is difficult of attaining a mechanical strength. It is therefore difficult to keep the plate perpendicular to the surface of the substrate.

The object of the present invention to provide an optical element which includes a reflection portion capable of reflecting a light beam in a desired direction.

In order to accomplish the object, according to the present invention, an optical element as described below is provided.

The optical element comprises a substrate, a light reflection portion, and a support portion which supports said light reflection portion over said substrate;

each of said light reflection portion and said support portion being constructed of at least one film;

said support portion having one end part fixed to said substrate and having the other end part joined with the film which constructs said light reflection portion, and bending from said one end part toward said other end part, thereby to support a principal plane of said film constructing said light reflection portion, non-parallelly to a principal plane of said substrate.

The above optical element can be so constructed that said support portion supports the principal plane of said film constructing said light reflection portion, perpendicularly to said substrate.

The above optical element can be so constructed that said support portion is constructed of a multilayer film in which at least two films having different coefficients of thermal expansion are stacked.

The above optical element can be constructed so as to further comprise a holding portion which keeps constant an angle between the principal plane of said film constructing said light reflection portion and the principal plane of said substrate.

The above optical element can be so constructed that said holding portion is an angle holding portion which is interposed between said light reflection portion and said substrate; and that said angle holding portion includes a film which has one end part fixed to said substrate, and which bends from said one end part toward the other end part.

The above optical element can be so constructed that said angle holding portion lies in touch with either said light reflection portion or said support portion, and that it includes positional shift prevention means for preventing a relative positional shift between said angle holding portion and said light reflection portion or said support portion, at the touch part of said light reflection portion or said support portion.

The above optical element can be so constructed that said positional shift prevention means is a groovy structure which is formed in said light reflection portion or said support portion.

The above optical element can be so constructed that a film surface of said film of said angle holding portion is perpendicular to said principal plane of said light reflection portion, and that a side surface of said film of said angle holding portion lies in touch with said light reflection portion.

The above optical element can be so constructed that at least one such angle holding portion is arranged on each of both sides of said principal plane of said light reflection portion.

The above optical element can be so constructed:

that a sense of the bending of said film of said angle holding portion is reverse to a sense of the bending of said film constructing said support portion; and that a second light reflection portion is joined to said other end part of said film of said angle holding portion, and it is placed on said light reflection portion.

The above optical element can be so constructed that said light reflection portion is suspended from said other end of the bent film of said support portion toward said substrate.

The above optical element can be so constructed that said holding portion is a thin-film multilevel structure which lies in touch with part of a member constituting said light reflection portion, that said thin-film multilevel structure has a plurality of unit structural members which are successively stacked on said substrate, that said each unit structural member includes a support part and a flat part supported by said support part, that said support part and said flat part are unitarily constructed of a continuous thin film, and that the stacked unit structural members have the thin films secured to each other at parts where they touch each other.

The above optical element can be so constructed that said thin-film multilevel structure lies in touch with either said light reflection portion or said support portion, and it includes positional shift prevention means for preventing a relative shift between said thin-film multilevel structure and said light reflection portion or said support portion, at the touch part of said light reflection portion or said support portion.

The above optical element can be so constructed that said positional shift prevention means is a groovy structure which is formed in said light reflection portion or said support portion.

Besides, according to the present invention, an optical element as described below is provided.

The optical element comprises a substrate, a light reflection portion, and a support portion which supports said light reflection portion over said substrate;

said light reflection portion being constructed of a film;

said support portion including at least two coupled members, a first member of which has one end part fixed to said substrate and has the other end part joined through the other member with said film constructing said light reflection portion, and bends from said one end part toward said other end part, thereby to support a principal plane of said film constructing said light reflection portion, non-parallelly to a principal plane of said substrate.

The above optical element can be so constructed that said support portion includes the second member, that said second member is a bent film, and that a sense of the bending of said second member is reverse to a sense of the bending of said first member.

The above optical element can be so constructed that said film constructing said light reflection portion is formed with a stepped structure at its peripheral edge part.

The above optical element can be constructed so as to further comprise a temperature regulation portion for keeping a temperature of said support portion constant.

The above optical element can be so constructed that said light reflection portion employs as its light reflection surface, a surface of said film constructing said light reflection portion which has been on a side of said substrate during film formation.

Besides, according to the present invention, a thin film structure as described below is provided.

The thin film structure comprises a substrate, a flat plate, and a support portion which supports said flat plate over said substrate;

said support portion being constructed of at least one film;

said support portion having one end part fixed to said substrate and having the other end part joined with said flat plate, and bending from said one end part toward said other end part, thereby to support a principal plane of said flat plate non-parallelly to a principal plane of said substrate.

Besides, according to the present invention, a thin film structure as described below is provided.

The thin film structure comprises a substrate, a flat plate, and a support portion which supports said flat plate over said substrate;

said support portion including at least two coupled members, a first member of which has one end part fixed to said substrate and has the other end part joined with said flat plate through the other member, and bends from said one end part toward said other end part, thereby to support a principal plane of said flat plate non-parallelly to a principal plane or said substrate.

Besides, according to the present invention, an optical switch as described below is provided.

The optical switch comprises a mirror portion, and a movable portion on which said mirror portion is mounted;

said mirror portion including a light reflection portion, and a support portion which supports said light reflection portion over said movable portion;

each of said light reflection portion and said support portion being constructed of at least one film;

said support portion having one end part fixed to said movable portion and having the other end part joined with the film which constructs said light reflection portion, and bending from said one end part toward said other end part, thereby to support a principal plane of said film constructing said light reflection portion, non-parallelly to a principal plane of said movable portion.

Besides, according to the present invention, an optical switch as described below is provided.

The optical switch comprises a mirror portion, and a movable portion on which said mirror portion is mounted;

said mirror portion including a light reflection portion, and a support portion which supports said light reflection portion over said movable portion;

said light reflection portion being constructed of a film;

said support portion including at least two coupled members, a first member of which has one end part fixed to said movable portion and has the other end part joined through the other member with said film constructing said light reflection portion, and bends from said one end part toward said other end part, thereby to support a principal plane of said film constructing said light reflection portion, non-parallelly to a principal plane of said movable plate.

Besides, according to the present invention, a method of manufacturing an optical element as described below is provided.

The method of manufacturing an optical element comprises the steps of;

forming a sacrificial layer which has an opening, on a substrate, forming a support film of predetermined shape on that position of said sacrificial film which includes said opening, and forming a light reflection film on that position of said sacrificial film which is joined with one end part of said support film; and the step of removing said sacrificial film, whereby said support film is bent by an internal stress of said support film so as to support a principal plane of said light reflection film non-parallelly to a principal plane of said substrate.

The above method of manufacturing an optical element can be so constructed that said sacrificial layer is formed of a resist.

The above method of manufacturing an optical element can be so constructed that said support film is formed of a stacked structure of at least two layers having different coefficients of thermal expansion.

Besides, according to the present invention, an optical switch as described below is provided.

The optical switch comprises a mirror portion which includes a light reflection member, a movable portion on which said mirror portion is mounted, and a holding portion which lies in touch with part of a member constituting said mirror portion, in order to keep an angle of said light reflection member;

said holding portion being a thin-film multilevel structure;

said thin-film multilevel structure having a plurality of unit structural members which are successively stacked on said movable portion;

said each unit structural member including a support part and a flat part supported by said support part, said support part and said flat part being unitarily constructed of a continuous thin film;

the stacked unit structural members having the thin films secured to each other at parts where they touch each other.

The above optical switch can be so constructed that said thin-film multilevel structure lies in touch with either said light reflection portion or said support portion, and it includes positional shift prevention means for preventing a relative shift between said thin-film multilevel structure and said light reflection portion or said support portion, at the touch part of said light reflection portion or said support portion.

The above optical switch can be so constructed that said positional shift prevention means is a groovy structure which is formed in said light reflection portion or said support portion.

The above optical switch can be so constructed that said mirror portion includes a support portion in order to support said light reflection member over said movable portion.

In this case, said support portion can include at least two coupled members, a first member of which has one end part fixed to said movable portion and has the other end part joined with said light reflection member through the other member, and bends from said one end part toward said other end part, thereby to support said light reflection member non-parallelly to a principal plane of said movable portion.

The above optical switch can be so constructed that said thin film constructing said each unit structural member is formed with a stepped structure at its peripheral edge.

The above optical switch can be so constructed that said support part of the unit structural member located at an upper stage is mounted on said flat part of the unit structural member at an immediately lower stage.

The above optical switch can be so constructed that, in the stacked unit structural members, said unit structural member located at the upper stage is smaller in the number of the support parts.

The above optical switch can be so constructed that, in said plurality of unit structural members, the unit structural member of lowermost stage is constructed unitarily with said movable portion.

The above optical switch can be so constructed that at least one of said plurality of unit structural members is constructed by patterning the same thin film as a thin film which forms said member constituting said mirror portion.

The above optical switch can be so constructed that said thin film constructing said each unit structural member is a triple-layer film, in which a film of uppermost layer and a film of lowermost layer are of the same material.

Besides, according to the present invention, an optical switch as described below is provided.

The optical switch comprises a mirror portion which includes a light reflection member, a movable portion on which said mirror portion is mounted, and a holding portion which lies in touch with part of a member constituting said mirror portion, in order to keep an angle of said light reflection member;

said holding portion being a thin-film multilevel structure;

said thin-film multilevel structure having a plurality of unit structural members which are successively stacked on said movable portion;

said each unit structural member including a support part which has a hollow opening, a flat part which covers said opening, and a filling material with which said hollow opening of said support portion is filled up, each of said support part and said flat part being formed of a thin film;

the stacked unit structural members being such that said support part of the unit structural member located at an upper stage is mounted on said flat part of the unit structural member at an immediately lower stage.

The above optical switch can be so constructed that said thin-film multilevel structure lies in touch with either said light reflection portion or said support portion, and it includes positional shift prevention means for preventing a relative shift between said thin-film multilevel structure and said light reflection portion or said support portion, at the touch part of said light reflection portion or said support portion.

The above optical switch can be so constructed that said positional shift prevention means is a groovy structure which is formed in said light reflection portion or said support portion.

The above optical switch can be so constructed that said thin film which constructs said support part of the unit structural member located at an upper stage, and said thin film which constructs said flat part of the unit structural member at a lower stage for mounting said support part are secured to each other.

Besides, according to the present invention, an optical switch as described below is provided.

The optical switch comprises a substrate, a movable portion one end part of which is fixed to said substrate, and a mirror portion which is mounted on a side of the other end part of said movable portion;

said movable portion being constructed of at least two films, and being bent by internal stresses of said at least two films, thereby to raise the other end part bearing said mirror portion, over said substrate;

said mirror portion including a light reflection member which is mounted on said movable portion so that a light reflection surface may be directed perpendicularly to a principal plane of said substrate;

said light reflection member being inclinedly mounted on said movable portion so that its upper end edge may become parallel to said substrate in a state where said movable portion has raised said mirror portion.

Besides, according to the present invention, an optical element as described below is provided.

The optical element comprises a substrate, an optical film which has a desired optical characteristic, and a support portion which supports said optical film over said substrate;

said support portion being constructed of at least one film;

said support portion having one end part fixed to said substrate and having the other end part joined with a film constructing said optical film, directly or through another member, and bending from said one end part toward said other end part, thereby to support a principal plane of said film constructing said optical film, non-parallelly to a principal plane of said substrate.

Besides, according to the present invention, an optical device as described below is provided.

The optical device comprises an optical element, a movable portion on which said optical element is mounted, and a substrate which holds said movable portion;

said movable portion being made of at least one film, having one end part fixed to said substrate and having said optical element mounted on a side of the other end part, at least a part near the fixed end part being formed of a stacked structure in which at least two films are stacked, said stacked structure being bent by an internal stress, thereby to support said other end part at a position remote from said substrate;

said movable portion being formed with a stepped structure along a peripheral edge of its part bearing said optical element.

The above optical device can be so constructed that, in order to form said stepped structure, a film constructing said movable portion is formed with a convex portion along the peripheral edge of its part bearing said optical element.

Besides, according to the present invention, an optical device as described below is provided.

The optical device comprises an optical element, a movable portion on which said optical element is mounted, and a substrate which holds said movable portion;

said movable portion being, at least partially, a stacked structure made of at least two films, having one end part fixed to said substrate and having said optical element mounted on a side of the other end part, said stacked structure being bent by an internal stress, thereby to support said other end part at a position remote from said substrate;

said stacked structure including a metal film, said metal film being patterned into a predetermined pattern, said pattern including an electrode pattern for an electrostatic force as acts an electrode for driving said movable portion by the electrostatic force.

The above optical device can be so constructed that said pattern of said metal film further includes a current path pattern for a Lorentz force as acts as a current path for driving said movable portion by the Lorentz force.

The above optical device can be so constructed that said electrode pattern for said electrostatic force and said current path pattern for said Lorentz force are respectively connected to voltage applying wiring lines and current feeding wiring lines of said substrate through said one end part fixed to said substrate.

The above optical device can be so constructed that said optical element includes an optical film which has a desired optical characteristic, and a support portion which supports said optical film over said movable portion; and that said support portion is constructed of at least one film;

said support portion having one end part fixed to said substrate and having the other end part joined with a film constructing said optical film, directly or through another member, and bending from said one end part toward said other end part, thereby to support a principal plane of said film constructing said optical film, non-parallelly to a principal plane of said substrate.

Besides, according to the present invention, an optical device as described below is provided.

The optical device comprises a substrate, an optical element which is mounted on said substrate, and a suppression portion which serves to suppress a positional fluctuation of said optical element;

said optical element including an optical film which has a desired optical characteristic, and a support portion which supports said optical film, said support portion including a bent film member, said film member having one end part fixed to said substrate and having the other end part raised by said bent film member, thereby to support a principal plane of said optical film non-parallelly to a principal plane of said substrate;

said suppression portion suppressing a positional fluctuation of said optical film in a normal direction of said optical film or in an upward direction.

The above optical device can be so constructed that said support portion includes not only said bent film member, but also a second beltlike bent film member, a joint portion, and an optical-film support portion on which said optical film is mounted;

that said joint portion is joined to said other end part of the first-mentioned film member, said second film member having one end part joined to said joint portion and having said optical-film support portion joined to the other end part hanging down from said joint portion; and that said suppression portion suppresses a positional fluctuation of said optical-film support portion in order to suppress the positional fluctuation of said optical film.

The above optical device can be so constructed that said suppression portion is a member which is formed by cutting and bending part of said substrate.

The above optical device can be so constructed that said suppression portion is a multistage multilevel structure which is formed by stacking multilevel structures constructed of thin films, a plurality of stages.

The above optical device can be so constructed that said multistage multilevel structure has a hook-shaped part, and that, on this occasion, said hook-shaped part is inserted into an opening provided in said optical-film support portion.

The above optical device can be so constructed that said multistage multilevel structure has an extension part which hangs over said optical-film support portion.

The above optical device can be so constructed that said multistage multilevel structure further has means for suppressing a positional fluctuation of said optical-film support portion in a direction reverse to a direction toward said one end part of said film member.

The above optical device can be so constructed that said suppression portion includes a protuberant part which is provided from said optical-film support portion toward said substrate, and an opening which is provided in said substrate, and that said protuberant part is snugly fitted in said opening.

The above optical device can be so constructed that said substrate is a movable substrate for moving said optical element, and that it is constructed of at least one film.

BRIEF DESCRIPTION OF THE DRAWINGS

FIG. 1A is a sectional view of a mirror 12 in an optical switch in the first embodiment of the present invention as taken along A—A, while

FIG. 2 is a top plan view of the optical switch in the first embodiment of the present invention.

FIG. 3 is a sectional view of the optical switch in the first embodiment of the present invention as taken along B—B.

FIG. 4 is a sectional view of the optical switch in the first embodiment of the present invention as taken along C—C.

FIG. 5 is a sectional view taken along B—B in the case where a voltage is applied to the optical switch in the first embodiment of the present invention, thereby to move a movable plate 21 to its lower position.

FIG. 6 is a graph showing the relationship between the voltage, which is applied to the optical switch in the first embodiment of the present invention, and the position of the mirror 12 (movable plate 21).

FIG. 10A is a sectional view of a mirror 112 in an optical switch in the second embodiment of the present invention, while

FIG. 15A is a side view of a mirror 116 in an optical switch in the fourth embodiment of the present invention, while

FIG. 18A is a sectional view of a mirror 118 in an optical switch in the sixth embodiment of the present invention, while

FIGS. 20A–20C are sectional views showing the manufacturing process of the mirror 118 of the optical switch in the sixth embodiment of the present invention as seen in the direction of a section H—H.

FIGS. 21A–21C are sectional views showing the manufacturing process of the mirror 118 of the optical switch in the sixth embodiment of the present invention as seen in the direction of the section H—H.

FIG. 25A is a sectional view showing the construction of optical switch in the eighth embodiment of the present invention, in the case where a voltage is applied, while

FIG. 26 is a perspective view showing the constructions of a mirror 118 and thin-film multilevel structures 5 on the movable plate 231 of an optical switch in the ninth embodiment of the present invention.

FIG. 27A is a top plan view of the thin-film multilevel structure 5 in FIG. 26, FIG. 27B is a sectional view of the thin-film multilevel structure 5 in FIG. 26 as taken along I—I, and FIG. 27C is a sectional view of the thin-film multilevel structure 5 in FIG. 26 as taken along J—J.

FIGS. 29A–29C are sectional views showing the manufacturing process of the mirror 118 and thin-film multilevel structure 5 of the optical switch in FIG. 26 as taken along K—K.

FIGS. 30A–30C are sectional views showing the manufacturing process of the mirror 118 and thin-film multilevel structure 5 of the optical switch in FIG. 26 as taken along K—K.

FIG. 34A is a sectional view showing the construction of a mirror 118 on a movable plate 231 in an optical switch in the tenth embodiment of the present invention, while

FIG. 36A is a top plan view of the movable plate 231 of the optical switch in the ninth embodiment of the present invention, while

FIG. 40A is a sectional view showing the construction of the optical switch in the ninth embodiment of the present invention, in the state where the movable plate 231 is brought down, while

FIG. 41A is a sectional view showing the construction of an optical switch in the tenth embodiment of the present invention in the state where a movable plate 231 is brought down, while FIG. 41B is a sectional view showing the construction in the state where the movable plate 231 raises a mirror 118.

FIG. 42 is a perspective view showing the constructions of a mirror 118 and thin-film multilevel structures 5 on the movable plate 231 of an optical switch in the eleventh embodiment of the present invention.

FIG. 43A is a view showing the relation of a touch part between the protuberant part 71 of the thin-film multilevel structure 5 and a reflection-portion support portion 105 in the eleventh embodiment, while

FIG. 49A is a perspective view of the mirror 1118 of an optical device in the fourteenth embodiment of the present invention, while FIG. 49B is a sectional view taken along B—B in FIG. 49A.

FIG. 50A is a perspective view of the mirror 1118 of an optical device in the fifteenth embodiment of the present invention, while FIG. 50B is a front view of each opening 1109 in FIG. 50A.

FIG. 52 is a perspective view of the mirror 1118 of an optical device in the seventeenth embodiment of the present invention.

FIGS. 53A–53C are sectional views showing the manufacturing process of the optical device in the twelfth embodiment of the present invention, along a section A—A in FIG. 45.

FIGS. 54A–54C are sectional views showing the manufacturing process of the optical device in the twelfth embodiment of the present invention, along the section A—A in FIG. 45.

FIG. 55A is a sectional view showing a state where a movable plate 1231 on which the mirror 1118 of the optical device is mounted in the twelfth embodiment of the present invention is brought down, while FIG. 55B is a sectional view showing a state where the movable plate 1231 raises the mirror 1118.

FIG. 57A is a top plan view of the movable plate 1231 in the optical device in the twelfth embodiment of the present invention, while FIG. 57B is a sectional view taken along D—D in FIG. 57A.

DETAILED DESCRIPTION OF THE PREFERRED EMBODIMENTS

Figure 1A:
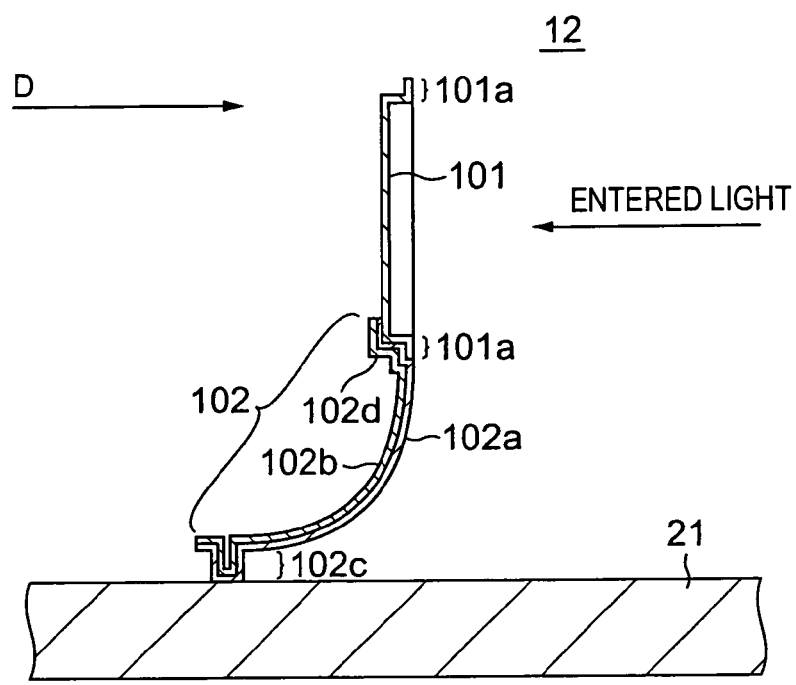

Now, embodiments of the present invention will be described with reference to the drawings.

First Embodiment

An optical switch in the first embodiment will be described with reference to FIGS. 1A and 1B, FIG. 2, FIG. 3 and FIG. 4.

As shown in FIG. 2, FIG. 3 and FIG. 4, the optical switch includes a semiconductor substrate 11 which is formed with a recess 13, a movable plate 21, and two spring portions 27a, 27b which support the movable plate 21 over the substrate 11. A mirror 12 is mounted on the movable plate 21. A temperature regulation element (not shown), for example, Peltier element is arranged under the substrate 11 in order to keep the temperature of the mirror 12 at a preset temperature.

Figure 1B:
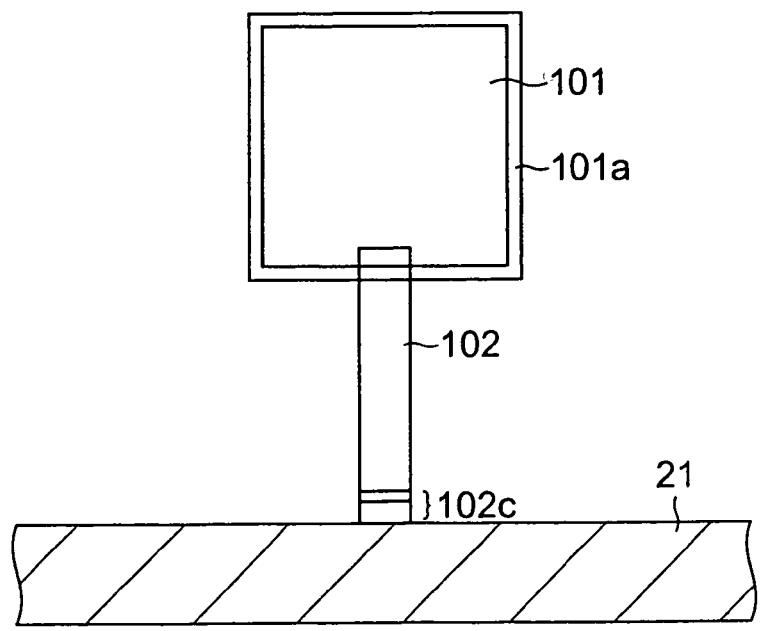
FIG. 1B is a view of the mirror 12 in FIG. 1A as seen in the direction of an arrow D.

As shown in FIGS. 1A and 1B, the mirror 12 is constructed of a reflection portion 101, and a support portion 102 which supports the reflection portion 101 over the movable plate 21. The reflection portion 101 is made of an Al (aluminum) film. The outer edge part of the Al film of the reflection portion 101 is formed with a stepped structure in order to afford rigidity, thereby to form a rim 101a. The support portion 102 is made of a multilayer film in which a silicon nitride film 102a and an Al film 102b are stacked, and the silicon nitride film 102a is located on the side of the movable plate 21. The reflection portion 101 is fixed to a joint portion 102d at the distal end of the support portion 102, the other end of which is convexed to construct a leg portion 102c. The leg portion 102c is fixed to the movable plate 21.

The support portion 102 is bent in the shape of a circular arc from the leg portion 102c to the distal-end joint portion 102d by a stress developing due to the difference between the coefficients of thermal expansion of the silicon nitride film 102a and the Al film 102b, and stresses having developed during the formation of the films. Thus, the principal plane of the reflection portion 101 is supported at a desired angle, in this embodiment, perpendicularly to the principal plane of the movable plate 21. The film structure of the support portion 102 has the property that the radius of curvature of the bent enlarges with a temperature rise, whereas it becomes small with a temperature fall. Besides, the radius of curvature of the bent of the support portion 102 depends upon the thicknesses, etc. of the silicon nitride film 102a and the Al film 102b. Therefore, the thicknesses, etc. of the silicon nitride film 102a and the Al film 102b of the support portion 102, and the length of this support portion from the leg portion 102c to the distal-end joint portion 102d are designed beforehand in order that the support portion 102 may become a bent state where the principal plane of the reflection portion 101 is supported perpendicularly to the principal plane of the movable plate 21 at the temperature kept by the temperature regulation element (not shown).

Meanwhile, as shown in FIG. 3, the movable plate 21 is constructed of two stacked insulating films 22, 26, and an electrode film 23a interposed therebetween. Silicon nitride films or silicon oxide films, for example, can be employed as the two insulating films 22, 26. The electrode film 23a is made of a metal film such as Al film. The spring portions 27a, 27b are endowed with springiness by patterning the insulating films 22, 26 in a meandering shape as shown in FIG. 2. Consequently, the movable plate 21 is movable in the direction of a Z-axis in each of FIG. 2, FIG. 3 and FIG. 4. Incidentally, the spring portion 27b has a wiring line 23b interposed between the insulating films 22, 26. One end of the wiring line 23b is connected to the electrode film 23a, while the other end thereof is led out onto the upper surface side or lower surface side of the substrate 11 in order to be connected with an external power source.

In the optical switch of this embodiment, therefore, when the wiring line 23b is connected to the external power source so as to apply a voltage V between the electrode film 23a of the movable plate 21 and the semiconductor substrate 11 as shown in FIG. 6, the electrode film 23a and the semiconductor substrate 11 are drawn to each other by an electrostatic force, and the movable plate 21 is attracted onto the bottom surface of the recess 13 of the semiconductor substrate 11 as shown in FIG. 5. Besides, in a state where the voltage V is not applied, the movable plate 21 is held at the upper surface position of the substrate 11 by the elastic forces of the spring portions 27a, 27b. Thus, the movable plate 21 can have its position changed-over so as to be arranged at the upper surface position of the substrate 11 (upper side position) or the bottom surface position of the recess 13 (lower side position) as shown in FIG. 6, depending upon whether or not the voltage V is applied between the electrode film 23a and the semiconductor substrate 11. In consequence, the mirror 12 mounted on the movable plate 21 is also arranged at an upper side position or a lower side position.

In case of using the optical switch in this embodiment, therefore, an optical path 130 is set at a position at which it intersects the reflection portion 101 of the mirror 12 with the movable plate 21 located at the upper side position, as shown in FIG. 3. Thus, in the case where the voltage V is not applied between the electrode film 23b and the substrate 11, the movable plate 21 lies at the upper side position, and hence, the mirror 12 is inserted in the optical path 130, so that light entered in the direction of an X-axis is reflected by the mirror 12 and is deflected in the direction of a Y-axis. On the other hand, in the case where the voltage V is applied, the movable plate 21 is moved to the lower side position as shown in FIG. 5, and hence, the mirror 12 comes out of the optical path 130, so that the entered light passes above the mirror 12 and propagates rectilinearly as it is. In this manner, the optical switch in this embodiment can change-over the propagating direction of the entered light, depending upon if the voltage V is applied between the electrode film 23a and the substrate 11.

Since the reflection portion 101 made of the Al film is vertically supported as the mirror 12 by the support portion 102, the optical switch in this embodiment can use the film surface of the Al film as a reflective surface and has a high reflection factor. Besides, since the support portion 102 can keep the reflection portion 101 vertical by controlling the temperature, the reflection direction of the entered light can be precisely determined.

Now, a method of manufacturing the optical switch in this embodiment will be described with reference to FIGS. 7A and 7B, FIGS. 8A–8E and FIG. 9.

Figure 7A:
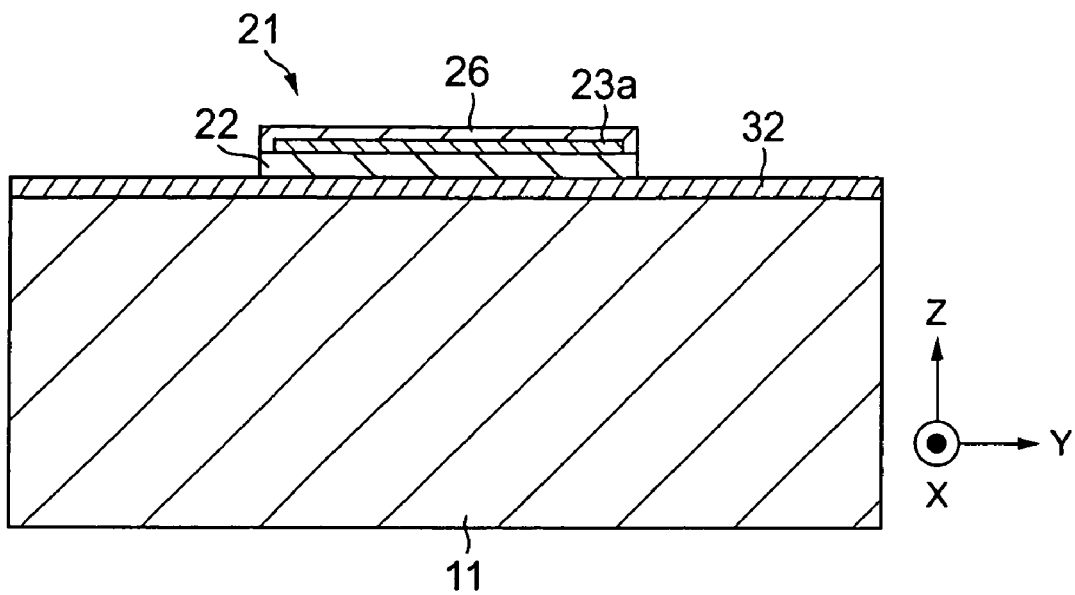
FIGS. 7A and 7B are sectional views showing the manufacturing process of the optical switch in the first embodiment of the present invention.
Figure 7B:
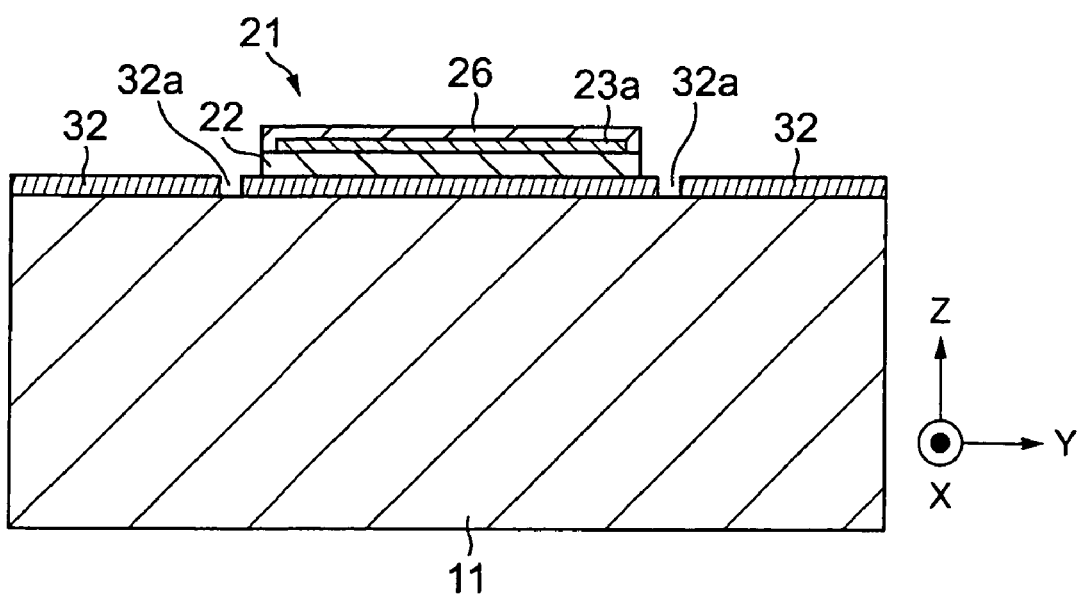

As shown in FIG. 7A, a silicon substrate is prepared as a semiconductor substrate 11, and it is formed with a drive circuit, wiring lines, etc. beforehand as may be needed. An SiO$_2$ film 32 is formed on the front surface of the substrate 11. The SiO$_2$ film 32 is provided with openings at parts where the substrate 11 and spring portions 27a, 27b are connected. An insulating film 22 which constitutes a movable plate 21 and the spring portions 27a, 27b is formed on the SiO$_2$ film 32, and it is overlaid with an Al film which forms an electrode film 23a and a wiring line 23b. Thereafter, the Al film is patterned into the shapes of the electrode film 23a and the wiring line 23b by photolithography. Further, an insulating film 26 is formed on the resulting film structure, and the insulating films 22, 26 are patterned into the shapes of the movable plate 21 and the spring portions 27a, 27b by photolithography. Subsequently, as shown in FIG. 7S, an etching hole 32a is formed in the SiO$_2$ film 32. The etching hole 32a is used in order that, in forming a recess 13 in the substrate 11 by a later step, an etchant may be caused to reach the substrate 11.

Figure 8A:
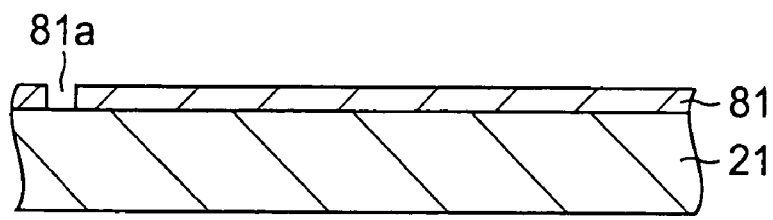
FIGS. 8A–8E are enlarged sectional views of the movable plate 21 showing the manufacturing process of the mirror of the optical switch in the first embodiment of the present invention.
Figure 8B:
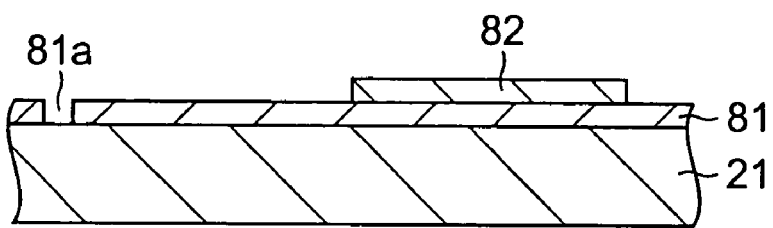

A mirror 12 is formed on the movable plate 21 formed by the above steps. Steps for forming the mirror 12 will be described with reference to FIGS. 8A–8E. These figures show the upper surface part of the movable plate 21 on an enlarged scale. First, a resist layer 81 having a thickness of 1.5 μm is formed on the movable plate 21. The resist layer 81 is photolithographically provided with an opening 81a at a position at which the leg portion 102c of a support portion 102 is formed (FIG. 8A). Subsequently, a resist layer 82 having a thickness of 1.5 μm is formed on the resist layer 81 again. The resist layer 82 is photolithographically removed so as to leave a part corresponding to the reflection portion 101 of the mirror 12, thereby to form the island of the resist layer 82 (FIG. 8B). The resist layers 81, 82 are layers (sacrificial layers) which are finally removed.

Figure 8C:
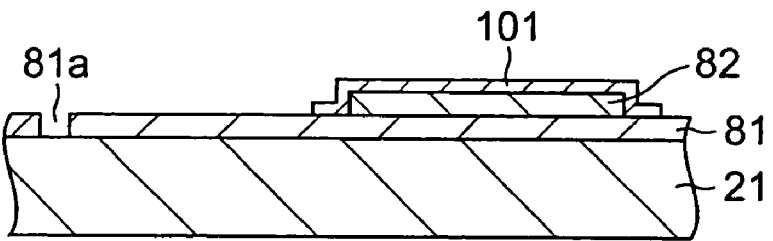
Figure 8D:
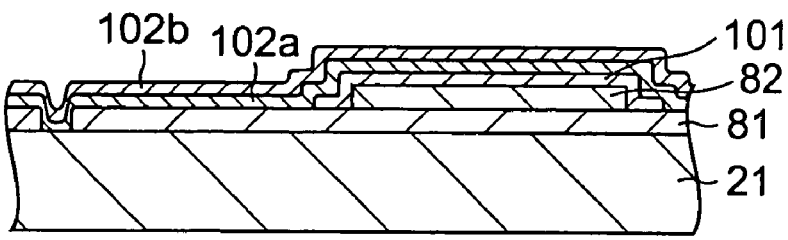
Figure 8E:
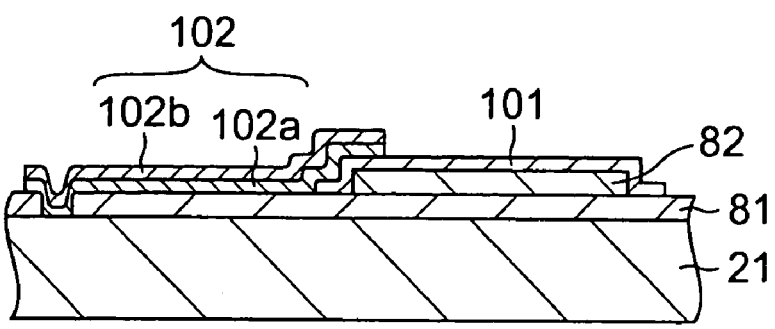

An Al film having a thickness of 5000 angstroms is evaporated on the resist layers 81, 82, and it is patterned into the shape of the reflection portion 101 of the mirror 12 by photolithography and etching (FIG. 8C). Since the Al film of the reflection portion 101 is underlaid with the island of the resist layer 82, it is formed with a stepped structure by the edge of the island, and the rim 101a of the reflection portion 101 is formed. Further, a silicon nitride film 102a and an Al film 102b are formed on the whole surface of the resulting structure by evaporation (FIG. 8D), and they are patterned into the shape of the support portion 102 by photolithography and etching (FIG. 8E). Each of the silicon nitride film 102a and the Al film 102b has a thickness of 2000 angstroms. Those parts of the silicon nitride film 102a and the Al film 102b of the support film 102 which are formed in the opening 81a, constitute the leg portion 102c. Besides, a joint portion 102d at the distal end of the support portion 102 is stacked on the Al film of the reflection portion 101, thereby to be joined with the reflection portion 101.

Figure 9:
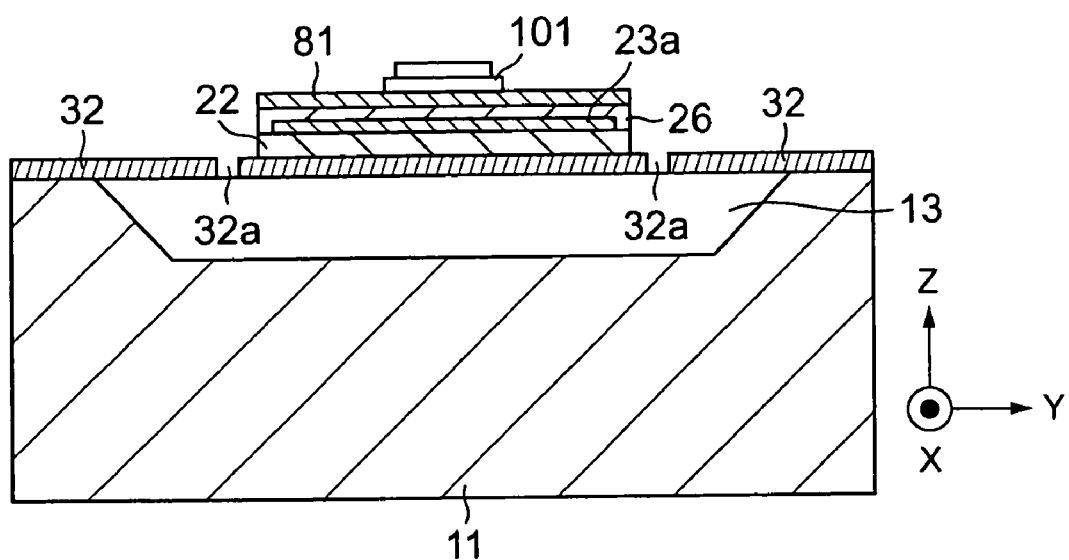
FIG. 9 is a sectional view showing the manufacturing process of the optical switch in the first embodiment of the present invention.

Subsequently, a KOH solution being the etchant is poured into the substrate 11 through the etching hole 32a, whereby the substrate 11 etched to form the recess 13 (FIG. 9). Thereafter, the remaining SiO$_2$ film 32 is removed. Thus, the movable plate 21 falls into a state where it is supported over the recess 13 by the spring portions 27a, 27b as shown in FIG. 3 and FIG. 4. Since, however, the mirror 12 does not rise up yet in this state, the resist layers 81, 82 being the sacrificial layers are removed by ashing. Thus, the mirror 12 comes to have a structure in which it is fixed to the movable plate 21 by only the leg portion 102c as shown in FIG. 1A, and the support portion 102 is bent up by stresses having developed during the formation of the silicon nitride film 102a and the Al film 102b and a stress developing due to the difference between the coefficients of thermal expansion, thereby to support the reflection portion 101.

Accordingly, when the temperature of the support portion 102 is regulated to a predetermined one by a temperature regulation element (not shown), the support portion 102 is bent to a position at which it supports the principal plane (reflective surface) of the reflection portion 101 perpendicularly to the principal plane of the movable plate 21 as shown in FIG. 1A. Thus, the optical switch in which the reflective surface of the mirror 12 is vertically supported over the movable plate 21 can be obtained.

As thus far described, the mirror 12 in this embodiment is so constructed that the principal plane of the reflection portion 101 formed in parallel with the principal plane of the movable plate 21 at the manufactural stage is raised 90 degrees by the bending of the support portion 102. Therefore, the reflective surface of the reflection portion 101 is the upper surface or lower surface of the Al film constructing the reflection portion 101, during the formation thereof. Therefore, the reflective surface can be formed into a smooth surface, and a high reflection factor can be attained as the reflection factor of the reflection portion 101. Besides, the sense of the reflective surface of the reflection portion 101 can be made perpendicular to the principal plane of the movable plate 21 by the temperature regulation. Therefore, the optical switch furnished with the mirror 12 in this embodiment can deflect the entered light in the desired direction with the high reflection factor.

Incidentally, although either of the upper surface side and lower surface side of the Al film during the formation can be employed as the reflective surface of the reflection portion 101, a higher reflection factor can be attained in case of employing the lower surface side of the Al film during the formation (the surface on the side of the movable plate 21) as the reflective surface as shown in FIG. 1A. The reason therefor is that the Al film constructing the reflection portion 101 is heated by a baking step and a drying step in the photolithography, etc, after the formation, so minute ruggedness sometimes appears in the front surface of the Al film. Moreover, the front surface of the Al film is sometimes roughened by a developing solution, the ashing step of the sacrificial layers, etc, depending upon conditions. Therefore, that lower surface side of the Al film which does not undergo such minute ruggedness and roughening is employed as the reflective surface, whereby the higher reflection factor can be attained.

Besides, the first embodiment described above is so constructed that the temperature of the support portion 102 of the mirror 12 is controlled using the temperature regulation element such as Peltier element, so as to keep the reflective surface of the reflection portion 101 perpendicular or at the desired angle to the principal plane of the movable plate 21. Alternatively, the bent of the support portion 102 can be controlled by projecting light onto the mirror 12 for the temperature regulation, instead of the use or the temperature regulation element. In this case, the temperature of the support portion 102 can be regulated in such a way that the light for the temperature regulation is projected onto the surface of the reflection portion 101 opposite to the surface thereof onto which the entered light to be switched by the optical switch falls, or that the light for the temperature regulation is directly projected onto the support portion 102. On this occasion, the angle of the reflective surface of the reflection portion 101 relative to the principal plane of the movable plate 21 can be changed by controlling the intensity of the light for the temperature regulation. In this way, therefore, the direction in which the light to be switched is reflected can also be changed.

Second Embodiment

Next, an optical switch in the second embodiment will be described with reference to FIGS. 10A and 10B.

Figure 10A:
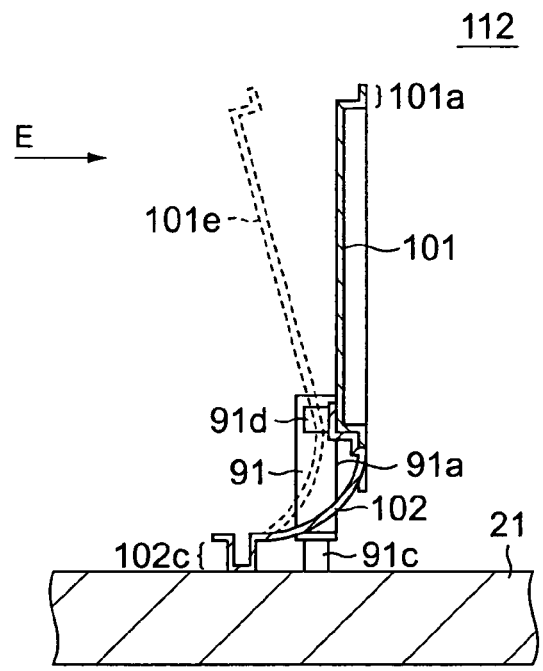
Figure 10B:
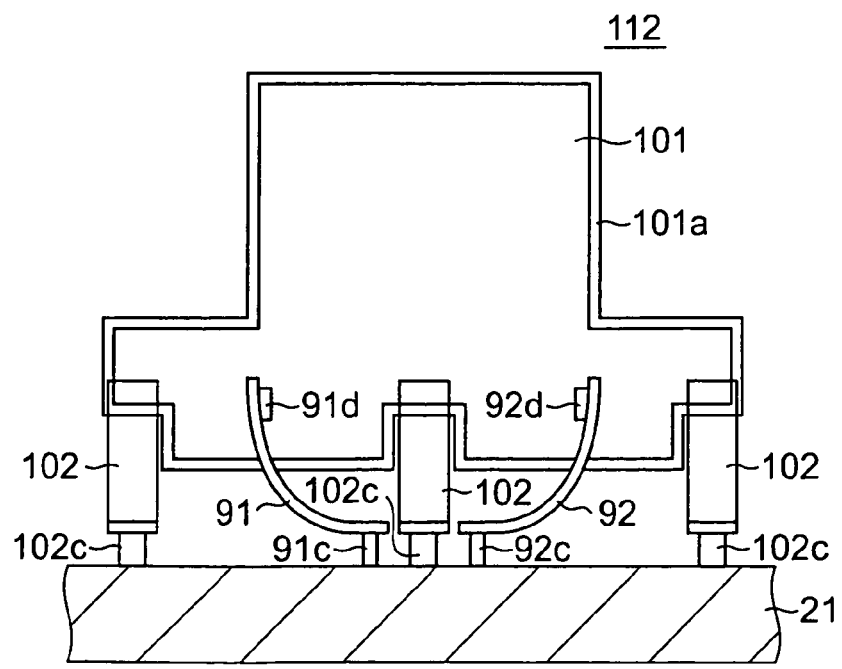
FIG. 10B is a view of the mirror 112 in FIG. 10A as seen in the direction of an arrow E.

The optical switch in the second embodiment is such that a mirror 112 in FIGS. 10A and 10B is mounted on a movable plate 21 instead of the mirror 12 of the optical switch in the first embodiment. Since the construction of the optical switch except the mirror 112 is the same as in the first embodiment, it shall be omitted from description.

Likewise to the mirror 12 in the first embodiment, the mirror 112 in the second embodiment is so constructed that a reflection portion 101 is supported by bent support portion 102. As shown in FIG. 10B, however, the reflection portion 101 is shaped so as to be bilaterally stretched out in the direction of its principal plane, and it is supported by three support portions 102. The film structure of the reflection portion 101, and that of each support portion 102 are the same as in the first embodiment.

Besides, two stop portions 91, 92 are respectively arranged between the adjacent ones of the three support portions 102 as holding portions which keep constant the angle of the reflection portion 101 relative to the movable plate 21. Each of the stop portions 91, 92 has the same film structure as that of each support portion 102, and it is bent up similarly to the support portion 102. The film surfaces of the stop portions 91, 92 are directed perpendicularly to the reflection portion 101. Therefore, the side surface 91*a* of the stop portion 91 and the side surface of the stop portion 92 (not shown in FIG. 10A) lie in touch with one surface of the reflection portion 101, and they push back the reflection portion 101 which is about to be turned to a position 101*e* indicated by a broken line in FIG. 10A, by the bending of the support portions 102.

As described in the first embodiment, the radius of curvature of the bent of the support portion 102 having the double-layer structure changes depending upon temperatures. With the mirror 12 in the first embodiment, therefore, the temperature regulation is required in order to keep a constant bent state. With the mirror 112 in the second embodiment, the length and film thicknesses of each support portion 102 are determined beforehand so that the radius of curvature of the bent of the support portion 102 may become smaller than the radius of curvature for supporting the reflection portion 101 perpendicularly to the principal plane of the movable plate 21, at or near room temperatures, in other words, that the reflection portion 101 may incline at an angle of, at least, 90 degrees as shown at the position 101*e* of the broken line in FIG. 10A, and the reflection portion 101 is pushed back to its perpendicular position by the side surface 91*a* of the stop portion 91 and the side surface of the stop portion 92 (not shown in FIG. 10A). Thus, the reflection portion 101 can be kept vertical without employing any temperature regulation element. Incidentally, also the bent states of the stop portions 91, 92 change depending upon temperatures. Since, however, the positions of the side surfaces 91*a*, etc. lying in touch with the reflection portion 101 do not change from the positions thereof at a manufactural stage, the reflection portion 101 can be always kept vertical in spite of temperature changes.

The side surfaces 91*a*, etc. of the stop portions 91, 92 can be precisely positioned to the reflection portion 101 by a photolithographic step at the manufactural stage. Therefore, the mirror 112 in the second embodiment can support the principal plane of the reflection portion 101 perpendicularly to that of the movable plate 21 at a high precision.

Incidentally, convex portions 91*d*, 92*d* which are formed by stepping the films are arranged at the distal end parts of the stop portions 91, 92 in order to enhance rigidity.

Figure 11:
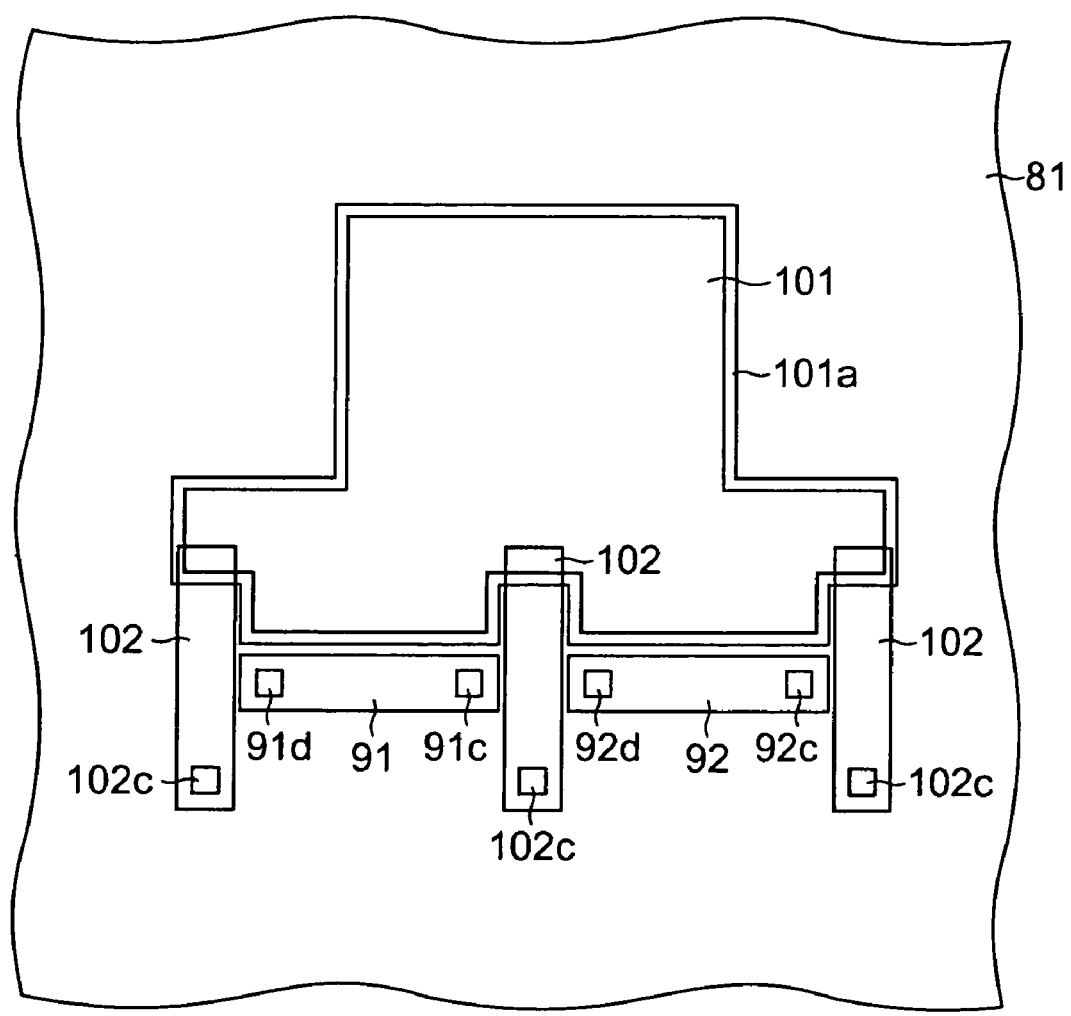
FIG. 11 is a top plan view showing the state of the mirror 112 of the optical switch in the second embodiment of the present invention, before the ashing of a manufacturing process.

Although the manufacturing process of the mirror 112 in the second embodiment is substantially the same as that of the mirror 12 in the first embodiment, the Al film of the reflection portion 101 and the silicon nitride film 102*a* and Al film 102*b* of the support portions 102 are respectively patterned into shapes as shown in FIG. 11. Besides, in patterning the support portions 102, the same silicon nitride film 102*a* and Al film 102*b* are simultaneously patterned into the shapes of the stop portions 91, 92 shown in FIG. 11. However, in a case where a resist film 82 being a sacrificial layer is processed into the shape of islands, the islands are left also at parts which are to form the convex portions 91*d*, 92*d* of the stop portions 91, 92. Thus, at the same time that the support portions 102 are bent up by removing sacrificial-layer resist films 81, 82 by ashing, the stop portions 91, 92 are also bent up into the shapes shown in FIGS. 10A and 10B, thereby to obtain the structure in which the reflection portion 101 is supported perpendicularly to the principal plane of the movable plate 21.

The optical switch in which the mirror 112 in this embodiment is mounted, can precisely hold the reflection portion 101 of high reflection factor perpendicularly to the movable plate 21 and can precisely reflect light in a desired direction, without employing any temperature regulation device.

Incidentally, the optical switch in which the mirror 112 in this embodiment is mounted may well employ a temperature regulation device similarly to the optical switch in the first embodiment. In the case of employing the temperature regulation device, the stop portions are not deformed by temperature changes, and hence, there is brought forth the advantage that the scratches of the reflection portion 101 attributed to the deformations of the stop portions are not apprehended.

Third Embodiment

Next, an optical switch in the third embodiment will be described with reference to FIG. 12.

Figure 12:
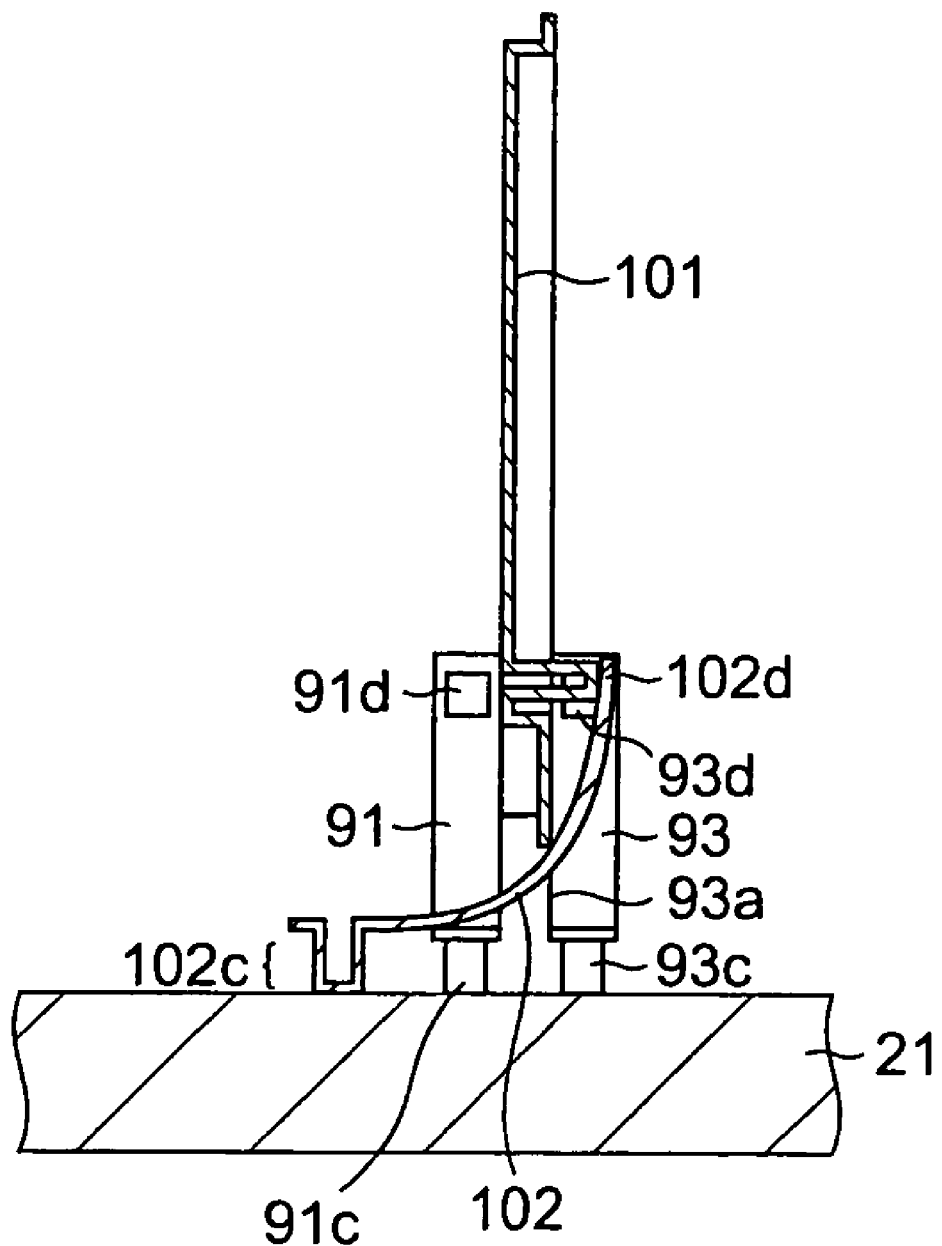
FIG. 12 is a sectional view of a mirror 113 in an optical switch in the third embodiment of the present invention.

The optical switch in the third embodiment is such that a mirror 113 in FIG. 12 is mounted on a movable plate 21 instead of the mirror 12 of the optical switch in the first embodiment. Since the construction of the optical switch except the mirror 113 is the same as in the first embodiment, it shall be omitted from description.

Figure 13:
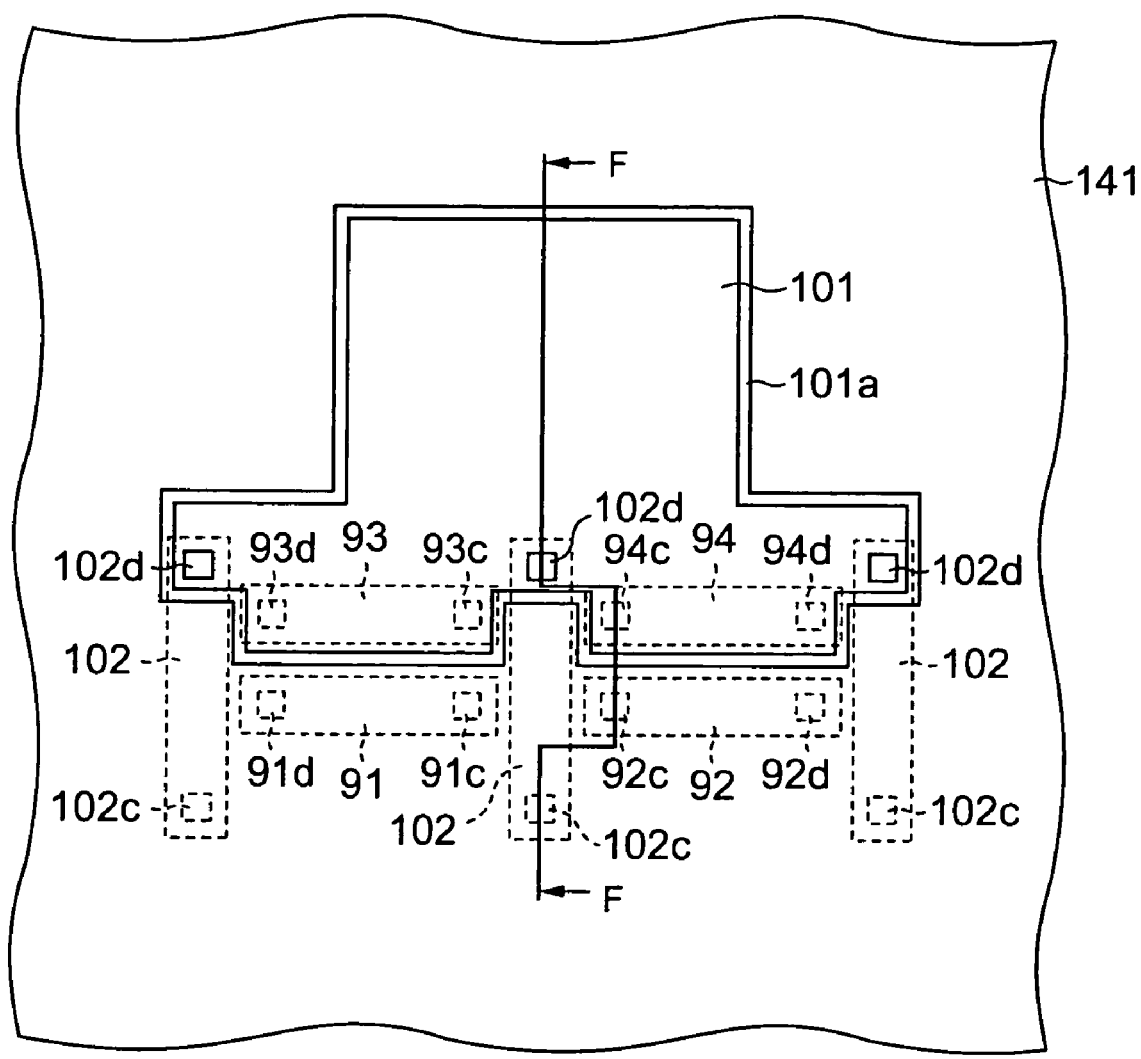
FIG. 13 is a top plan view showing the state of the mirror 113 of the optical switch in the third embodiment of the present invention, before the ashing of a manufacturing process.

Although the mirror 113 in the third embodiment is structurally similar to the mirror 112 in the second embodiment, it differs from the mirror 112 in the point that stop portions 93, 94 are further arranged at positions at which they confront respective stop portions 91, 92 with a reflection portion 101 held therebetween (the stop portion 94 is not shown in FIG. 12). The shapes of the reflection portion 101 and the stop portions 91, 92, 93, 94 before the removal of resist layers 81, 82 being sacrificial layers are shown in FIG. 13. Likewise to the stop portions 91, 92, the stop portions 93, 94 after the removal of the resist layers 81, 82 being the sacrificial layers are such that the side surface 93*a* of the stop portion 93 on the side of the reflection portion 101 and the side surface of the stop portion 94 on the side of the reflection portion 101 lie in touch with the reflection portion 101, respectively, so as to support this reflection portion 101. Accordingly, the reflection portion 101 is supported on both its sides by the stop portions 91, 92, 93, 94. Therefore, even in a case where a force has been externally exerted in the direction of throwing down the reflection portion 101 for any cause, the stop portions 91, 92, 93, 94 support the reflection portion 101, and this reflection portion 101 can be held perpendicularly to the movable plate 21. It is therefore possible to provide the mirror 113 whose strength is high against the external force.

Steps for manufacturing the mirror 113 in the third embodiment will be described with reference to FIG. 13 and FIGS. 14A–14E. Although the manufacturing process of the mirror 113 is substantially the same as that of the mirrors 12, 112 in the first and second embodiments, they differ in the point that the reflection portion 101 is formed after the patterning of the support portions 102 and the stop portions 91, 92, 93, 94.

Figure 14A:
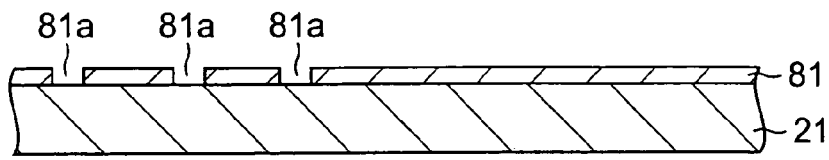
FIGS. 14A–14E are sectional views showing the manufacturing process of the mirror 113 of the optical switch in the third embodiment of the present invention, in the direction of a section F—F.
Figure 14B:
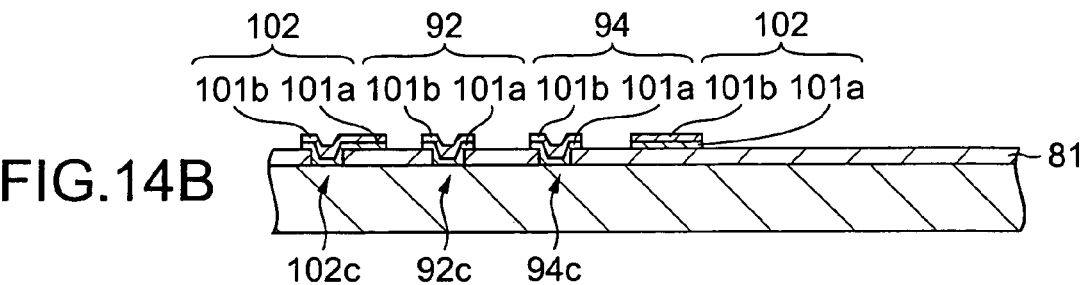
Figure 14C:
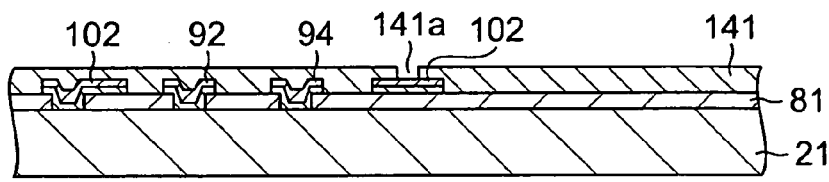
Figure 14D:
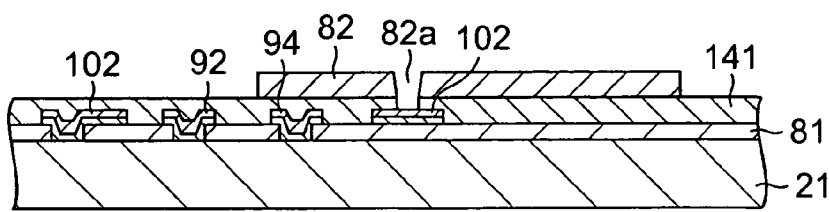
Figure 14E:
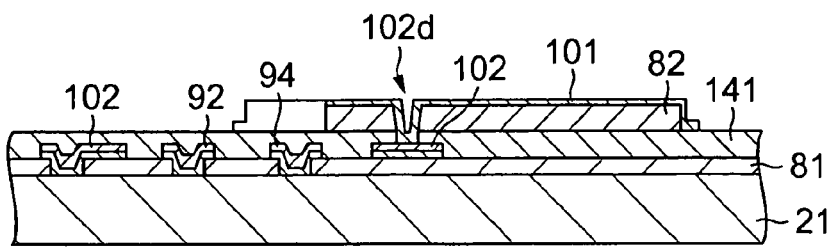

First, a resist layer 81 is formed on a movable plate 21, and openings 81*a* are photolithographically formed at positions at which the leg portions 102*c* of support portions 102, and the leg portions 91*c*, 92*c*, 93*c*, 94*c* of stop portions 91, 92, 93, 94 are to be formed (FIG. 14A). Subsequently, resist islands (not shown) are formed at those positions of the distal ends of the stop portions 91, 92, 93, 94 at which convex portions 91d, 92d, 93d, 94d are to be formed. A silicon nitride film 102a and an Al film 102b are successively formed on the whole surface of the resultant structure, and they are patterned into the shapes of the support portions 102 and the stop portions 91, 92, 93, 94 shown in FIG. 13, by photolithography and etching (FIG. 14B). Subsequently, a resist layer 141 is formed on the whole surface of the resultant structure, and openings 141a are formed at positions at which the films 102a and 102b are to become the joint portions 102d of the support portions 102 (FIG. 14C). A resist layer 82 is further formed on the resultant structure, and it is removed so as to leave the inside shape part of the rim 101a of the reflection portion 101, thereby to form a resist island. Openings 82a are formed at those positions of the resist layer 82 at which the films 102a and 102b are to become the joint portions 102d of the support portions 102 (FIG. 14D). An Al film 101 is formed on the whole surface of the resultant structure, and it is patterned into the shape of the reflection portion 101 by photolithograhy and etching (FIG. 14D and FIG. 13). Lastly, the resist layers 81, 141, 82 being sacrificial layers are removed by ashing. Thus, the support portions 102 and the stop portions 91, 92, 93, 94 rise up, and the mirror 113 in FIG. 12 can be manufactured.

Fourth Embodiment

Next, an optical switch in the fourth embodiment will be described with reference to FIG. 15A.

Figure 15A:
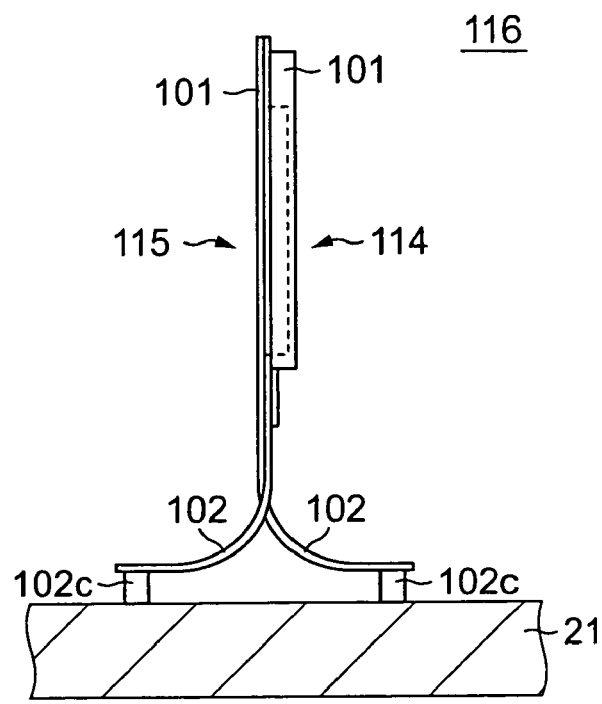

The optical switch in the fourth embodiment is such that a mirror 116 in FIG. 15A is mounted on a movable plate 21 instead of the mirror 12 of the optical switch in the first embodiment. Since the construction of the optical switch except the mirror 116 is the same as in the first embodiment, it shall be omitted from description.

Figure 15B:
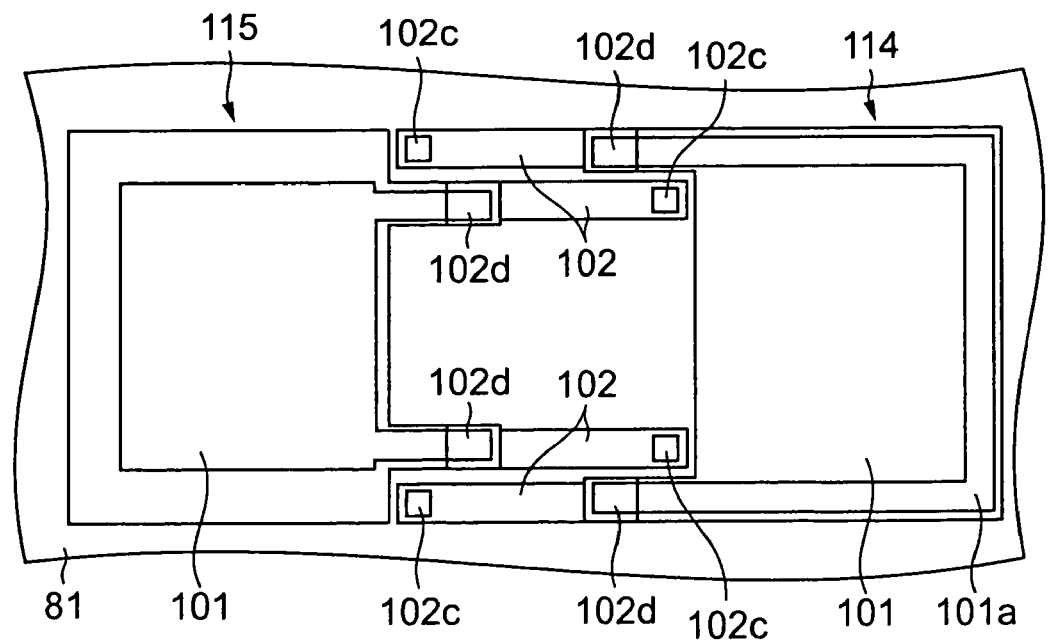
FIG. 15B is a top plan view showing the state of the mirror 116 of the optical switch in the fourth embodiment of the present invention, before the ashing of a manufacturing process.

The mirror 116 in the fourth embodiment is so constructed that two mirrors 114, 115 are placed one over the other and are raised up. The two mirrors 114, 115 are so constructed that reflection portions 101 are respectively supported by two support portions 102. As shown in FIG. 15B, however, in case of patterning at a manufactural stage, the mirror 114 forms the stepped structure of a rim 101a so that the reflective surface of the reflection portion 101 may become a concave surface, whereas the mirror 115 forms the stepped structure of a rim 101a so that the reflective surface of the reflection portion 101 may become a convex surface. Besides, each of the support portions 102 of the mirrors 114, 115 has its film thicknesses and length designed so as to bend into a state where the reflection portion 101 is inclined and supported at an angle of, at least, 90 degrees at room temperatures. Accordingly, when resist layers 81, etc. being sacrificial layers are removed, both the two mirrors 114, 115 are about to incline to the angles of, at least, 90 degrees owing to the bending of the support portions 102. Therefore, the mirrors 114, 115 collide against each other at their positions at which they have reached angles of 90 degrees, and inclining forces are balanced, thereby to establish an equilibrium in a state where the two reflection portions 101 are perpendicular to the movable plate 21. On this occasion, the concave and convex shapes of the reflection portions 101 of the mirrors 114, 115 mesh with each other, so that the mirrors 114, 115 come into close contact and become difficult to slip out.

In this manner, the mirror 116 in the fourth embodiment can provide the mirror 116 in which the principal planes of the reflection portions 101 are held perpendicularly to the movable plate 21 by the balance between the bending forces of the support portions 102.

Incidentally, the mirror 116 in the fourth embodiment is such that the mirrors 114, 115 have the reflection portions 101 in the concave and convex shapes adapted to mesh with each other, but such a configuration is not restrictive. It is also possible to employ, for example, a configuration in which only one of the mirrors includes the reflection portion 101 in the convex shape, while the reflection portion 101 of the other mirror has only the rim 101a and is centrally open. Moreover, the reflection portions 101 of the mirrors 114, 115 need not be in the shapes meshing with each other, but both the reflection portions 101 can be made flat.

Fifth Embodiment

Next, an optical switch in the fifth embodiment will be described with reference to FIG. 16.

Figure 16:
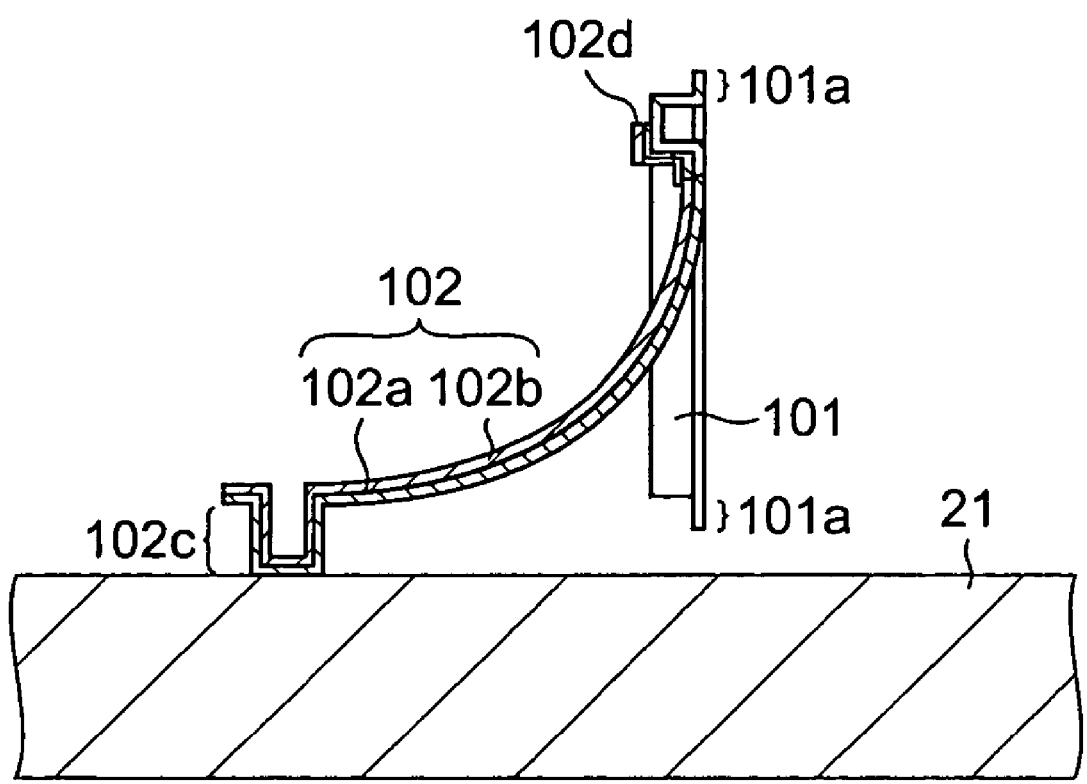
FIG. 16 is a sectional view of a mirror 117 in an optical switch in the fifth embodiment of the present invention.

The optical switch in the fifth embodiment is such that a mirror 117 in FIG. 16 is mounted on a movable plate 21 instead of the mirror 12 of the optical switch in the first embodiment. Since the construction of the optical switch except the mirror 117 is the same as in the first embodiment, it shall be omitted from description.

Figure 17:
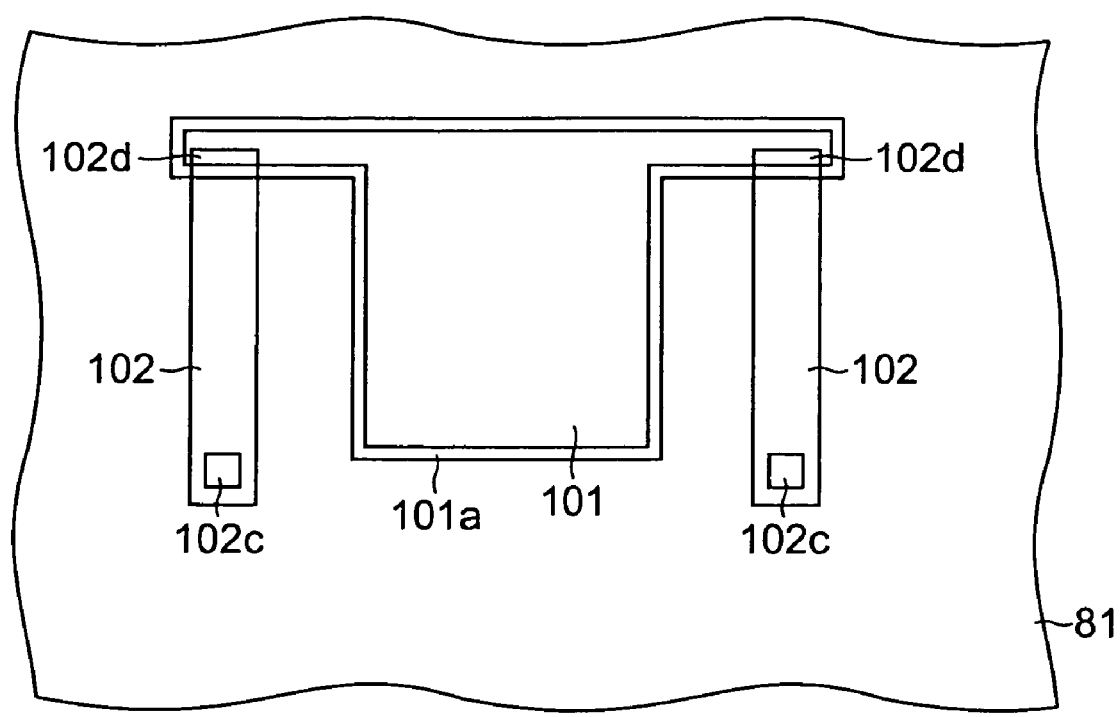
FIG. 17 is a top plan view showing the state of the mirror 117 of the optical switch in the fifth embodiment of the present invention, before the ashing of a manufacturing process.

The mirror 117 in the fifth embodiment is in such a configuration that a reflection portion 101 is hung down (toward the movable plate 21) from two support portions 102. With this structure, the height of the reflection portion 102 from the movable plate 21 is low, to bring forth the advantage that the reflection portion 102 is difficult to vibrate even in a case where the movable plate 21 has moved. Although the manufacturing process of the mirror 117 is similar to that of the mirror 12 in the first embodiment, the reflection portion 101 and the support portions 102 are patterned into shapes as shown in FIG. 17 in the manufacture.

Incidentally, the optical switch in this embodiment should preferably employ a temperature regulation device likewise to the optical switch in the first embodiment.

Sixth Embodiment

Next, an optical switch in the sixth embodiment will be described with reference to FIGS. 18A and 18B.

Figure 18A:
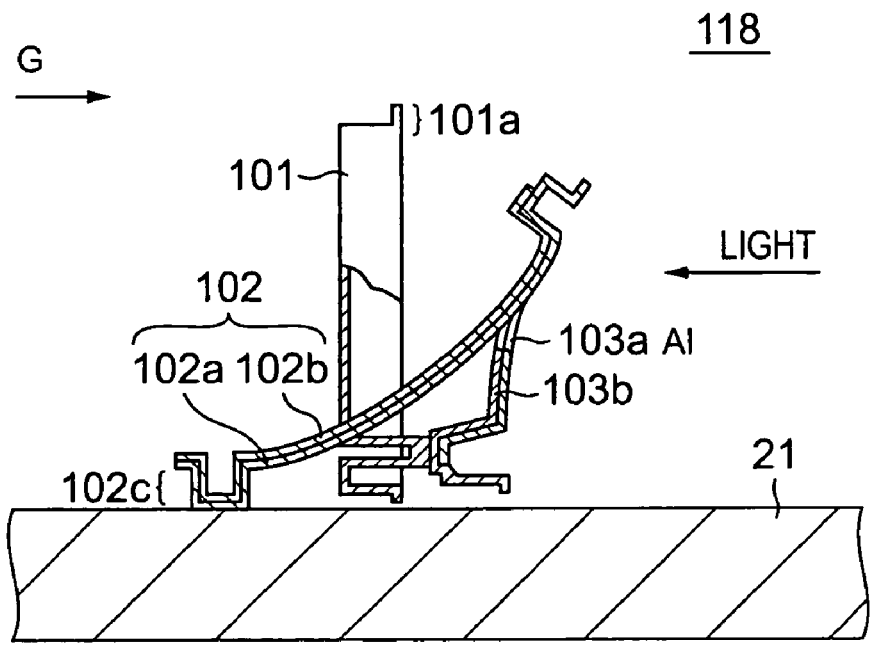
Figure 18B:
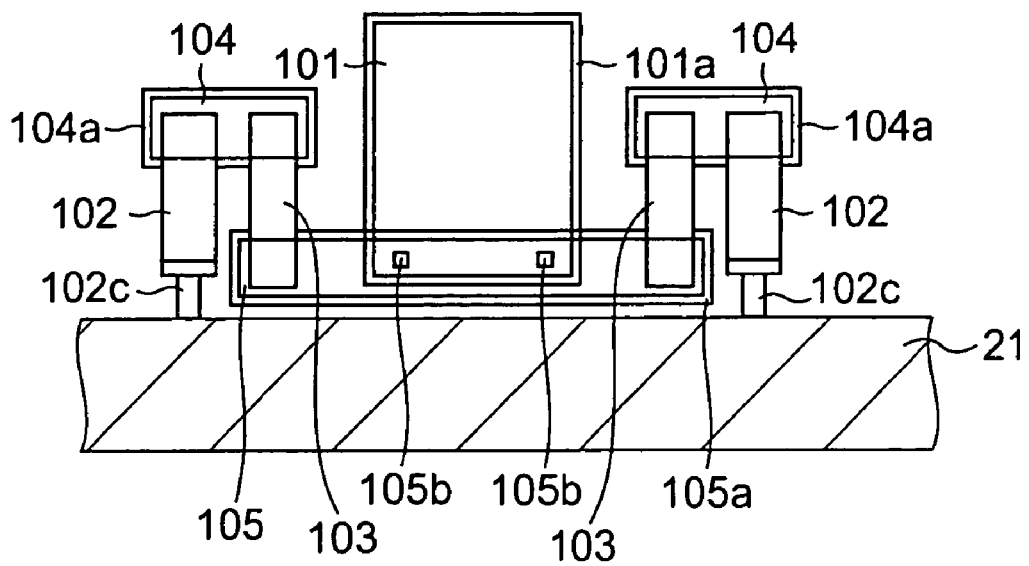
FIG. 18B is a view of the mirror 118 as seen in the direction of an arrow G in FIG. 18A.

The optical switch in the sixth embodiment is such that a mirror 118 in FIGS. 18A and 18B is mounted on a movable plate 21 instead of the mirror 12 of the optical switch in the first embodiment. Since the construction of the optical switch except the mirror 118 is the same as in the first embodiment, it shall be omitted from description.

As shown in FIGS. 18A and 18B, the mirror 118 in the sixth embodiment is so constructed that support portions 103 are further joined to two support portions 102 through respective joint portions 204, and that the two support portions 103 support a reflection-portion support portion 105. A reflection portion 101 is mounted on the reflection-portion support portion 105. Therefore, the reflection portion 101 has a structure in which it is supported on its lower side by the reflection-portion support portion 105. Likewise to the support portions 102, the support portions 103 have a structure in which an Al film 103a and a silicon nitride film 103b are stacked. In the support portions 103, however, the Al film 103a and the silicon nitride film 103b are stacked in an order reverse to the stacking order of these films in the support portions 102 so that the bending of the support portions 103 may become upwardly convex reversely to the bending direction of the support portions 102.

Although the construction of the mirror 118 resembles that of the mirror 117 (FIG. 16) in the fifth embodiment, it differs in the point that the reflection portion 101 is supported from below, and the point that the reflection portion 101 is arranged at a position near the leg portions 102c of the support portions 102. For this reason, the mirror 118 has the feature that the reflection portion 101 is difficult to vibrate. Incidentally, the reflection portion 101 of the mirror 118 has the tendency that its surface having confronted the side of the movable plate 21 at a manufactural stage exhibits a higher mirror finishability, accordingly a higher reflection factor. Consequently, the surface of the reflection portion 101 having confronted the side of the movable plate 21 at the manufactural stage should preferably be employed as a light reflection surface. Therefore, the mirror 118 should desirably be mounted on the movable plate 21 so as to enter light in a direction indicated in FIG. 18A.

Figure 19:
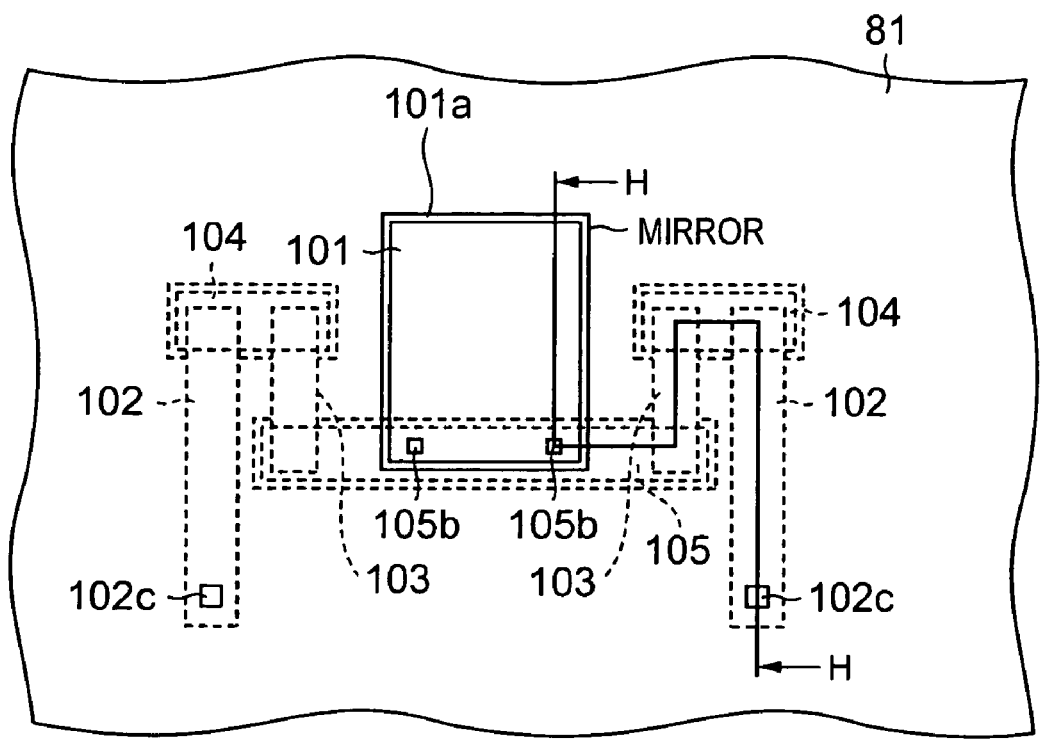
FIG. 19 is a top plan view showing the state of the mirror 118 of the optical switch in the sixth embodiment of the present invention, before the ashing of a manufacturing process.

The manufacturing process of the mirror 118 in this embodiment will be described with reference to FIGS. 20A–20C and FIGS. 21A–21C. Support portions 102, 103, joint portions 104, a reflection-portion support portion 105, and a reflection portion 101 are patterned into an arrangement and shapes as shown in FIG. 19. FIGS. 20A–20C and FIGS. 21A–21C show the manufacturing process seen along a section H—H in FIG. 19. By the way, in this embodiment, the silicon nitride films 102a of the individual support portions 102, the silicon nitride films 103b of the individual support portions 103, the joint portions 104, and the reflection-portion support portion 105 are simultaneously formed by patterning a single-layer silicon nitride film.

First, a resist layer 81 is formed on a movable plate 21, and openings 81a are photolithographically formed at positions at which the leg portions 102c of support portions 102 are to be formed (FIG. 20A). Subsequently, resist islands 201 are formed at positions at which the joint portions 104 and the reflection-portion support portion 105 are to be formed (FIG. 20B). Subsequently, the Al film 103a of the support portions 103 is formed, and it is patterned into the shapes of the support portions 103 in FIG. 19 by photolithography and etching (FIG. 20C). Subsequently, the silicon nitride film and an Al film 102b are successively formed (FIG. 21A). After the formed Al film 102b is patterned into the shapes of the support portions 102 in FIG. 19, the silicon nitride film is patterned into the shapes of the support portions 102, joint portions 104, support portions 103 and reflection-portion support portion 105 (FIG. 21B). Thus, the silicon nitride films 103b of the individual support portions 103, the joint portions 104 and the reflection-portion support portion 105 are formed at one time.

A resist layer 141 is formed on the whole surface of the resultant structure, and openings are formed at positions at which the silicon nitride film and the Al film are to become the joint portions 105b of the reflection-portion support portion 105. A resist layer 82 is further formed on the resultant structure, and it is removed so as to leave the inside shape part of the rim 101a of the reflection portion 101, thereby to form a resist island. After openings are formed at those positions of the resist layer 82 at which the silicon nitride film and the Al film are to become the joint portions 105b of the reflection-portion support portion 105, an Al film 101 is formed on the whole surface of the resultant structure, and it is patterned into the shape of the reflection portion 101 (FIG. 21C). Lastly, the resist layers 81, 141, 82 being sacrificial layers are removed by ashing. Thus, the support portions 102 and the support portions 103 bend up, and the mirror 118 in FIGS. 18A and 18B can be manufactured.

Seventh Embodiment

Next, an optical switching device 1 which employs optical switches in any of the first–sixth embodiments described above will be described as the seventh embodiment with reference to FIG. 22.

Figure 22:
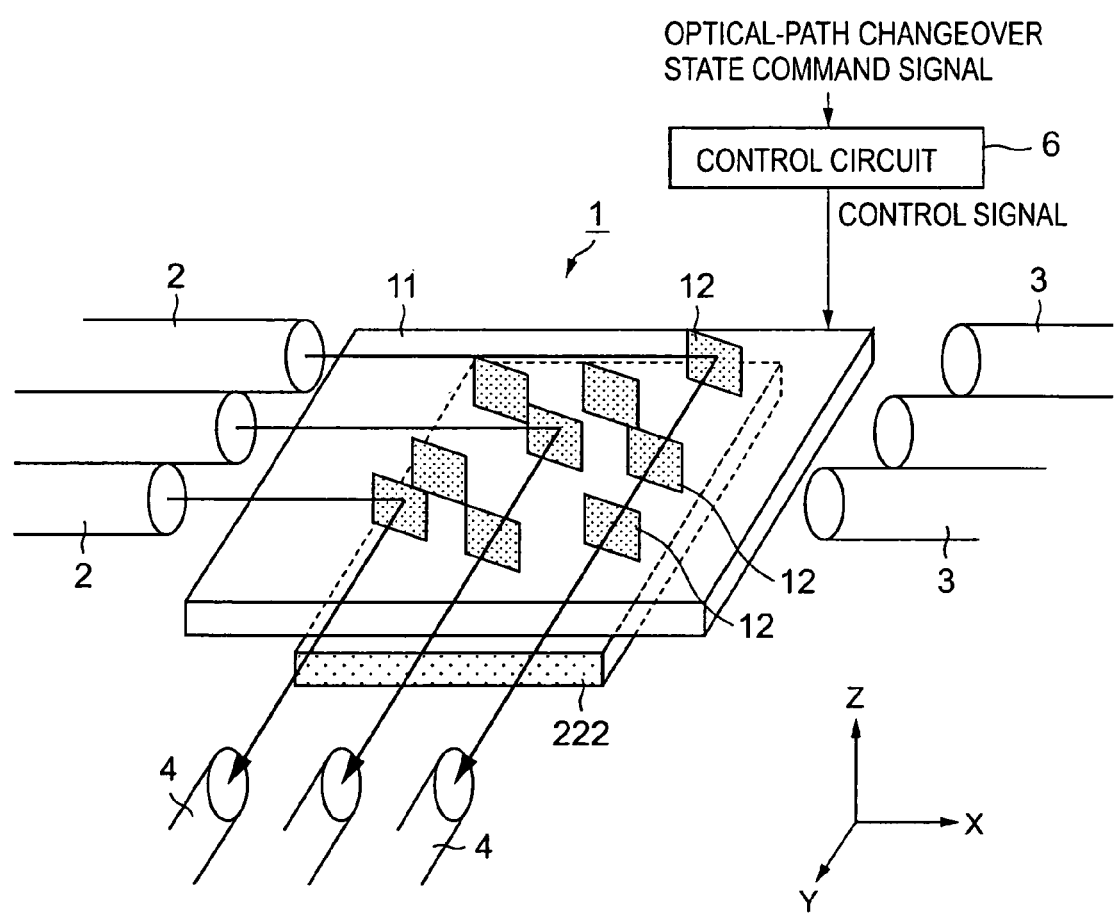
FIG. 22 is an explanatory view showing an optical switching device in the seventh embodiment of the present invention.

The optical switching device 1 in FIG. 22 is so constructed that the optical switches in the first embodiment are longitudinally and latitudinally arrayed on the substrate 11, and that the Peltier element is arranged as a temperature adjustment device 222 under the substrate 11. Optical fibers 2 from which light beams to be switched emerge are juxtaposed along one latus of the substrate 11, and they are so located that the mirrors 12 of the optical switches lie on the optical paths of the emergent light beams, respectively. Further, optical fibers 4 are juxtaposed at positions at which light beams reflected by the mirrors 12 are entered into these optical fibers 4, along another latus of the substrate 11. In addition, at positions which are opposite to the optical fibers 2 with the substrate 11 held therebetween, optical fibers 3 are arranged so that the light beams emergent from the optical fibers 2 may be entered into these optical fibers 3 when they have passed over the mirrors 12.

Besides, the optical switching device 1 in this embodiment includes a control circuit 6 which controls voltages that are applied between the electrodes 23a of the individual optical switches and the substrate 11.

With the optical switching device 1 in this embodiment, therefore, in a case where the control circuit 6 applies the voltage V between the electrode 23a of the optical switch and the substrate 11, the movable plate 21 lies at the bottom of the recess 13 as shown in FIG. 6, and hence, the mirror 12 is drawn into the recess 13. Therefore, the light beam emergent from the optical fiber 2 passes over the mirror 12, and it is entered into the optical fiber 3 so as to propagate through this optical fiber 3. On the other hand, in a case where the control circuit 6 does not apply the voltage V between the electrode 23a of the optical switch and the substrate 11, the movable plate 21 lies at the upper surface position of the substrate 11, and hence, the mirror 12 protrudes over the substrate 11 so as to be inserted into the optical path. Therefore, the light beam emergent from the optical fiber 2 is reflected by the mirror 12, and it is entered into the optical fiber 4 so as to propagate through this optical fiber 4.

Accordingly, the light beams emergent from the three optical fibers 2 can be switched independently of one another and entered into the optical fibers 4 or optical fibers 3 in such a way that the control circuit 6 controls the application of the voltage V for the individual optical switches constituting the optical switching device 1.

Besides, although FIG. 22 illustrates the example in which the optical switching device 1 is constructed of the optical switches each employing the mirror 12 in the first embodiment, an optical switching device 1 can be similarly constructed of the optical switches in any of the second-sixth embodiments. By the way, in case of employing the optical switches in any of the second-fourth and sixth embodiments, it is possible to adopt a construction which does not include the temperature regulation device 222.

Since the optical switching device 1 in FIG. 22 employs the optical switches in any of the first–sixth embodiments, the reflection factor of the reflection portion 101 of each mirror 12 is high, and the reflective surface thereof can be kept perpendicular to the principal plane of the substrate 11 at a high precision. Thus, the optical switching device 1 can reflect the light beam at the high reflection factor and precisely enter the light beam into the end faces of the optical fiber 3 or optical fiber 4, so that an optical loss is little.

Eighth Embodiment

Next, there will be described an optical switch having another construction which employs the mirror in any of the first–sixth embodiments described above.

Figure 23:
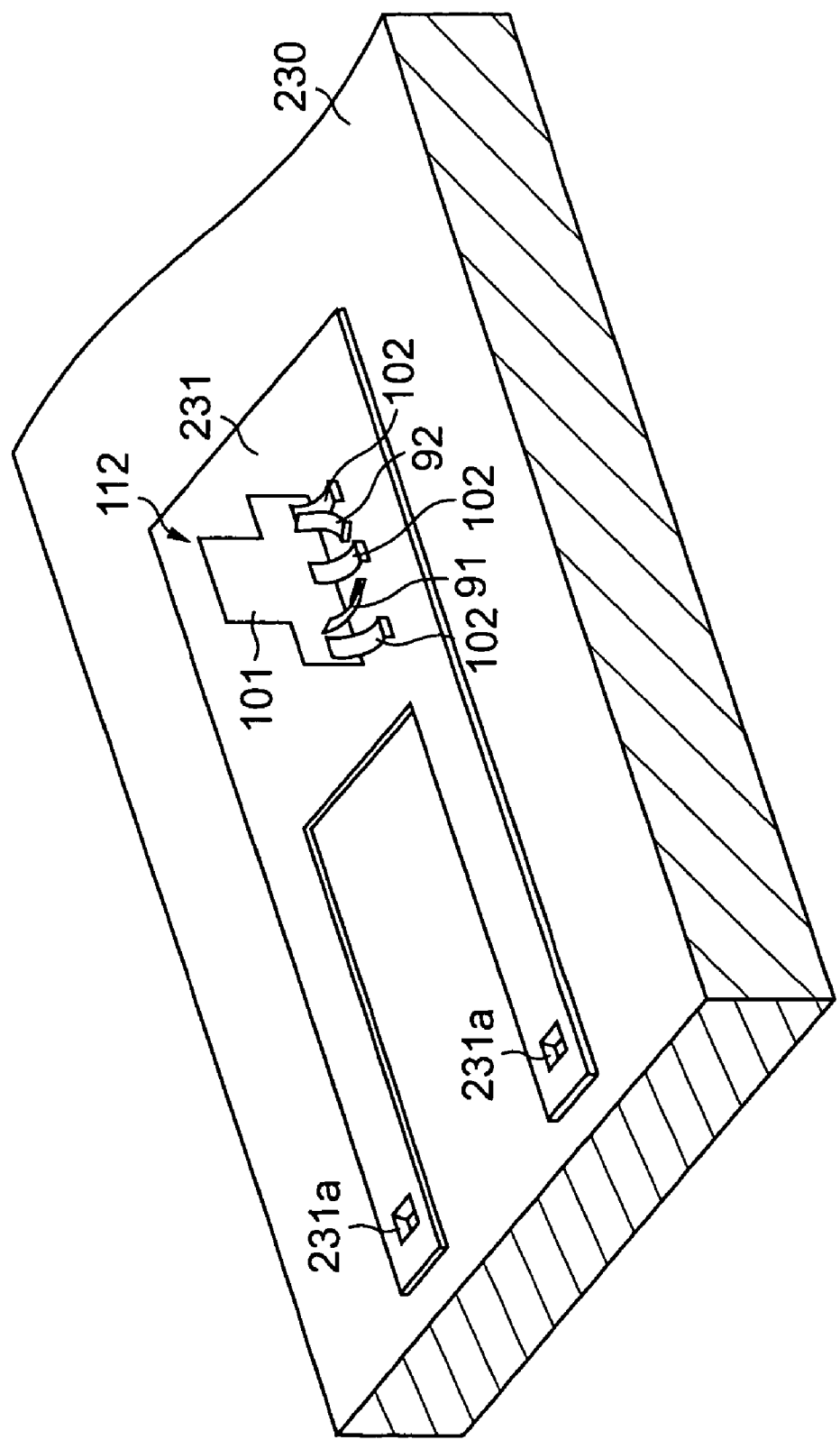
FIG. 23 is a perspective view showing the construction of a movable plate 231 in an optical switch in the eighth embodiment of the present invention.
Figure 25A:
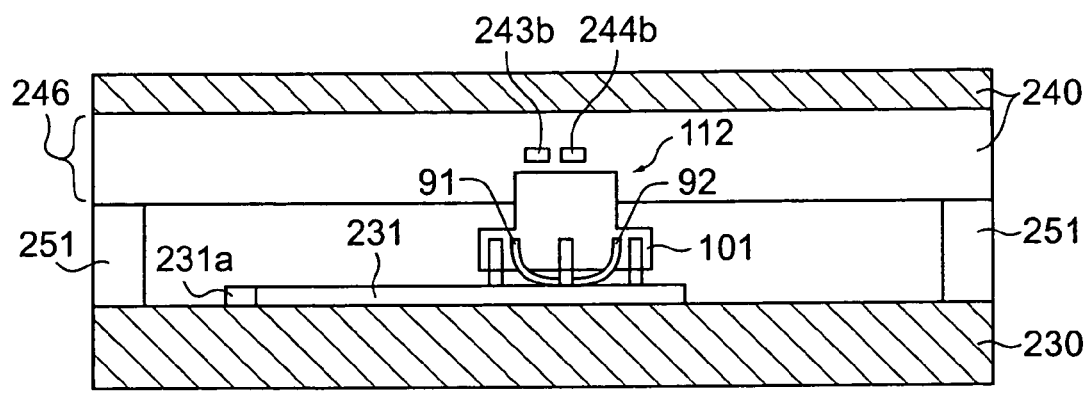

As shown in FIG. 23, the optical switch in this embodiment is so constructed that a movable plate 231 is arranged on a substrate 230, and that the mirror in any of the first–sixth embodiments is mounted on the movable plate 231. Illustrated here is an example in which the mirror 112 in the second embodiment is mounted. Likewise to each of the support portions 102 in the first–sixth embodiments, the movable plate 231 is constructed of a double-layer film which consists of a silicon nitride film and an Al film. The movable plate 231 is connected to the substrate 230 by leg portions 231a provided at the one-end parts thereof. Besides, although not shown, an electrode is formed inside the substrate 230, and its surface is covered with an insulating film. Therefore, when a voltage is applied between the Al film of the movable plate 231 and the electrode inside the substrate 230, the movable plate 231 is attracted to the substrate 230 by an electrostatic force, thereby to come into close contact with the substrate 230 as shown in FIG. 25A. On the other hand, in a state where the voltage is not applied between the Al film of the movable plate 231 and the electrode inside the substrate 230, the movable plate 231 is bent as shown in FIG. 25B by the stresses of the silicon nitride film and the Al film.

Figure 24:
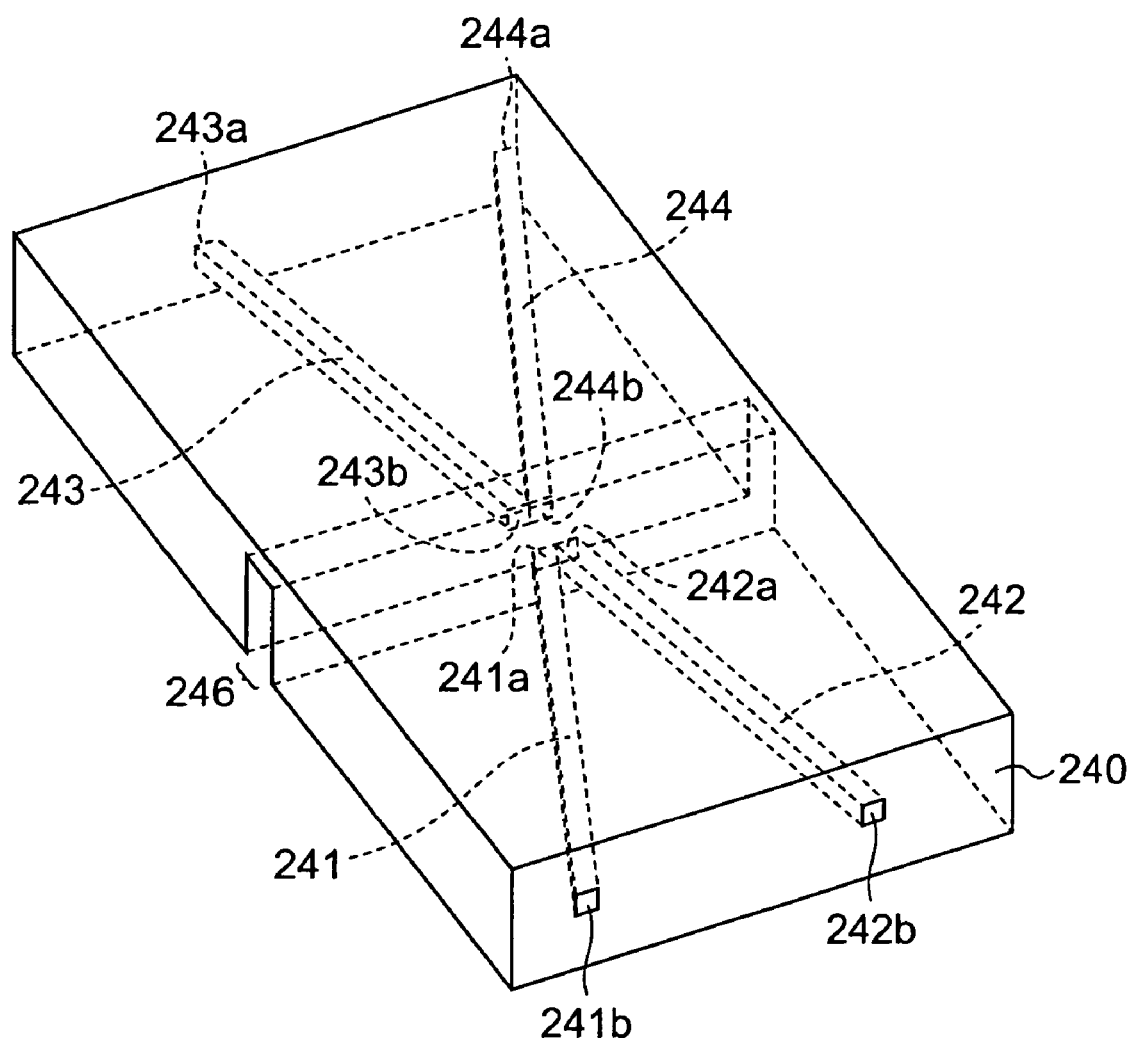
FIG. 24 is a perspective view showing the construction of an optical waveguide substrate 240 in the optical switch in the eighth embodiment of the present invention.

Besides, as shown in FIG. 24, the optical switch in this embodiment includes an optical waveguide substrate 240 which is provided with four optical waveguides 241, 242, 243, 244 that propagate light to-be-switched. The optical waveguide substrate 240 is centrally provided with a groove 246 whose width is on the order of several tens μm, and the end faces 241a, 242a, 243b, 244b of the respective optical waveguides 241, 242, 243, 244 are exposed to the side surfaces of the groove 246. The interval between the end faces 241a and 242a, and the interval between the end faces 243b and 244b are designed to be intervals which can be covered by the reflection portion 101 of the mirror 112 as shown in FIGS. 25A and 25B.

Figure 25B:
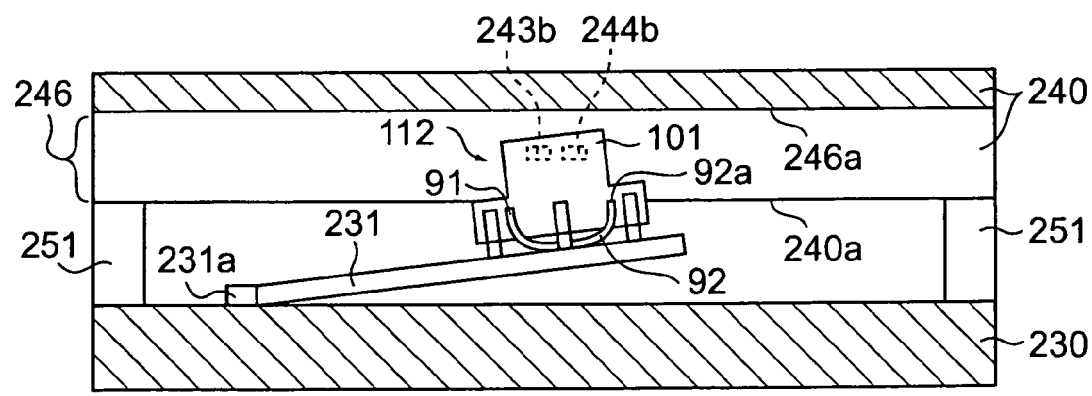
FIG. 25B is a sectional view showing the construction of optical switch in the eighth embodiment of the present invention, in the case where the voltage is not applied.

As shown in FIGS. 25A and 25B, the optical waveguide substrate 240 is mounted on the substrate 230 for the movable plate 231 through a spacer 251, whereby the optical switch is finished up. On this occasion, the optical waveguide substrate 240 is positioned to the substrate 230 so that the reflection portion 101 of the mirror 112 may be inserted into the groove 246.

Thus, in the state where the voltage is applied between the Al film of the movable plate 231 and the electrode inside the substrate 230, the movable plate 231 is electrostatically attracted to the substrate 230 as shown in FIG. 25A, and the reflection plate 101 of the mirror 112 lies below the end faces 243b, 244b of the respective optical waveguides 243, 244. Accordingly, in a case, for example, where light is entered from the end face 243a of the optical waveguide 243, the light having propagated through this optical waveguide 243 is emitted from the end face 243b, the emitted light is directly entered into the end face 242a of the opposing optical waveguide 242, and the entered light propagates through this optical waveguide 242 so as to be emitted from the end face 242b thereof. Besides, in a case, for example, where light is entered from the end face 241b of the optical waveguide 241, the light having propagated through this optical waveguide 241 is emitted from the end face 241a, the emitted light is directly entered into the end face 244b of the opposing optical waveguide 244, and the entered light propagates through this optical waveguide 244 so as to be emitted from the end face 244a thereof.

On the other hand, in the state where the voltage is not applied between the Al film of the movable plate 231 and the electrode inside the substrate 230, the movable plate 231 is bent as shown in FIG. 25B by the stresses of the silicon nitride film and the Al film, and the reflection plate 101 of the mirror 112 lies so as to conceal the end faces 243b, 244b of the respective optical waveguides 243, 244. Accordingly, in the case, for example, where light is entered from the end face 243a of the optical waveguide 243, the light having propagated through this optical waveguide 243 is emitted from the end face 243b, the emitted light is reflected by the reflection portion 101 of the mirror 112 so as to be entered into the end face 244b of the optical waveguide 244, and the entered light propagates through this optical waveguide 244 so as to be emitted from the end face 244a. Besides, in the case, for example, where light is entered from the end face 241b of the optical waveguide 241, the light having propagated through this optical waveguide 241 is emitted from the end face 241a, the emitted light is reflected by the reflection portion 101 of the mirror 112 so as to be entered into the end face 242a of the optical waveguide 242, and the entered light propagates through this optical waveguide 242 so as to be emitted from the end face 242b.

Besides, when the movable plate 231 lies on the upper side as shown in FIG. 25S, the stop portions 91, 92 of the mirror 112 protrude on this side. Therefore, the upper end 92a of the stop portion 92 touches the lower surface 240a of the optical waveguide substrate 240, and it functions as a stopper which prevents the reflection portion 101 of the mirror 112 from coming into the groove 246 in excess of its position indicated in FIG. 25B. Thus, the upper end of the reflection portion 101 of the mirror 112 is prevented from colliding against the upper surface 246a of the groove 246, so that the reflection portion 101 is not apprehended to be deformed. Accordingly, the reflective surface of the reflection portion 101 can be kept perpendicular to the principal planes of the substrates 230, 240, and the light can be reflected in a desired direction at a high precision.

Incidentally, as the construction of the optical switch in this embodiment, the mirror 112 can be replaced with the mirror 12 in the first embodiment or with any of the mirrors 113, 116, 117, 118 in the third-sixth embodiments, As thus far described, each of the optical switches in the first–eighth embodiments is so constructed that, as the reflection portion 101 of the mirror, the thin film is vertically raised by the support portion(s) 102. Therefore, the principal plane of the thin film can be employed as the reflective surface of the reflection portion 101. Accordingly, the reflective surface can be smoothly formed with ease, so that a high reflection factor can be attained. Besides, since the support portion 102 has the structure in which the two thin films are stacked, both the reflection portion 101 and the support portion 102 can be manufactured by a thin-film manufacturing process, to bring forth the advantage that the manufacture is easy. Moreover, in each of the embodiments, the resist films of photosensitive resin are employed as the sacrificial layers for causing the support portion 102 and the reflection portion 101 to rise up. As compared with a case of employing an inorganic oxide film or nitride film, therefore, each embodiment can remove the sacrificial layers more easily by the ashing step without using any special equipment. Accordingly, the mirror can be manufactured more easily.

Besides, in each of the foregoing embodiments, the movable plate 21 or 231 on which the mirror is mounted is driven by the electrostatic force. However, the method of driving the movable plate 21 or 231 is not restricted to the electrostatic force, but it can be incarnated by another technique. By way of example, a Lorentz force can be utilized.

Besides, although the reflection portion 101 is formed of the Al film in each of the foregoing embodiments, it is of course possible to employ another material such as Au (gold). Further, the film construction of the support portion 102 is not restricted to the construction consisting of the Al film and the silicon nitride film in each embodiment, but films of other materials or a film construction consisting of three or more layers can be adopted as long as a necessary bent state is realized.

Ninth Embodiment

An optical switch in the ninth embodiment will be described with reference to FIG. 26, FIGS. 36A and 36B, FIG. 37–FIG. 39, and FIGS. 40A and 40B.

Figure 39:
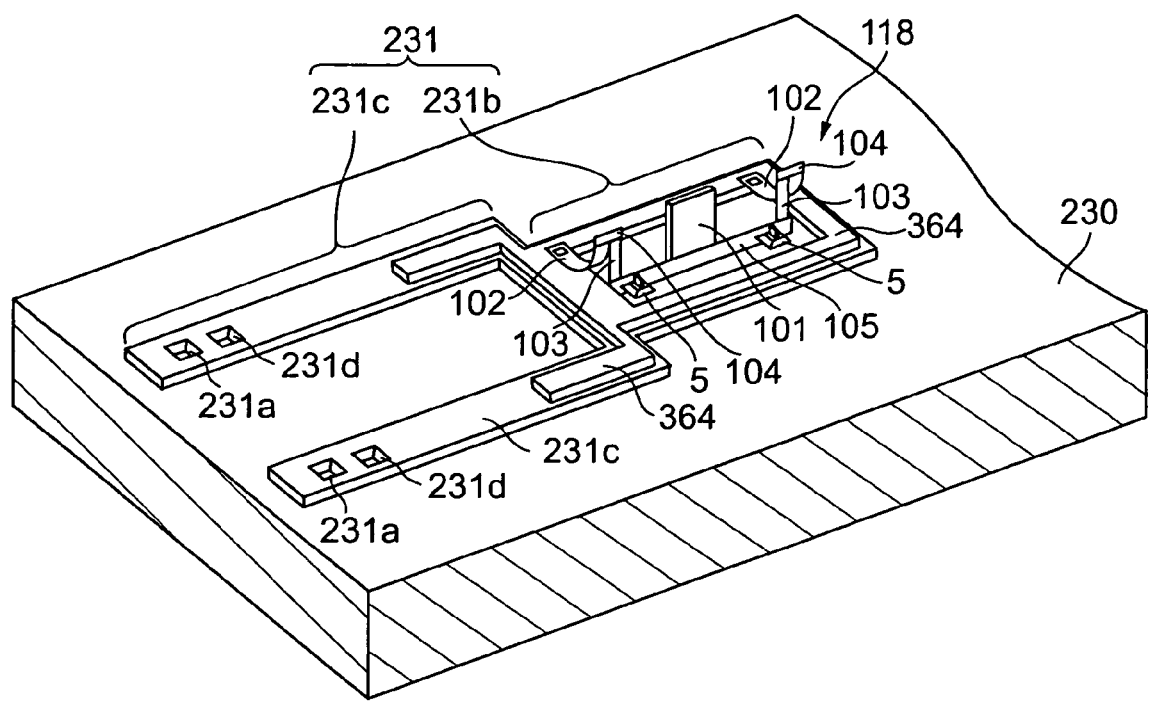
FIG. 39 is a perspective view of the movable plate 231 of the optical switch in the ninth embodiment of the present invention.
Figure 40A:
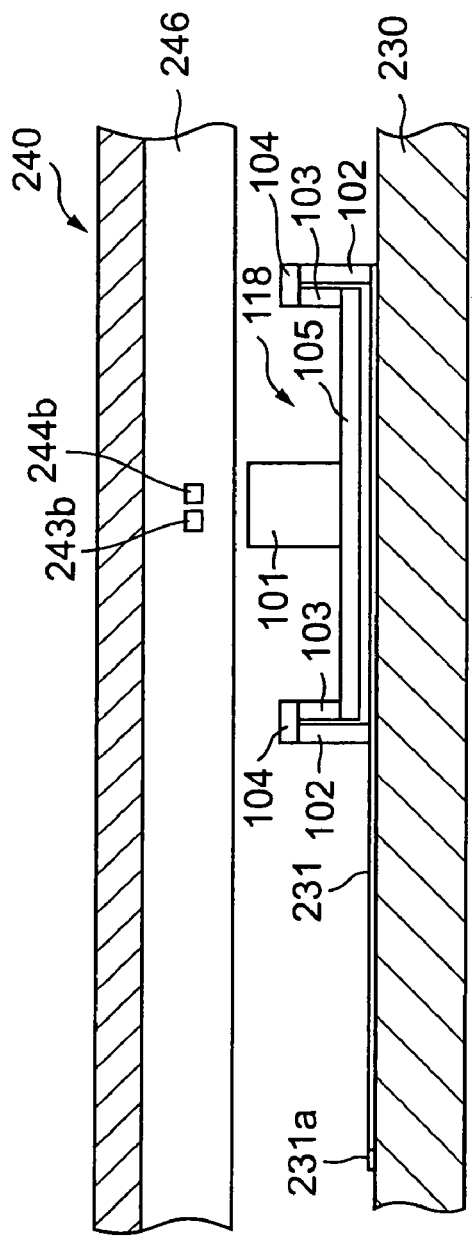
Figure 40B:
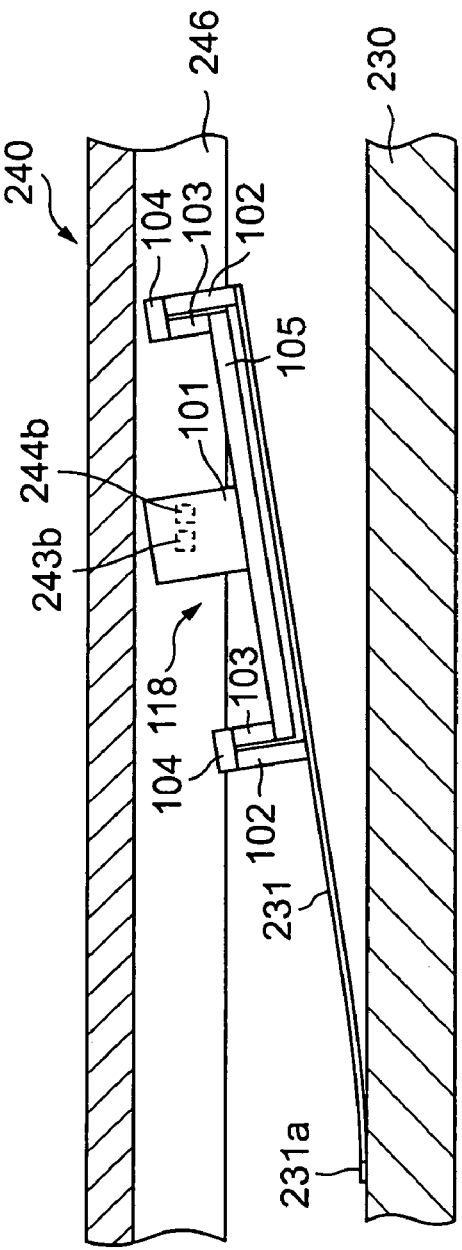
FIG. 40B is a sectional view showing the construction in the state where the movable plate 231 raises the mirror 118.

As shown in FIGS. 40A and 40B, the optical switch in this embodiment is an optical switch similar to the eighth embodiment in which the mirror 118 in the sixth embodiment as shown in FIGS. 18A and 18B is mounted on the movable plate 231, but it differs from the eighth embodiment in the following three points: First, the movable plate 231 is constructed so as to be driven using an electrostatic force and a Lorentz force. Secondly, as shown in FIG. 39, the movable plate 231 is provided with a convex portion 364 which surrounds a part where the mirror 118 is mounted. Owing to the provision of such a convex portion 364, the bending of the part of the movable plate 231 where the mirror 118 is mounted is suppressed so as to keep this part flat. Thirdly, the optical switch in this embodiment is no constructed that, as shown in FIG. 26, two thin-film multi-level structures 5 are mounted as holding portions on the movable plate 231, thereby to hold the sense of the reflection portion 101 of the mirror 118 constant.

First, the construction of the movable plate 231 will be described. In the eighth embodiment described above, the movable plate 231 has the double-layer structure consisting of the silicon nitride film and the Al film, whereas in this embodiment, the movable plate 231 is made of a triple-layer film in which a silicon nitride film 361, an Al film 362 and a silicon nitride film 363 are successively stacked as shown in FIG. 36B. The movable plate 231 is formed under predetermined film thicknesses and film formation conditions so as to be bent upwards relative to the substrate 230 at room temperatures by an internal stress which develops due to the difference between the coefficients of thermal expansion of the silicon nitride films 361, 363 and the Al film 362, and internal stresses which have developed during film formation.

As shown in FIG. 39, the movable plate 231 includes a rectangular mirror mount plate 231b for mounting the mirror 118, and two beltlike support plates 231c connected to the end part of the mirror mount plate 231b. Each of the support plates 231c has a leg portion 231a and a leg portion 231d at its end part. Both the leg portions 231a and 231d are fixed to the substrate 230. With the movable plate 231, accordingly, the side of the mirror mount plate 231b rises up as shown in FIG. 40B, in the same manner as in the optical switch in the eighth embodiment, with the leg portions 231a, 231d used as fixed ends, whereby the mirror 118 can be inserted into the groove 246 of an optical waveguide substrate 240.

Figure 36A:
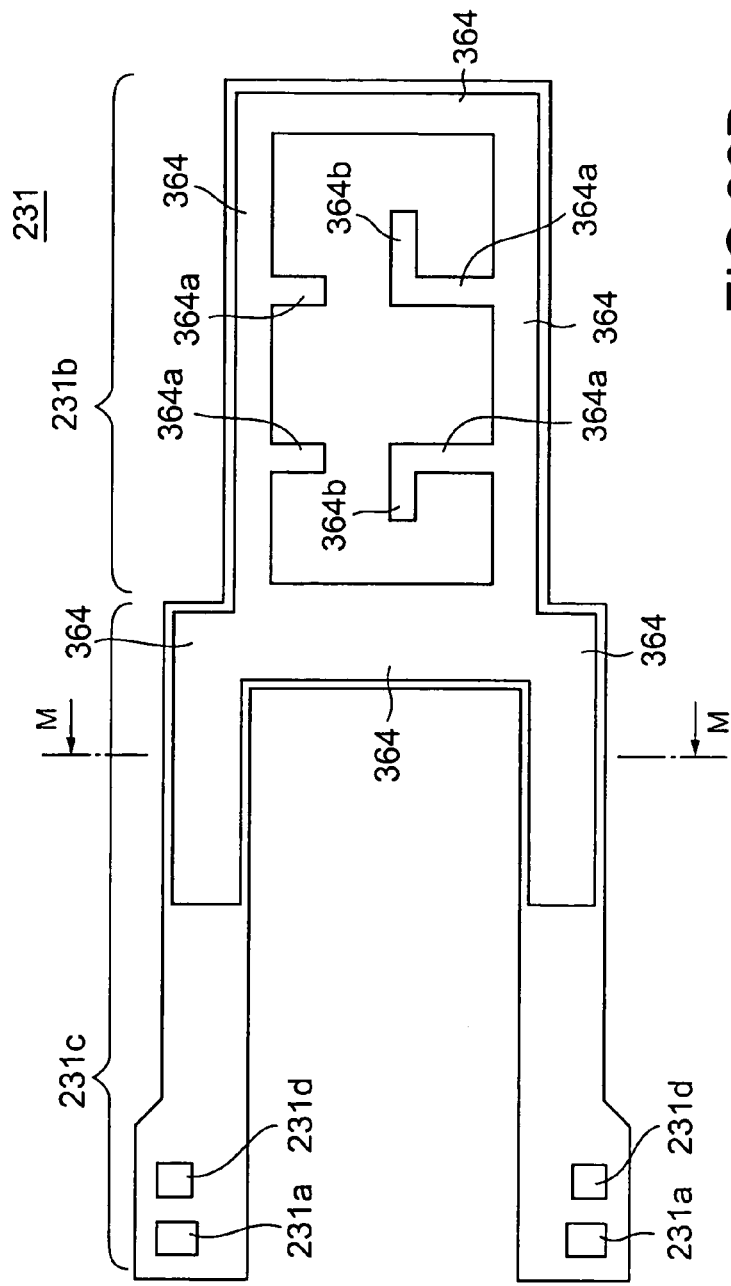
Figure 36B:
FIG. 36B is a sectional view taken along M-M in FIG. 36A.

In this embodiment, as shown in FIG. 36A, the convex portion 364 is provided so as to surround that part of the movable plate 231 on which the mirror 118 is mounted. As shown in FIG. 36B, the convex portion 364 is formed by convexing the triple-layer film which constructs the movable plate 231. This convex portion 364 is also extended on the partial regions of the support plates 231c of the movable plate 231. Since a stepped structure is formed at the edge of the movable plate 231 by providing the convex portion 364 in this manner, bending based on internal stresses is suppressed in the region of the movable plate 231 surrounded with the convex portion 364 and the regions thereof provided with this convex portion 364, and the regions can be kept flat. Therefore, even when the movable plate 231 is in a state where the mirror 118 is raised to its upper position by the bending based on the internal stresses as shown in FIG. 40B, the part on which the mirror 118 is mounted is flat, and the shape of the mounted mirror 118 can be held constant. Thus, the sense of the reflection portion 101 of the mirror 118 can be kept constant at a high precision.

Besides, as shown in FIG. 36A, parts 364a, 364b of the convex portion 364 extend toward the central part of the mirror mount plate 231b of the movable plate 231. Thus, even in a case where the area of the central part of the mirror mount plate 231b surrounded with the convex portion 364 is large, the region of the central part can be kept flat. Besides, each part 364b of the convex portion 364 serves also as the first stage of the vertical structure 5 to be described later.

In this manner, the bending of the movable plate 231 is suppressed in the regions provided with the convex portion 364, but the regions of the support plates 231c near the leg portions 231d are not provided with the convex portion 364. Thus, owing to the bending of those regions of the support plates 231c which are not provided with the convex portion 364, the movable plate 231 can raise the side of the mirror mount plate 231b as shown in FIG. 40B with the leg portions 231a, 231d used as the fixed ends, so as to insert the mirror 118 into the groove 246 of the optical waveguide substrate 240. In this manner, only the parts to be kept flat, such as the mirror mount plate 231b, are provided with the convex portion 364, thereby to make the movable plate 231 movable by utilizing the bending, and yet, the necessary parts can be made flat.

Figure 37:
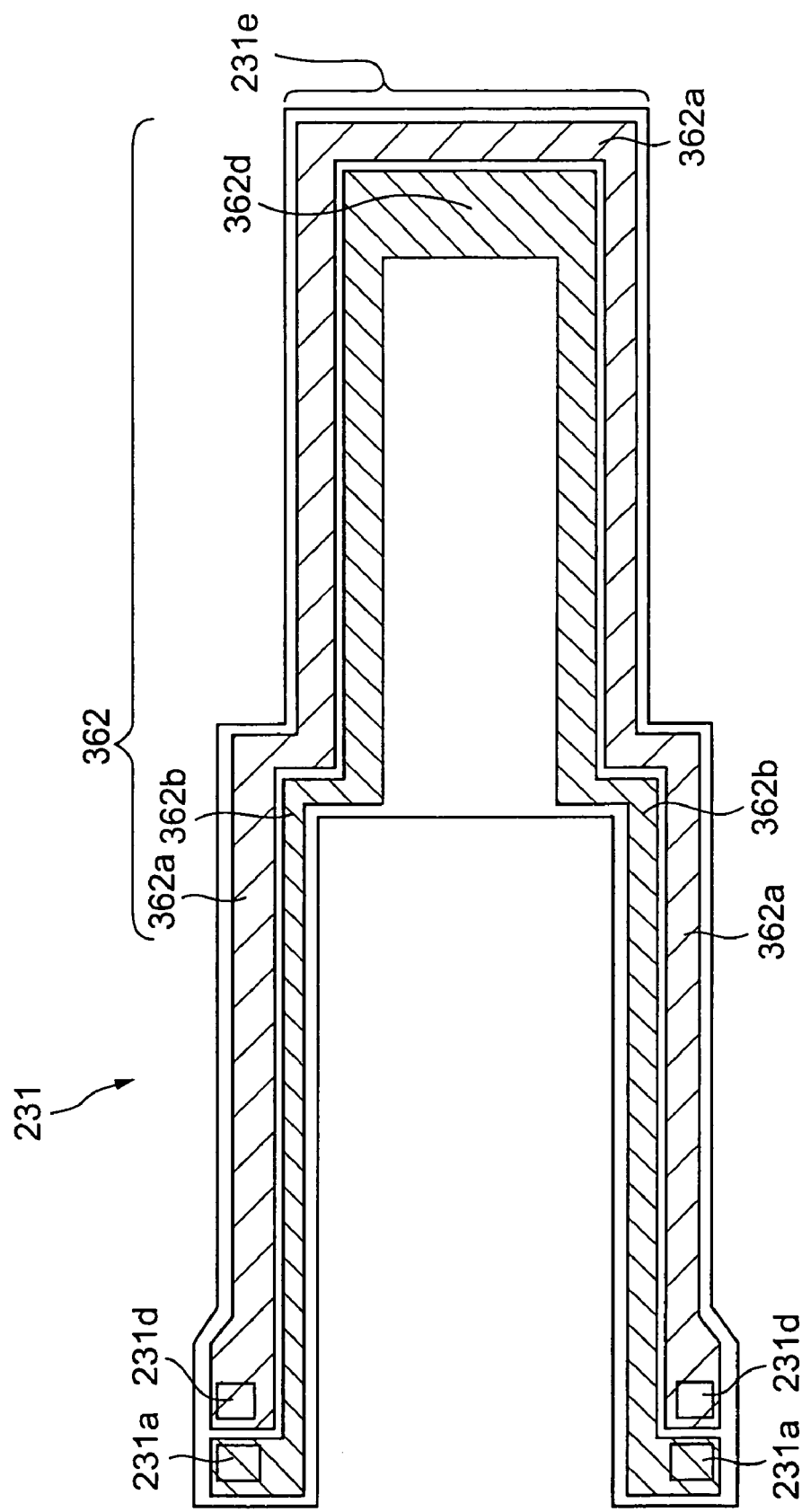
FIG. 37 is an explanatory view showing a pattern shape seen from above an Al film 362, in the movable plate 231 of the optical switch in the ninth embodiment of the present invention.

Next, the shape of the Al film 362 of the movable plate 231 will be described with reference to FIG. 37. In this embodiment, the Al film 362 is patterned into the shape as shown in FIG. 37. Herein, FIG. 37 shows the shape of the Al film 362 in the case where the movable plate 231 is seen from above, and the part of the Al film 362 is hatched for better understanding.

A pattern 362a in the Al film 362 is a pattern which extends along the outer peripheral edge of the movable plate 231 from one of the two leg portions 231d and reaches the distal end of the movable plate 231, and which thereafter extends along the opposite edge of the movable plate 231 and arrives at the other leg portion 231d. In driving the movable plate 231 by the Lorentz force, the pattern 362a is employed as a wiring line through which a current for generating the Lorentz force flows. This pattern 362a is connected at the leg portions 231d with wiring lines laid in the substrate 230, and it is fed with the current from the substrate 230 through the leg portions 231d. The current which flows through the straight part of the pattern 362a extending along one latus 231e at the distal end of the movable plate 231 is used for generating the Lorentz force. Besides, although not shown, magnetic field generation means such as a permanent magnet or an electromagnet is attached to the optical switch in this embodiment. The direction of the magnetic field of the magnetic field generation means is a direction which is orthogonal to the latus 231*e* at the distal end of the movable plate 231 and which is parallel to the principal plane of the substrate 230, and the sense of the magnetic field is set so as to generate the Lorentz force in the sense of bringing the movable plate 231 near to the substrate 230 (downward Lorentz force), in relation to the sense of the current which is fed to the pattern 362*a*.

Besides, a pattern 362*b* in the Al film 362 extends from both the two leg portions 231*a* to the distal end part of the movable plate 231 along the inner edge of the movable plate 231, and it is connected to a rectangular pattern 362*d* arranged at the distal end part. The pattern 362*b* is connected at the leg portions 231*a* with wiring lines laid in the substrate 230, and a voltage is applied between it and an electrode disposed in the substrate 230. Thus, an electromagnetic force is generated between the patterns 362*b* and 362*d* and the electrode disposed in the substrate 230, and the movable plate 231 is attracted to the substrate 230 by the electrostatic force.

Figure 38:
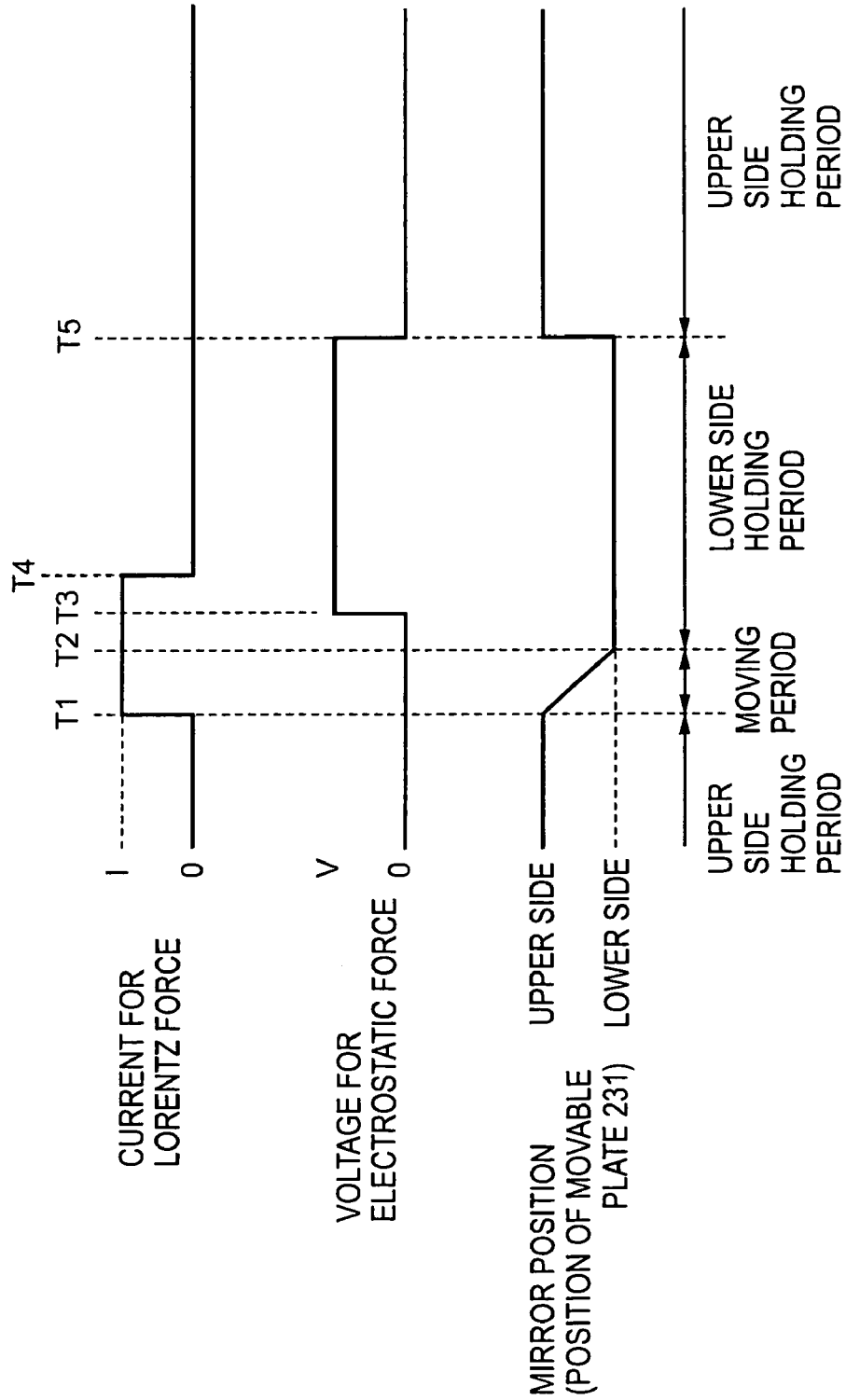
FIG. 38 is a graph showing the relationship between the waveforms of a current for a Lorentz force and a voltage for an electrostatic force, which are fed in case of driving the optical switch in the ninth embodiment of the present invention, and the position of the movable plate 231 on that occasion.

In this embodiment, in the case of driving the movable plate 231, the current for the Lorentz force in a waveform as shown in FIG. 38 is fed to the pattern 362*a* of the Al film 362 through the leg portions 231*d*, and the voltage for the electrostatic force in a waveform as shown in FIG. 38 is fed to the patterns 362*b*, 362*d* of the Al film 362 through the leg portions 231*a*. Concretely, in a case where the movable plate 231 is to be brought down from its upper side position (state of FIG. 40B) to its lower side position (state of FIG. 40A), the current for the Lorentz force is first fed from a time T1. Thus, the movable plate 231 receives a downward force owing to the Lorentz force which is generated by the current flowing through the pattern 362*a* at the distal end and the magnetic field of the magnetic field generation means, and it gradually approaches onto the side of the substrate 230 until it comes into touch with the substrate 230 (state of FIG. 40A) at a time T2. At a time T3 at which the movable plate 231 lies in touch with the substrate 230 in this manner, the voltage for the electrostatic force is fed to the patterns 362*b*, 362*d* of the Al film 362 this time. Thus, the movable plate 231 is held in touch with the substrate 230 (state of FIG. 40A) by the electrostatic force between the patterns 362*b*, 362*d* and the electrode in the substrate 230. When the state where the electrostatic force acts has been established, the current for the Lorentz force is unnecessary, and hence, the current for the Lorentz force is turned OFF at a time T4. Meanwhile, in a case where the movable plate 231 is to be changed to its upper position again, the voltage for the electrostatic force is turned OFF at a time T5. Thus, the movable plate 231 is instantly raised by the internal stresses of the films, thereby to change into the state of FIG. 40B.

In this manner, when the Lorentz force and the electrostatic force are combined, the former can be utilized until the movable plate 231 at the upper side position is attracted so as to lie in touch with the substrate 230, and the latter can be used for keeping the attracted state. Thus, this embodiment can lower dissipation power as compared with the case of attracting the movable plate 231 to the substrate 230 by only the electrostatic force, and it can provide the optical switch which can be driven with the lower dissipation power.

Besides, in a state where the movable plate 231 is being driven by the Lorentz force, the position of the movable plate 231 can be stopped at a desired height by regulating the current for the Lorentz force. In the construction of this embodiment, the reflection portion 101 of the mirror 118 can be stopped midway of an optical path by utilizing such an aspect. By way of example, the movable plate 231 can be stopped at a height at which the desired light quantity of a light beam, such as half or ⅓, is intercepted. Thus, the optical switch in this embodiment can be employed as a light quantity attenuator which passes only the desired light quantity. In this case, a film of low light reflection factor can be mounted as a light shield portion instead of the reflection portion 101 of the mirror 118.

Further, as described before, the movable plate 231 is kept flat by forming the convex portion 364 so as to surround the part on which the mirror 118 is mounted. Therefore, that part of the movable plate 231 on which the reflection portion 101 of the mirror 118 is mounted becomes a height at which it lies in touch with the substrate 230, in the state of FIG. 40A where the movable plate 231 is brought down. Accordingly, the mounted reflection portion 101 of the mirror 118 can be supported at the low position which is as near to the substrate 230 as possible. Thus, even when the interval between the optical waveguide substrate 240 and the substrate 230 is narrow, the reflection portion 101 can be taken out of the groove 246 of the optical waveguide substrate 240, so that a thin-type optical switch of large extinction ratio can be obtained.

Still further, in this embodiment, as shown in FIG. 26, the two thin-film multilevel structures 5 are mounted as the holding portions of the mirror 118 on the movable plate 231. The thin-film multilevel structures 5 are arranged at positions at which both the side parts of the reflection-portion support portion 105 of the mirror 118 are pushed and supported in an x-direction in FIG. 26. Thus, the x-directional position of the reflection-portion support portion 105 supported by the bending of support portions 102, 103 can be held constant. Therefore, even when the bent states of the support portions 102, 103 have changed due to a temperature change, the position and sense of the reflection portion 101 can be kept constant.

The construction of each thin-film multilevel structure 5 will be described with reference to FIGS. 27A, 27B and 27C. The thin-film multilevel structure 5 is such that unit structural members 511–514 of four stages are stacked. The unit structural member 511 of the first stage serves also as the part 364*b* of the convex portion 364 of the movable plate 231, and it is constructed integrally with the movable plate 231. As shown in FIG. 27C, the unit structural members 512, 513 include support parts 51, and flat parts 52. Bach flat part 52 has both its ends supported by the support parts 51. The unit structural member 512 of the second stage has the three support parts 51 which are arranged on the unit structural member 511 of the first stage, and the two flat parts 52 which are supported among the three support parts 51. The unit structural member 513 of the third stage has the two support parts 51 which are respectively arranged on the two flat parts 52 of the unit structural member 512 of the second stage, and the single flat part 52 which is supported between the support parts 51. The unit structural member 514 of the fourth, uppermost stage has a single support part 51 which is arranged on the single flat part 52 of the unit structural member 513 of the third stage, and it does not have any flat part 52. The unit structural member 514 of the uppermost stage is provided with a protuberant part 71 which protrudes beyond the width of the unit structural member 511 of the lowermost stage. As shown in FIG. 26, the protuberant part 71 pushes the reflection-portion support portion 105 in the x-direction in touch therewith and supports this reflection-portion support portion 105.

In each of the unit structural members 512, 513, the support parts 51 and the flat part(s) 52 are unitarily formed by a single continuous film. Besides, in the unit structural member 514, the support part 51 and the protuberant part 71 are unitarily formed by a single continuous film. Bach support part 51 has four side surfaces and a bottom surface, which are formed by the continuous film. In this embodiment, the thickness of each of the films constructing the unit structural members 512–514 of the second–fourth stages is, at most, 1 µm, for example, about 0.2 µm. Besides, the height of each of the unit structural members 511–514 is 4 µm. Accordingly, the total height of the thin-film multilevel structure 5 is 16 µm.

Parts where the adjacent ones of the unit structural members 512–514 of the second-fourth stages lie in touch with each other, that is, the bottom surfaces of the support parts 51 and the flat parts 52 bearing the bottom surface do not have any bonding layer interposed therebetween, but they are fixed by forces by which the films are secured to each other during film formation. Besides, the bottom surfaces of the support parts 51 of the unit structural member 512 of the second stage are secured to that thin film of the movable plate 231 which constructs the unit structural member 511 of the first stage, during the film formation, thereby to be fixed to the unit structural member 511.

In each of the unit structural members 512 and 513 of the second and third stages, the interval of the adjacent support parts 51 is set at such an interval that the flat part 52 supported between them is not flexed by the film stress of its own and a weight receiving from the support part 51 at the upper stage, and that the flat part 52 whose area is enough to arrange the support part 51 thereon can be ensured.

Besides, each of the unit structural members 512–514 of the second–fourth stages has a stepped structure (turnover) 53 which is formed by bending the peripheral edge part of the film twice. Thus, notwithstanding that the unit structural members 512–514 are constructed of the films which are as thin as about 0.2 µm, they are difficult of deformations, and they heighten the rigidity of the thin-film multilevel structure 5. Moreover, even in a case where internal stresses exist in the films constructing the unit structural members 512–514, the stepped structures 53 can prevent the films from being deformed and can hold the structure.

Since the thin-film multilevel structure 5 is formed of the thin films in this manner, its weight is light, and even the support parts 51 formed of the thin film (SiN film) can satisfactorily support the flat part 52. Therefore, the multilevel structure which is as high as 16 µm can be satisfactorily kept by only the thin films. Moreover, owing to the pyramidal structure in which the number of the support parts is smaller (second stage: three support parts 51→third stage: two support parts 51→fourth stage (uppermost stage): one support part 51), the upper stage is lighter in weight and lightens the burden of the support part 51.

In this manner, the thin-film multilevel structure 5 in this embodiment can provide the multilevel structure which is high, which is rigid and whose weight is light. Accordingly, when the thin-film multilevel structures 5 are mounted on the movable plate 231 and are employed as the holding portions of the mirror 118, the position of the mirror 118 can be kept against vibrations, etc. without imposing any appreciable burden on the movable plate 231.

The unit structural members 511–514 can, of course, be formed by steps which are quite separate from those of the constituent members of the movable plate 231 and the mirror 118. However, the manufacturing steps can be sharply simplified in such a way that, just as the unit structural members 511 are formed as the parts (364b) of the movable plate 231, the unit structural members 512–514 are formed simultaneously with the formation of the films of the movable plate 231 and the members constituting the mirror 118. In this embodiment, the unit structural member 512 of the second stage is constructed of the triple-layer film which is formed simultaneously with the formation of the film constructing the support portions 103 and the support portions 102. The unit structural member 513 of the third stage is constructed of the thin film which is formed simultaneously with the formation of the film constructing the reflection portion 101. The unit structural member 514 is formed of the silicon nitride film separately from the mirror 118.

Figure 28:
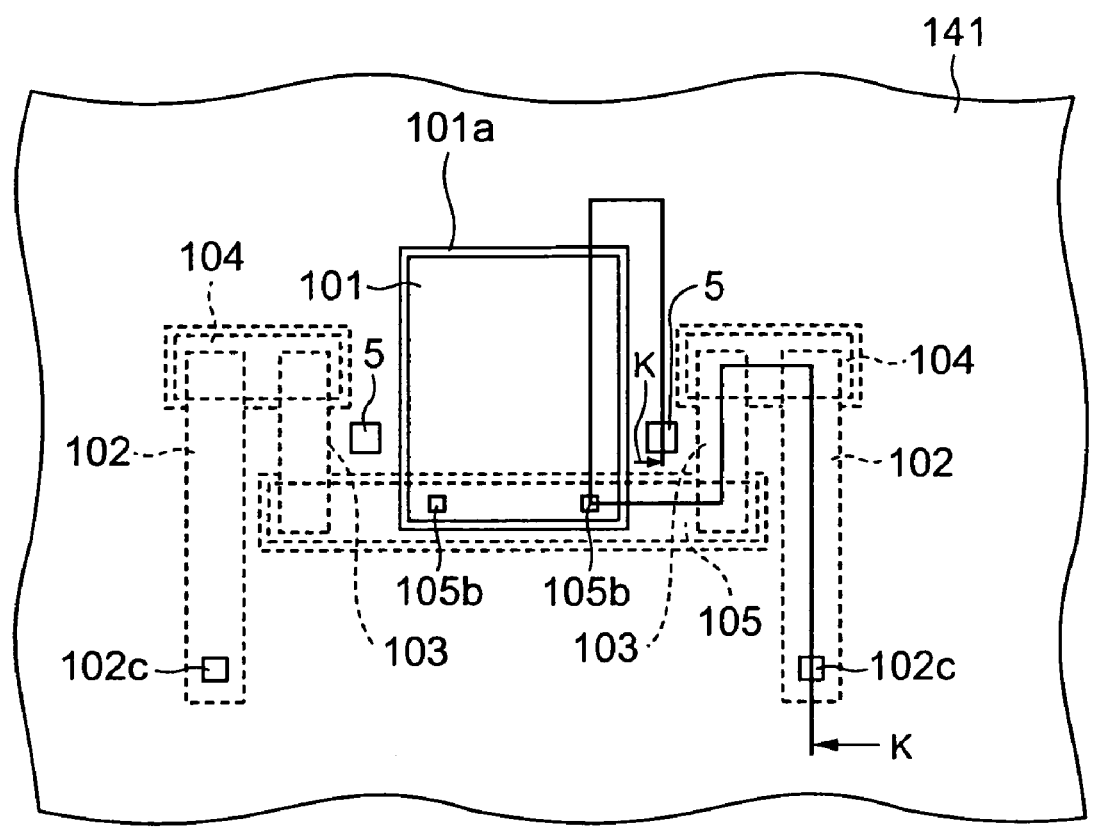
FIG. 28 is a top plan view showing the patterns of the various parts of the mirror 118 at an intermediate stage in the manufacturing process of the mirror 118 of the optical switch in FIG. 26.

The manufacturing process of the mirror 118 in this embodiment will be described with reference to FIGS. 29A–29C and FIGS. 30A–30C. Support portions 102, 103, joint portions 104, a reflection-portion support portion 105, a reflection portion 101, and thin-film multilevel structures 5 are patterned into an arrangement and shapes as shown in FIG. 28. Incidentally, FIGS. 29A–29C and FIGS. 30A–30C show the manufacturing process seen along a section K—K in FIG. 28.

First, as shown in FIG. 29A, a resist layer 2001 to become a sacrificial layer is formed on a substrate 230 which is formed with wiring lines (not shown) necessary for driving a movable plate 231, and it is provided with openings (not shown) in parts where leg portions 231a, 231d are to be formed. Besides, a resist island 2002 is formed on that part of the resist layer 2001 at which the convex portion 364 of the movable plate 231 is to be provided. A silicon nitride film 361 is formed on the resultant structure, and holes are formed in those parts of the silicon nitride film which correspond to the bottom parts of the openings of the leg portions 231a, 231d. An Al film 362 is formed on the resultant structure, and it is patterned into the shapes of patterns 362a–362d in FIG. 37. Further, a silicon nitride film 363 is formed, and the silicon nitride films 361, 363 are thereafter patterned into the shape of the movable plate 231. Thus, the movable plate 231 in which parts of the convex portion 364 form unit structural members 511 of first stage can be finished up. Incidentally, the patterning steps of the Al film 362 and the silicon nitride films 361, 363 are performed by photolithography and etching.

Subsequently, a resist layer 81 is formed on the whole surface of the resultant structure, and it is photolithographically formed with openings 81a and openings 81b at positions where the leg portions 102c of the support portions 102 are to be formed, and at, positions where the support parts 51 of the unit structural members 512 of the thin-film multilevel structures 5 are to be formed, respectively (FIG. 29A).

Subsequently, resist islands 201 and resist islands 2201 are respectively formed at positions where the joint portions 104 and the reflection-portion support portion 105 are to be formed, and at positions where the unit structural members 512 of the thin-film multilevel structures 5 are to be formed (FIG. 29B). When the resist islands 201 and 2201 are formed in this manner, stepped structures can be formed at the edges of the joint portions 104, reflection-portion support portion 105 and unit structural member 512, and the rigidities of these constituents can be heightened.

Subsequently, an Al film 103a to construct the support portions 103 is formed, and it is patterned into the shapes of the support portions 103 in FIG. 28 and the shapes of the unit structural members 512 by photolithography and etching (FIG. 29C).

Subsequently, a silicon nitride film and an Al film 102b are successively formed (FIG. 30A). The formed Al film 102b is patterned into the shapes of the support portions 102 in FIG. 19, and the shapes of the unit structural members 512. Thereafter, the silicon nitride film is patterned into the shapes of the support portions 102, joint portions 104, support portions 103, reflection-portion support portion 105 and unit structural members 512 (FIG. 30B). Thus, the silicon nitride films 103b of the support portions 103, the joint portions 104 and the reflection-portion support portion 105 are formed at one time. Besides, the unit structural members 512 of triple-layer construction in which the Al film, silicon nitride film and Al film are successively stacked can be formed by the steps in FIG. 29C and FIG. 30A.

A resist layer 141 is formed on the whole surface of the resultant structure, and it is respectively formed with openings at positions where the joint portions 105b of the reflection-portion support portion 105 are to be formed, and at positions where the support parts of the unit structural members 513 of the thin-film multilevel structures 5 are to be formed. A resist layer 82 is further formed on the resultant structure, and it is removed so as to leave the inside shape part of the rim 101a of the reflection portion 101 and the shape parts of the unit structural members 513 of the thin-film multilevel structures 5, thereby to form resist islands. Besides, openings are formed at those position of the resist layer 82 at which the joint portions 105b of the reflection-portion support portion 105 are to be formed, and at those positions thereof at which the support parts 51 of the unit structural members 513 are to be formed. Thereafter, an Al film 101 is formed on the whole surface of the resultant structure, and it is patterned into the shape of the reflection portion 101 and the shapes of the unit structural members 513 (FIG. 30C). Thus, the reflection portion 101 and the unit structural members 513 of third stage can be finished up. This state is as shown in FIG. 28.

Further, after a resist layer (not shown) is formed on the whole surface of the resultant structure, it is formed with openings at positions where the support parts 51 of unit structural members 514 of fourth stage are to be formed, and resist islands are formed thereon into the shapes of the unit structural members 514. A silicon nitride is formed on the whole surface of the resultant structure, and it is patterned into the shapes of the unit structural members 514. Thus, the unit structural members 514 of the fourth stage can be finished up.

Lastly, all of the resist layers 81, 141, 82 being sacrificial layers are removed by ashing. Thus, the support portions 102 and the support portions 103 bend up so as to support the reflection portion 101 of the mirror 118 in FIGS. 18A and 18B, and the reflection-portion support portion 105 touch the thin-film multilevel structures 5, whereby the reflection portion 101 is located substantially perpendicularly to the substrate 230. Besides, the movable plate 231 rises up from the substrate 230 with the leg portions 231a, 231d used as support portions, and it is permitted to move the mirror 118 up and down through a Lorentz force and an electrostatic force by feeding the patterns 362a, 362b, 362d of the Al film 362 with a current for the Lorentz force and a voltage for the electrostatic force as shown in FIG. 38.

In this manner, according to the ninth embodiment, the thin-film multilevel structures 5 are mounted as the holding portions on the movable plate 231, whereby the sense of the reflection portion 101 of the mirror 118 can be kept constant. Moreover, the movable plate 231 is provided with the convex portion 364 so as to keep the flatness of its part bearing the mirror 118, so that the sense of the reflection portion 101 of the mirror 118 can be held constant. Furthermore, owing to the construction in which the movable plate 231 is driven by combining the Lorentz force and the electrostatic force, an optical switch which can be driven with low dissipation power can be provided.

Besides, since the movable plate 231 can be stopped at a desired height by utilizing the Lorentz force, the optical switch in the ninth embodiment can be employed as a light quantity attenuator by stopping the reflection portion 101 at an intermediate position at which the desired light quantity of a light beam is intercepted.

Besides, although the mirror 118 in FIGS. 18A and 18B is employed as the mirror mounted on the movable plate 231, in the ninth embodiment, this mirror 118 is not restrictive, but it is possible to mount the mirror in any of the first–sixth embodiments described before, and to mount the thin-film multilevel structures 5 as the holding portions. By way of example, the thin-film multilevel structures 5 can be mounted as the holding portions instead of the stop portions 91, 92 of the mirror 112 in the second embodiment or the stop portions 91, 92, 93, 94 of the mirror 113 in the third embodiment.

Incidentally, although each thin-film multilevel structure 5 has four stages, it can be endowed with a desired number of stages in order to attain a necessary height. Besides, although each unit structural member 511 of the lowermost stage is formed integrally with the movable plate 231 in the ninth embodiment, it can also be formed of a separate thin film on the movable plate 231. In this case, the unit structural member 511 is provided with five support parts 51 and is brought into the same shape as that of the unit structural member 512.

Figure 32:
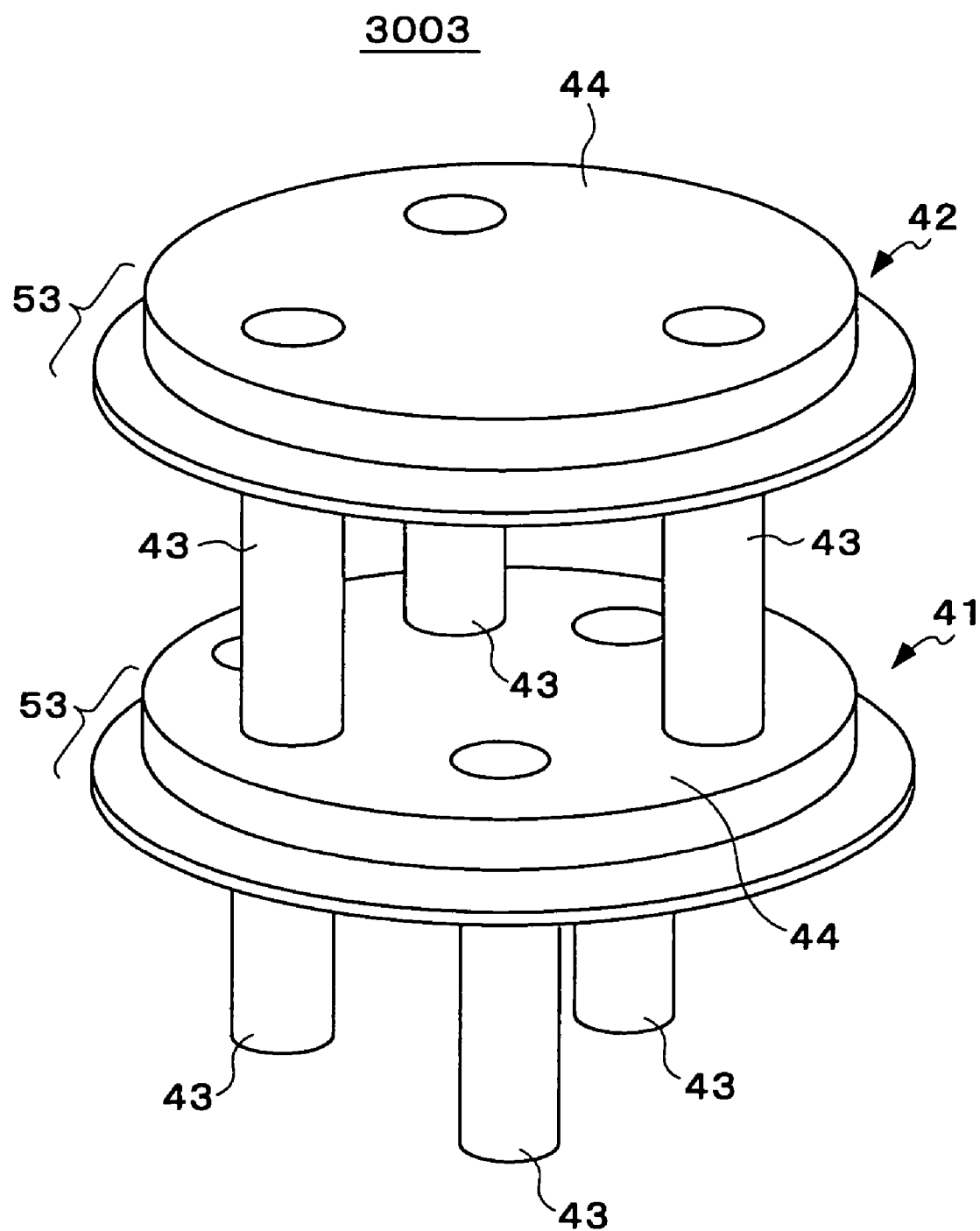
FIG. 32 is a sectional view showing the construction of a thin-film multilevel structure 3003 which can be mounted instead of the thin-film multilevel structure 5 of the optical switch in FIG. 26.
Figure 33:
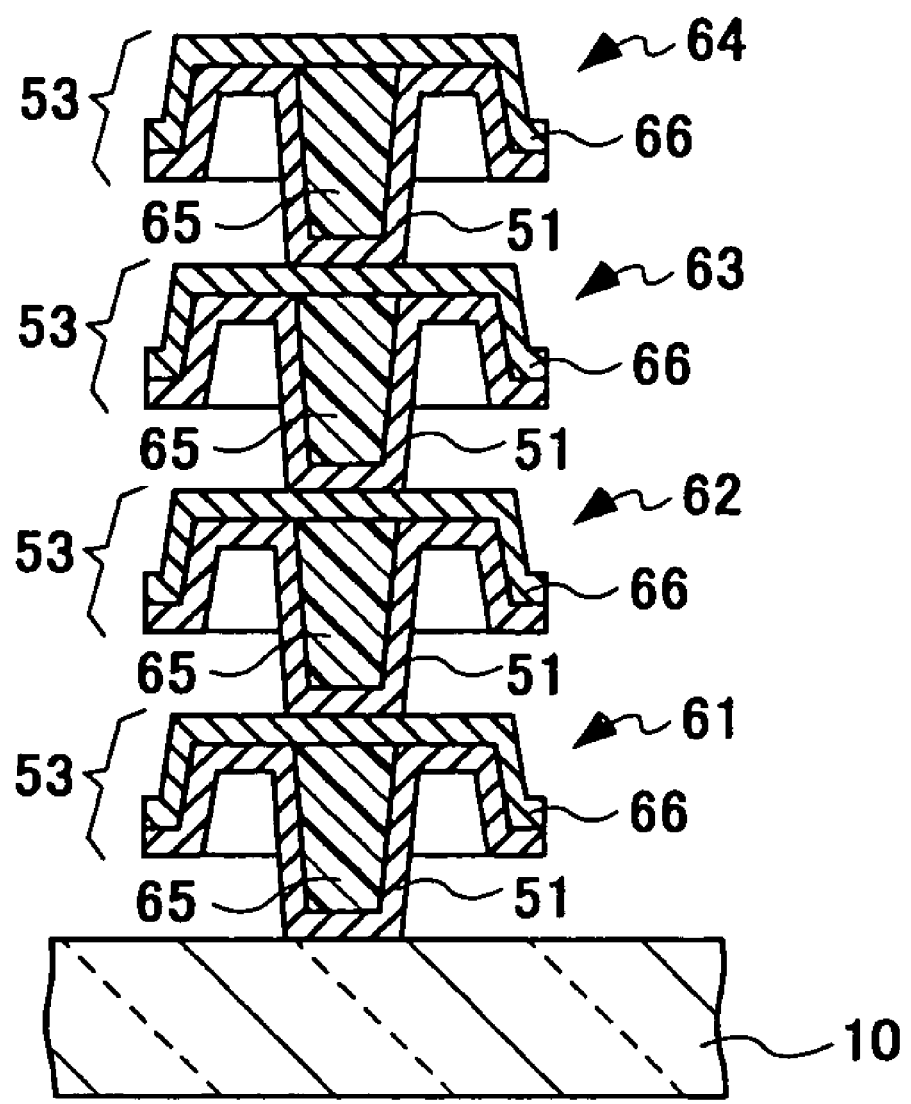
FIG. 33 is a sectional view showing the construction of a thin-film multilevel structure 3004 which can be mounted instead of the thin-film multilevel structure 5 of the optical switch in FIG. 26.

Besides, each thin-film multilevel structure 5 is not restricted to the configuration shown in FIGS. 27A, 27B and 27C. It is possible to employ, for example, thin-film multilevel structures which have configurations as shown in FIG. 31–FIG. 33.

Figure 31:
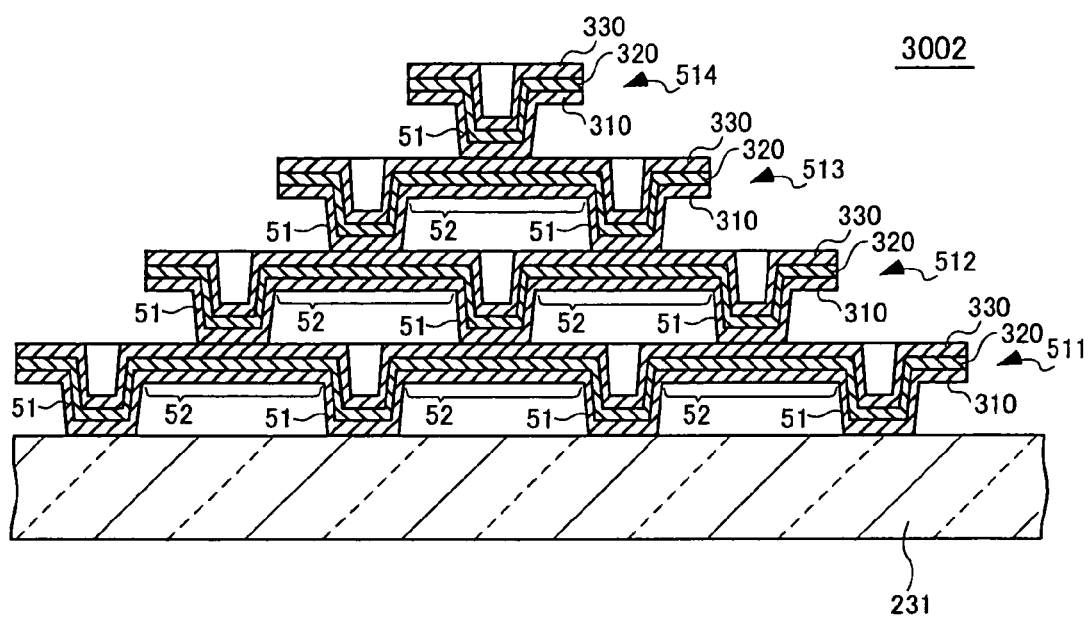
FIG. 31 is a sectional view showing the construction of a thin-film multilevel structure 3002 which can be mounted instead of the thin-film multilevel structure 5 of the optical switch in FIG. 26.

Since the thin-film multilevel structure 3002 in FIG. 31 has substantially the same top plan configuration as in FIG. 27A, the top plan configuration is omitted from illustration. However, a unit structural member 511 of the lowermost stage is separate from a movable plate 231. The thin-film multilevel structure 3002 consists in the point that each of unit structural members 511–514 is provided not with any stepped structure at its peripheral edge part, and the point that each of all the unit structural members 511–514 is constructed of a triple-layer film. The remaining construction is the same as in the ninth embodiment described before.

The triple-layer film constructing each of the unit structural members 511–514 is so constructed that a film 310, a film 320 and a film 330 are successively stacked from a substrate side. The reason why each of all the unit structural members 511–514 is constructed of the triple-layer film in this manner, is that the internal stresses of the individual films 310, 320, 330 are canceled from each other, whereby each of the unit structural members 511–514 is constructed of the triple-layer film having almost no residual stress. In order to cancel the internal stresses from each other, the film 310 of the lowermost layer and the film 330 of the uppermost layer should desirably be made of an identical material and have substantially equal thicknesses. By way of example, it is possible that the films 310 and 330 are made of SiN films of the same thicknesses, while the film 320 interposed between them is made of an Al film.

In this manner, the thin-film multilevel structure 3002 in FIG. 31 has each of the unit structural members 511–514 constructed of the triple-layer film in which the internal stresses are canceled from each other, so that it can hold rigidity without forming the stepped structures 53 as in the thin-film multilevel structure 5 shown in FIGS. 27A–27C.

Next, the thin-film multilevel structure 3003 in FIG. 32 will be described. This thin-film multilevel structure 3003 includes unit structural members 41, 42. The unit structural member 41 of first stage has a circular flat part 44, and three support parts 43 for supporting the flat part 44. The three support parts 43 are arranged at intervals of 120° around the center of the flat part 44, that is, at positions corresponding to the vertices of regular triangle. In this manner, the support parts 43 of the thin-film multilevel structure 3003 are not aligned on a straight line like the support parts 51 of the thin-film multilevel structure 5, but they are arranged in multilevel fashion.

The unit structural member 42 of second stage has the same size and shape as those of the unit structural member 41 of the first stage. The support parts 43 of the unit structural member 42 of the second stage are arranged at angles at which they are shifted every 60° from the support parts 43 of the unit structural member 41 of the first stage, so as to be supported by the flat part 44 of the unit structural member 41 of the first stage.

Incidentally, also in the thin-film multilevel structure 3003 shown in FIG. 32, the support parts 43 and the flat part 44 are unitarily formed of a thin film of SiN or the like, as in the thin-film multilevel structure 5. Besides, a stepped structure (turnover) 53 is provided at the peripheral edge part of the thin film, thereby to prevent the corresponding unit structural member 41 or 42 from being deformed, and to hold the rigidity of the thin-film multilevel structure 3003.

The thin-film multilevel structure 3003 in FIG. 32 can be manufactured by manufacturing steps similar to those of the thin-film multilevel structure 5.

Besides, although the thin-film multilevel structure 3003 in which the unit structural members 41, 42 are stacked in the two stages is shown in FIG. 32, unit structural members can be similarly stacked in three or more stages.

Next, the thin-film multilevel structure 3004 shown in FIG. 33 will be described. This thin-film multilevel structure 3004 is a modification to the thin-film multilevel structure 5. In the thin-film multilevel structure 3004, each of all unit structural members 61–64 of four stages has one support part 51. The support part 51 is filled up with a resist 65. This support part 51 is overlaid with a flat part 66 which serves as the cover of the resist 65, and which supports the support part 51 of the upper stage.

The support part 51 has the same shape as that of the support part 51 of the thin-film multilevel structure 5, and the four side surfaces and the bottom surface thereof are unitarily formed of a single film. A stepped structure (turnover) 53 is formed at the peripheral edge part of the film which constructs the support part 51. A stepped structure (turnover) 53 is also formed at the peripheral edge part of a film which constructs the flat part 66. The films which construct the stepped structure 53 of the support part 51 and the stepped structure 53 of the corresponding flat part 66, are held in close contact by securing forces which develop during film formation.

The thin-film multilevel structure 3004 in FIG. 33 can form a high multilevel structure on a small area for the reasons that each of all the stages has only one support part 51, and that the unit structural members 61–64 are rectilinearly stacked upwards. Besides, since the resist 65 is packed inside each support part 51, a support strength is higher than in a case where the support part 51 is hollow. Thus, a certain mechanical strength can be attained in spite of the structure in which the unit structural members 61–64 are rectilinearly stacked as shown in FIG. 33.

Incidentally, since the resist 65 packed inside each support part 51 is part of a sacrificial layer, a manufactural step need not be added for packing the resist 65.

By the way, the construction of the thin-film multilevel structure 3004 in FIG. 33 can also be altered into a construction in which each support part 51 is not filled up the resist 65. This construction can be realized by providing an opening in a part of the support part 51, and removing the resist 65 inside the support part 51 together with the sacrificial layer.

Tenth Embodiment

An optical switch in the tenth embodiment will be described with reference to FIGS. 34A and 34B and FIGS. 41A and 41B.

Figure 34A:
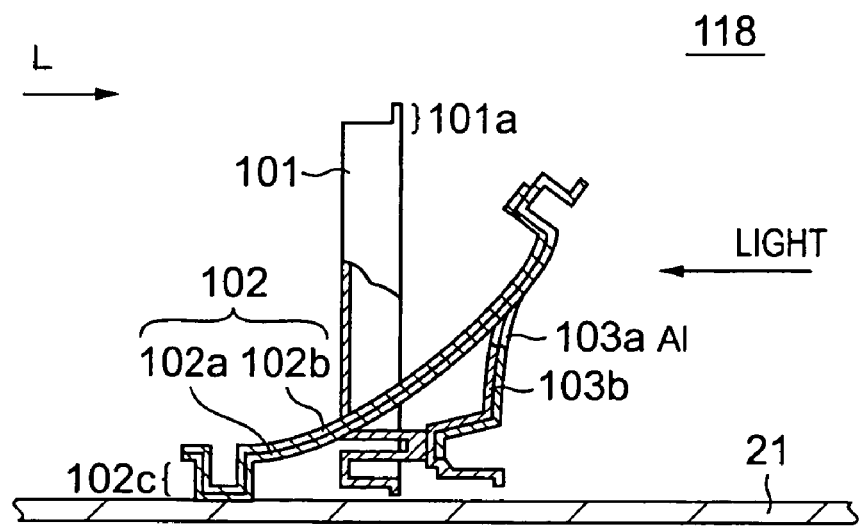
Figure 34B:
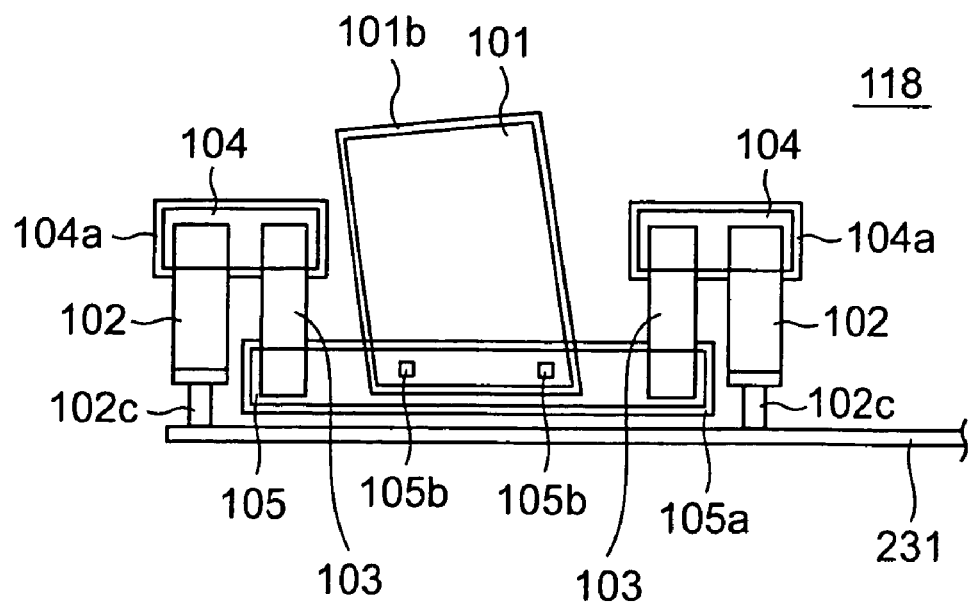
FIG. 34B is a view seen in the direction of an arrow L in FIG. 34A.

Although the optical switch in this embodiment has almost the same construction as that of the optical switch in the ninth embodiment, it differs from the optical switch in the ninth embodiment in the point that, as shown in FIG. 34B and FIG. 41A, the reflection portion 101 of a mirror 118 is inclined relative to a movable plate 231. Except the inclination of the reflection portion 101, the structure of the mirror 118 is the same as in FIG. 18A, as seen from FIG. 34A.

The reflection portion 101 is inclined relative to the movable plate 231, for the following reason: The optical switch in the ninth embodiment is in such a configuration that, as shown in FIG. 40A, the upper end latus of the reflection portion 101 of the mirror 118 becomes parallel to the principal plane of the optical waveguide substrate 240 in the state where the movable plate 231 is parallel to the substrate 230. In consequence, the upper end latus of the reflection portion 101 inclines relative to the optical waveguide substrate 240 in the state where the movable plate 231 rises up to insert the reflection portion 101 into the groove 246 of the optical waveguide substrate 240 as shown in FIG. 40B. In this embodiment, therefore, the reflection portion 101 is formed into the inclined shape beforehand in order that the upper end latus 101b of the reflection portion 101 may become parallel to the optical waveguide substrate 240 in the state of FIG. 41B where the reflection portion 101 is inserted into the groove 246 of the optical waveguide substrate 240. Thus, when the movable plate 231 is raised as shown in FIG. 41B, the area of the reflection portion 101 which is inserted into the groove 246 can be increased, so that even the reflection portion 101 being small can efficiently conceal the end faces of the optical waveguides 243, 244. Moreover, since the depth of the groove 246 can be made shallow, a thin-type optical switch can be provided.

Figure 35:
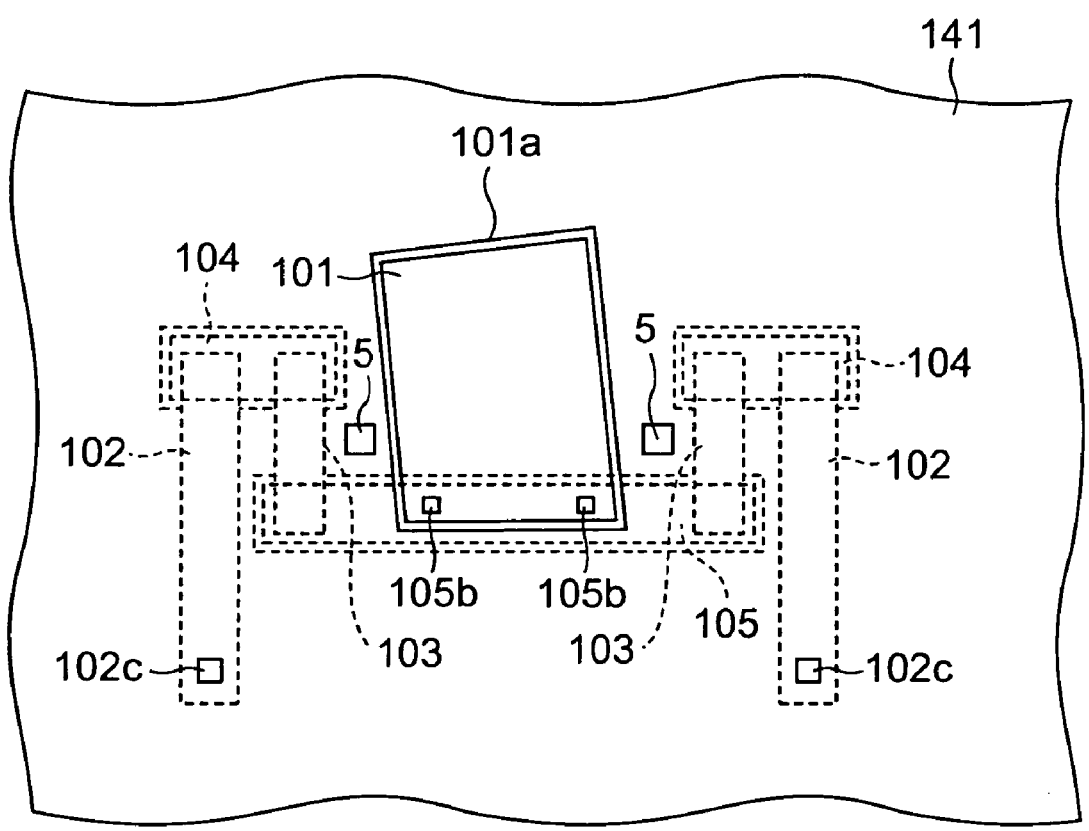
FIG. 35 is a top plan view showing the patterns of the various parts of the mirror 118 at an intermediate stage in the manufacturing process of the mirror 118 of the optical switch in FIG. 34.

Incidentally, a process for manufacturing the mirror 118 in which the reflection portion 101 is inclined as shown in FIG. 34B is almost the same as the process described in the ninth embodiment. In patterning the reflection portion 101, however, this reflection portion is patterned into an inclined pattern as shown in FIG. 35. Thus, the mirror 118 in which the reflection portion 101 is inclined as shown in FIG. 34B can be manufactured.

Eleventh Embodiment

Next, an optical switch in the eleventh embodiment will be described with reference to FIG. 42, FIGS. 43A and 43B, etc.

The optical switch in the eleventh embodiment is such that, in the optical switch in the ninth embodiment, as shown in FIG. 42, groovy structure parts 105c are provided at those parts of the reflection-portion support portion 105 which the protuberant parts 71 of the respective thin-film multilevel structures 5 touch. The construction of the optical switch except the groovy structure parts 105c is the same as in the ninth embodiment, and shall therefore be omitted from description.

Figure 43A:
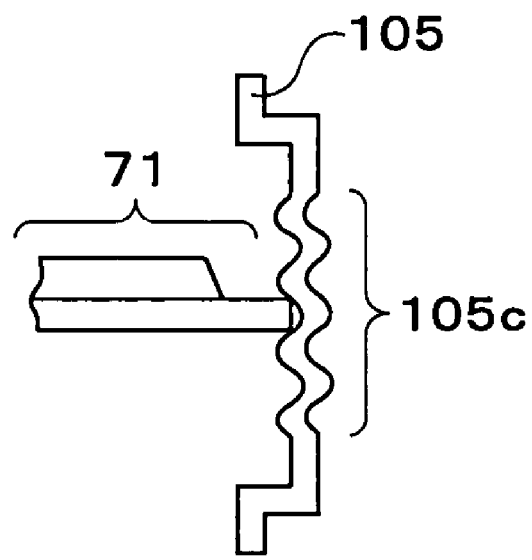
Figure 43B:
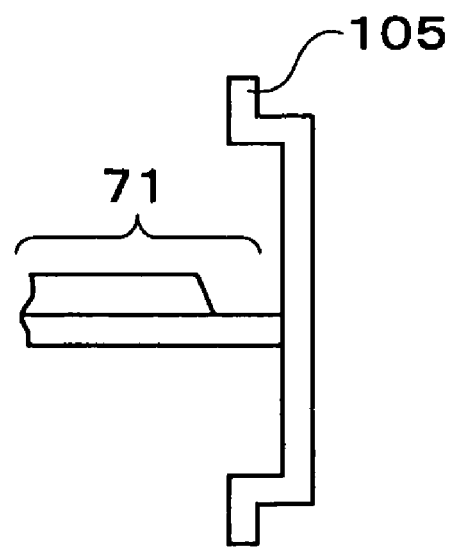
FIG. 43B is a view showing the relation of a touch part between the protuberant part 71 of the thin-film multilevel structure 5 and a reflection-portion support portion 105 in the ninth embodiment.

FIG. 43A shows the relation of a touch part between the protuberant part 71 of the thin-film multilevel structure 5 and the reflection-portion support portion 105 in the eleventh embodiment, while FIG. 43B shows the relation of a touch part between the protuberant part 71 of the thin-film multilevel structure 5 and the reflection-portion support portion 105 in the ninth embodiment. As seen from these figures, in the eleventh embodiment, the protuberant part 71 of the thin-film multilevel structure 5 touches the groovy structure part 105c of the reflection-portion support portion 105 and is held by the concavity of the groovy structure part 105c. Therefore, the reflection-portion support portion 105 can be prevented from slipping up or down relative to the protuberant parts 71 of the thin-film multilevel structures 5. This brings forth the advantage that the angle of the reflection portion 101 can be held constant more precisely than in the ninth embodiment.

Figure 44:
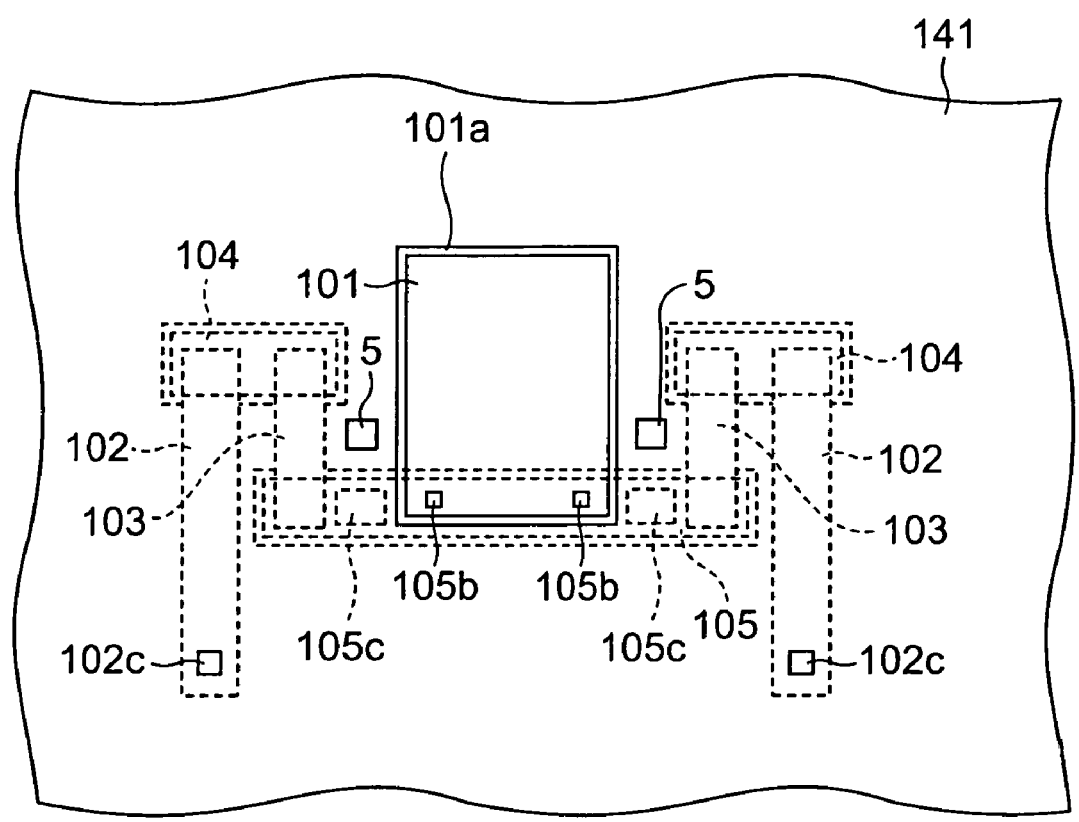
FIG. 44 is a top plan view showing the patterns of the various parts of the mirror 118 at an intermediate stage in the manufacturing process of the mirror 118 of the optical switch in FIG. 42.

The manufacturing process of the mirror 118 in this embodiment differs from that of the mirror 118 in the ninth embodiment, in the following point: After resist islands 201 and resist islands 2201 have been respectively formed at positions where joint portions 104 and a reflection-portion support portion 105 are to be formed and at positions where the unit structural members 512 of thin-film multilevel structures 5 are to be formed (FIG. 29B), a sacrificial layer for providing groovy structure parts 105c is formed of a resist on a region including the touch points between the reflection-portion support portion 105 and protuberant parts 71, by exposure technology such as EB exposure. Thereafter, the manufacturing process is the same as in the ninth embodiment. Incidentally, the sectional shape of the sacrificial layer may be any desired shape such as triangular shape, rectangular shape or semicircular shape, as long as the protuberant parts 71 can be prevented from slipping up or down when they have touched the corresponding groovy structure parts 105c. Owing to the new sacrificial layer, the groovy structure parts 105c as shown in FIG. 42 are formed in regions 105a' surrounded with broken lines in FIG. 44.

Incidentally, the eleventh embodiment has been described on the example wherein, in the optical switch in the ninth embodiment, those parts of the reflection-portion support portion 105 which the protuberant parts 71 of the thin-film multilevel structures 5 touch are provided with the groovy structure parts 105c. However, the holding portions which touch the groovy structure parts 105c are not restricted to the thin-film multilevel structures 5. By way of example, in the optical switch in the second embodiment, those parts of the reflection portion 101 which the distal end parts of the stop portions 91, 92 touch may well be provided with the groovy structure parts 105c.

In each of the first–eleventh embodiments described above, the reflection portion 101 is mounted in the mirror 12 in FIGS. 1A and 13, the mirror 112 in FIGS. 10A and 10B, the mirror 113 in FIG. 12, the mirror 116 in FIG. 15A, the mirror 117 in FIG. 16, or the mirror 118 in FIG. 18. The reflection portion 101, however, can be replaced with a light shield film of low light reflection factor, a polarization film having a polarizing characteristic, or an optical thin film having an optical wavelength filter characteristic. Such a film can be mounted on, for example, the movable plate 21 or 231 in the first, eighth or ninth embodiment, thereby to construct an optical element such as a light quantity attenuator, a polarizer or a wavelength selector.

Twelfth Embodiment

Next, an optical device in the twelfth embodiment will be described with reference to the drawings.

Figure 46:
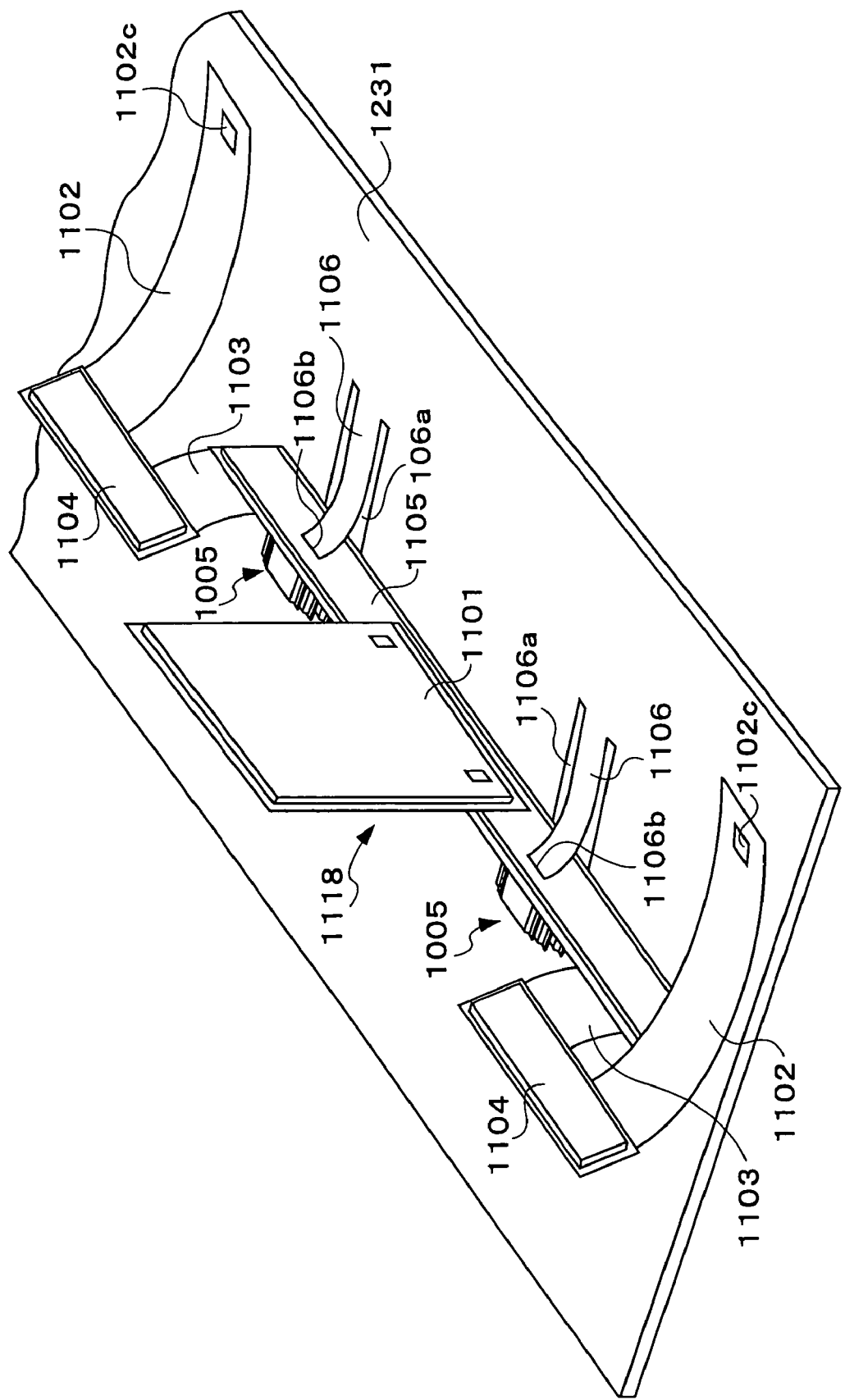
FIG. 46 is a perspective view of the mirror 1118 of the optical device in the twelfth embodiment of the present invention.
Figure 47:
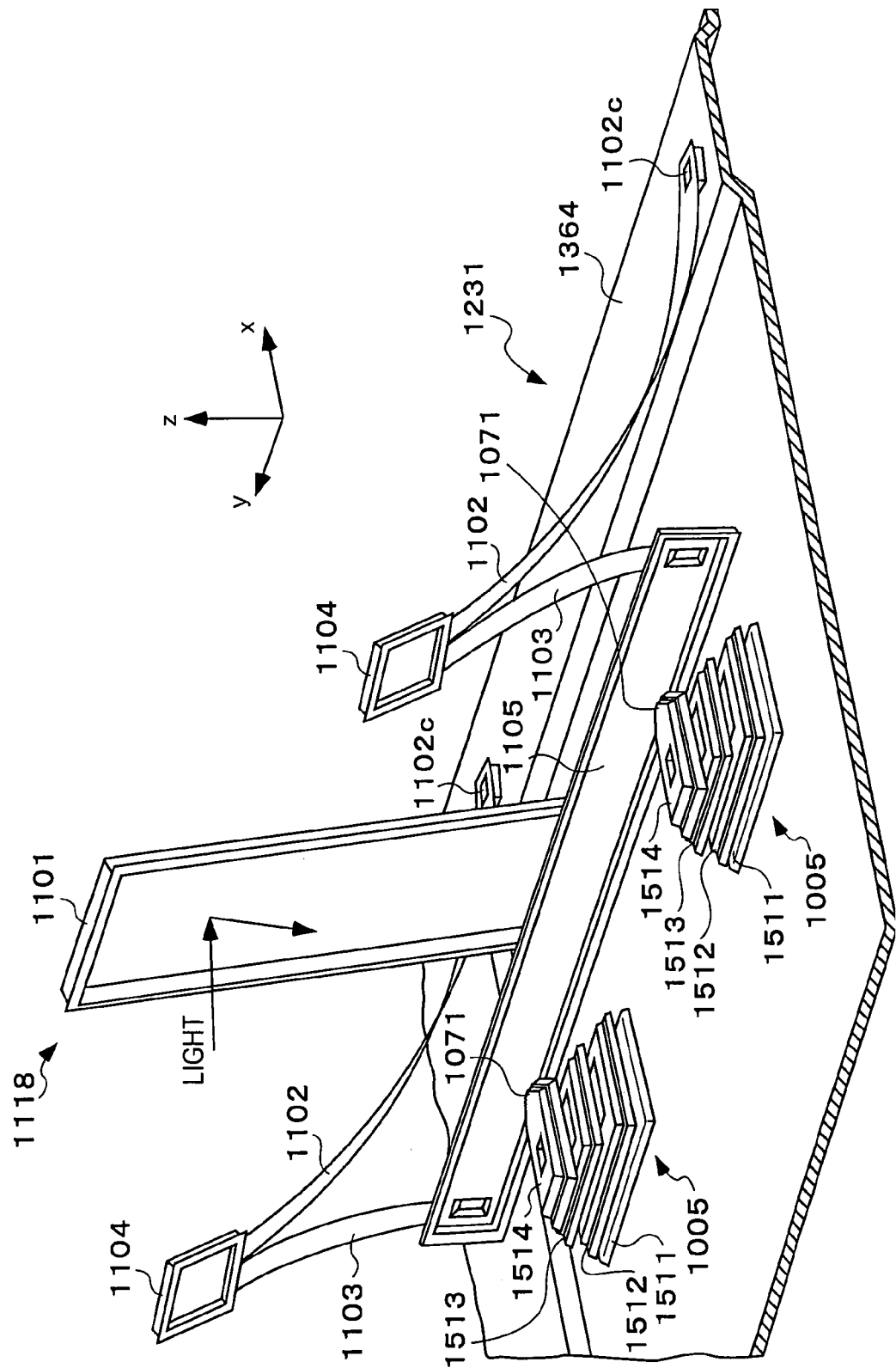
FIG. 47 is a perspective view of the mirror 1118 of the optical device in the twelfth embodiment of the present invention.

As shown in FIG. 46 and FIG. 47, the optical device in this embodiment employs a mirror 1118 constructed of a thin film, as an optical element, and it includes a suppression portion which is so constructed that a pair of stoppers 1106 are arranged for the mirror 1118, whereby even when vibrations, etc. have been externally imparted to the mirror 1118, the change of the sense of the mirror 1118 can be suppressed. Owing to such a construction, it is possible to suppress, for example, the displacement of an optical film constructing the optical element, in a normal direction or to an upper position. In this embodiment, the displacement of the optical film constructing the reflective surface of the mirror 1118, in the normal direction, and the displacement thereof in a vertical direction orthogonal to a normal line are suppressed.

As shown in FIGS. 55A and 55B, the optical device in this embodiment is an optical switch which is so constructed that an optical waveguide substrate 1240 and a mirror structure substrate 1230 are placed one over the other at a predetermined spacing by interposing an unshown spacer therebetween.

Figure 56:
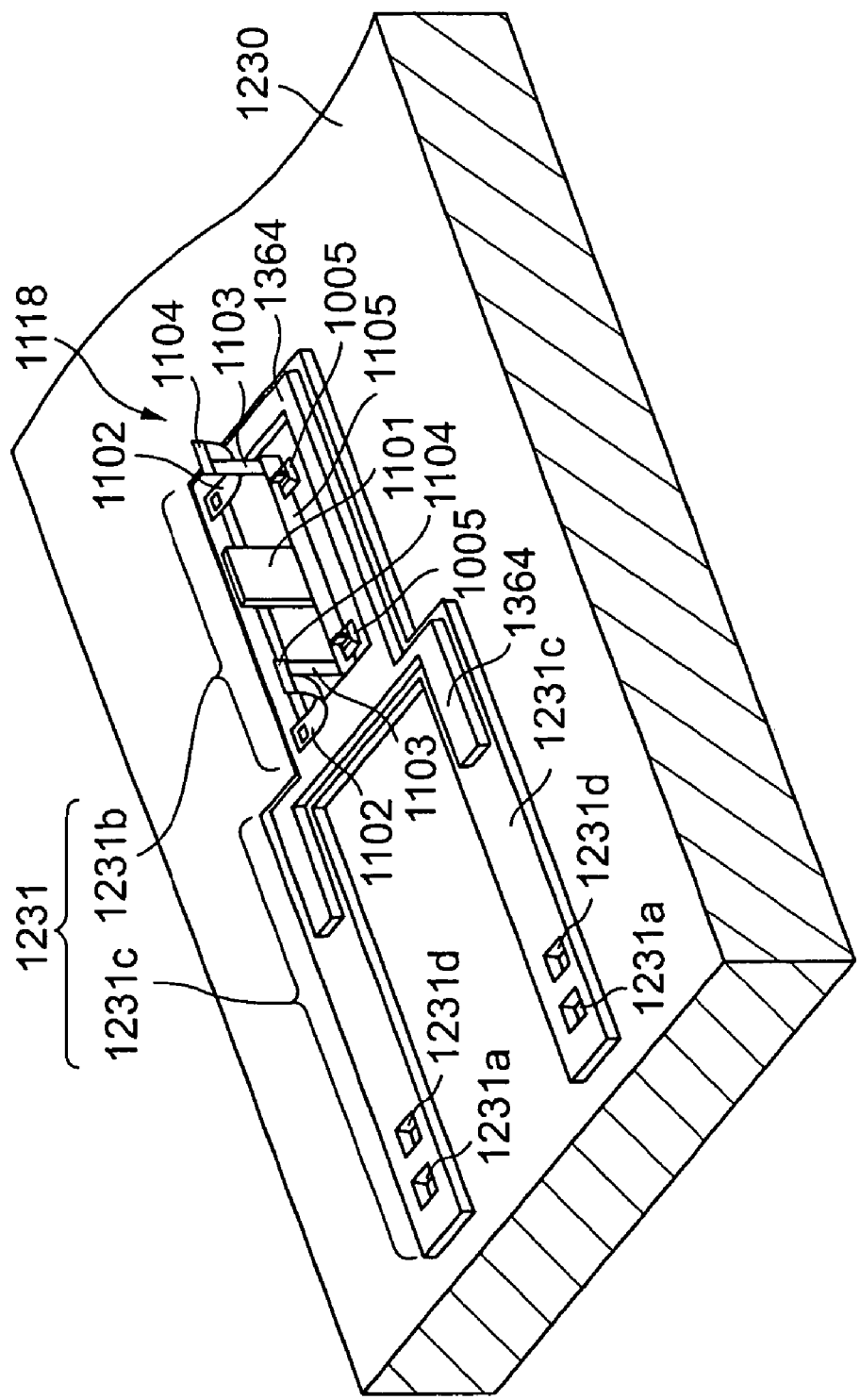
FIG. 56 is a perspective view of the mirror structure substrate 1230 of the optical device in the twelfth embodiment of the present invention.

As shown in FIGS. 55A and 55B and FIG. 56, a movable plate 1231 is mounted on the mirror structure substrate 1230, and the mirror 1118 is mounted on the movable plate 1231.

The mirror 1118 has the same construction as that of the mirror 118 in FIG. 26, except the arrangement of the pair of stoppers 1106, and it shall therefore be omitted from detailed description.

Since thin-film multilevel structures 1005 support a reflection-portion support portion 1105, the mirror 1118 is stable even when the bent states of support portions 1102, 1103 have changed due to a temperature change. In this embodiment, in order to further stabilize the position of the reflection-portion support portion 1105 in spite of the impartation of the external vibrations, etc., the stoppers 1106 are arranged on that side of the reflection-portion support portion 1105 on which the leg portions 1102c of the support portions 1102 are arranged, as shown in FIG. 46. The stoppers 1106 are respectively arranged at positions opposing to the thin-film multilevel structures 1005, with the reflection-portion support portion 1105 interposed therebetween. Each of the stoppers 1106 is constructed in such a way that a U-shaped cut 1106a is formed in a part of the movable plate 1231, and that a rectangular region inside the cut 1106a is raised by bending. The bending of the stopper 1106 is caused by the internal stress of a triple-layer film which constructs the movable plate 1231. The direction of the bending is the longitudinal direction of the stopper 1106. The film construction of the movable plate 1231 will be described in detail later.

In a case where the distal ends 1106b of the stoppers 1106 are located so as to touch the reflection-portion support portion 1105 and to hold this reflection-portion support portion 1105 between them and the thin-film multilevel structures 1005, the movement of the reflection-portion support portion 1105 can be favorably suppressed substantially perfectly even when the external vibrations have been imparted. However, the distal ends 1106b need not always lie in touch with the reflection-portion support portion 1105, and gaps may well exist between these distal ends 1106b and the reflection-portion support portion 1105.

The reason therefor is that, from the structural viewpoint of the mirror 1118, the reflection-portion support portion 1105 is easily moved by the temperature chance onto the side on which the thin-film multilevel structures 1005 are arranged, and that the movement is checked by the thin-film multilevel structures 1005 as described before. In the ordinary state of the mirror 1118, therefore, the position of the reflection-portion support portion 1105 is stable in touch with the thin-film multilevel structures 1005. It is when large external vibrations or the likes have been imparted that the reflection-portion support portion 1105 moves onto the side on which the stoppers 1106 are arranged. Accordingly, even when the gaps exist between the distal ends 1106b of the stoppers 1106 and the reflection-portion support portion 1105, this reflection-portion support portion 1105 moves only slightly till its touch with the distal ends 1106b of the stoppers 1106, upon the impartation of the external vibrations, and the further movement thereof is limited by the stoppers 1106. Besides, when the external vibrations have faded away, the reflection-portion support portion 1105 returns to its position where it touches the thin-film multilevel structures 1005, again. Accordingly, the distal ends 1106b of the stoppers 1106 should preferably lie in touch with the reflection-portion support portion 1105, but they need not always touch this portion 1105 and may well define the gaps relative to it.

Next, the construction of the movable plate 1231 will be described.

As shown in FIG. 57B, the movable plate 1231 is made of a triple-layer film in which a silicon nitride film 1361, an Al film 1362 and a silicon nitride film 1363 are successively stacked. The movable plate 1231 is formed under predetermined film thicknesses and film formation conditions so as to be bent upwards relative to the substrate 1230 at room temperatures by an internal stress which develops due to the difference between the coefficients of thermal expansion of the silicon nitride films 1361, 1363 and the Al film 1362, and internal stresses which have developed during film formation.

As shown in FIG. 56, the movable plate 1231 includes a rectangular mirror mount plate 1231b for mounting the mirror 1118, and two beltlike support plates 1231c connected to the end part of the mirror mount plate 1231b. Each of the support plates 1231c has a leg portion 1231a and a leg portion 1231d at its end part. Both the leg portions 1231a and 1231d are fixed to the substrate 1230. Accordingly, the movable plate 1231 is bent upwards by the internal stresses, whereby the side of this mirror mount plate 1231b rises up as shown in FIG. 55B, with the leg portions 1231a, 1231d used as fixed ends. Thus, the mirror 1118 can be inserted into the groove 1246 of the optical waveguide substrate 1240 as shown in FIG. 55B.

On the other hand, the optical waveguide substrate 1240 has the same construction as that of the optical waveguide substrate 240 in FIG. 24.

Besides, as shown in FIG. 56 and FIG. 57A, the movable plate 1231 of the mirror structure substrate 1230 is provided with a convex portion 1364 along the edge of the mirror mount plate 1231b (incidentally, the convex portion 1364 is omitted from illustration in FIG. 46). As shown in FIG. 57B, the convex portion 1364 is formed by convexing the triple-layer film which constructs the movable plate 1231. This convex portion 1364 is also extended on the partial regions of the support plates 1231c of the movable plate 1231. Incidentally, the convex portion 1364 is not extended on the regions of the support plates 1231c near the leg portions 1231a, 1231d. Since a stepped structure is formed at the edge of the movable plate 1231 by providing the convex portion 1364 in this manner, bending based on the internal stresses is suppressed in the region of the movable plate 1231 surrounded with the convex portion 1364 and the regions thereof provided with this convex portion 1364, and the regions can be kept flat. Therefore, the shape of the mirror 1118 mounted on the movable plate 1231 can be held constant, and the sense of the reflection portion 1101 of the mirror 1118 can be kept constant at a high precision.

Besides, since the regions of the support plates 1231c near the leg portions 1231a, 1231d are not provided with the convex portion 1364, they bend on the basis of the internal stresses. Owing to the bending of the regions, the movable plate 1231 raises the side of the mirror mount plate 1231b as shown in FIG. 55B with the leg portions 1231a, 1231d used as the fixed ends. In this manner, only the parts to be kept flat are provided with the convex portion 1364, thereby to make the movable plate 1231 movable by utilizing the bending, and yet, the necessary parts can be made flat.

Besides, as shown in FIG. 57A, parts 1364a, 1364b of the convex portion 1364 extend toward the central part of the mirror mount plate 1231b of the movable plate 1231. Thus, even in a case where the area of the central part of the mirror mount plate 1231 surrounded with the convex portion 1364 is large, the region of the central part can be kept flat. Besides, each part 1364b of the convex portion 1364 serves also as the first stage of the thin-film multilevel structure 1005.

Incidentally, as shown in FIG. 57A, that region of the movable plate 1231 on which the mirror 1118 is mounted is surrounded with the convex portion 1364 so as to be kept flat, as described above. Since, however, each cut 1106a is provided in the shape of letter U, the convex portion 1364 no longer acts on the part of the rectangular stopper 1106 inside the cut 1106a. Thus, the part of the stopper 1106 warps upwards as shown in FIG. 46, owing the internal stresses which remain in the triple-layer film constructing the movable plate 1231, and it functions as the very stopper.

Figure 58:
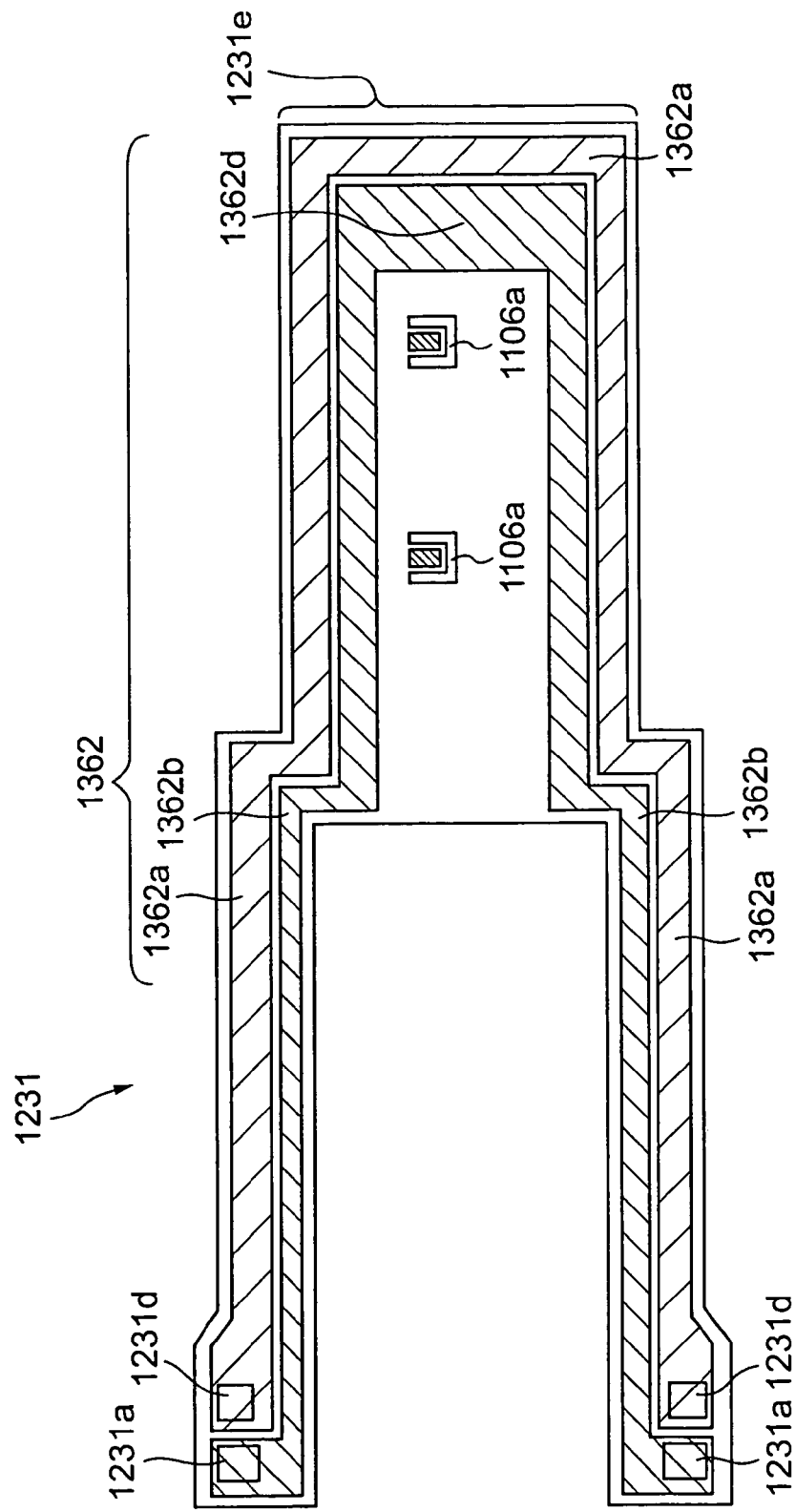
FIG. 58 is an explanatory view showing the pattern shape of an Al film 1364 with the movable plate 1231 seen from above, in the optical device in the twelfth embodiment of the present invention.

Next, the shape of the Al film 1362 of the movable plate 1231 will be described with reference to FIG. 58. In this embodiment, the Al film 1362 is patterned into the shape as shown in FIG. 58, in order to drive the movable plate 1231 by utilizing both a Lorentz force and an electrostatic force. Herein, FIG. 58 shows the shape of the Al film 1362 in the case where the movable plate 1231 is seen from above, and the part of the Al film 1362 is hatched for better understanding.

A pattern 1362a in the Al film 1362 is a pattern which extends along the outer peripheral edge of the movable plate 1231 from one of the two leg portions 1231d and reaches the distal end of the movable plate 1231, and which thereafter extends along the opposite edge of the movable plate 1231 and arrives at the other leg portion 1231d. In driving the movable plate 1231 by the Lorentz force, the pattern 1362a is employed as a wiring line through which a current for generating the Lorentz force flows. This pattern 1362a is connected at the leg portions 1231d with wiring lines laid in the substrate 1230, and it is fed with the current from the substrate 1230 through the leg portions 1231*d*. The current which flows through the straight part of the pattern 1362*a* extending along one latus 1231*e* at the distal end of the movable plate 1231 is used for generating the Lorentz force. Besides, although not shown, magnetic field generation means such as a permanent magnet or an electromagnet is attached to the optical switch in this embodiment. The direction of the magnetic field of the magnetic field generation means is a direction which is orthogonal to the latus 1231*e* at the distal end of the movable plate 1231 and which is parallel to the principal plane of the substrate 1230, and the sense of the magnetic field is set so as to generate the Lorentz force in the sense of bringing the movable plate 1231 near to the substrate 1230 (downward Lorentz force), in relation to the sense of the current which is fed to the pattern 1362*a*.

Besides, a pattern 1362*b* in the Al film 1362 extends from both the two leg portions 1231*a* to the distal end part of the movable plate 1231 along the inner edge of the movable plate 1231, and it is connected to a rectangular pattern 1362*d* arranged at the distal end part. The pattern 1362*b* is connected at the leg portions 1231*a* with wiring lines laid in the substrate 1230, and a voltage is applied between it and an electrode disposed in the substrate 1230. Thus, an electromagnetic force is generated between the patterns 1362*b* and 1362*d* and the electrode disposed in the substrate 1230, and the movable plate 1231 is attracted to the substrate 1230 by the electrostatic force.

In this embodiment, in the case of driving the movable plate 1231, the Lorentz force and the electrostatic force are controlled in the same manner as in FIG. 38.

Since the construction of each thin-film multilevel structure 1005 in FIG. 47 is the same as that of the thin-film multilevel structure 5 in FIGS. 27A, 27B and 27C, it shall be omitted from detailed description.

Figure 45:
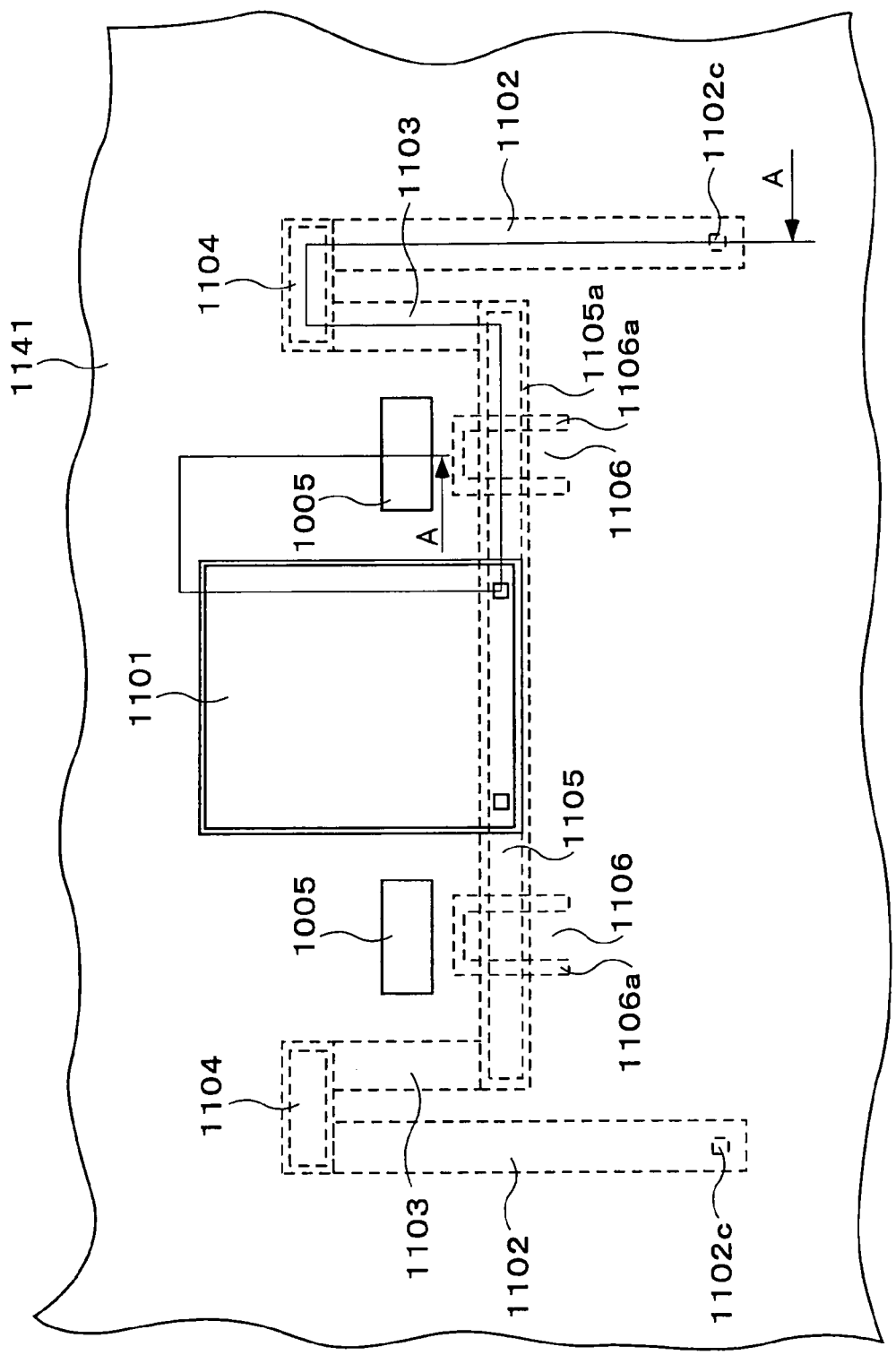
FIG. 45 is a top plan view showing the pattern shapes of various parts before the removal of a sacrificial layer 1141, in the case of manufacturing the mirror 1118 and stoppers 1106 of an optical device in the twelfth embodiment of the present invention.

Next, the manufacturing process of a movable plate 1231 including stoppers 1106, a mirror 1118 and thin-film multilevel structures 1005 will be described with reference to FIGS. 53A–53C and FIGS. 54A–54C. The stoppers 1106, support portions 1102, 1103, joint portions 1104, a reflection-portion support portion 1105, a reflection portion 1101, and the thin-film multilevel structures 1005 are patterned into an arrangement and shapes as shown in FIG. 45. Incidentally, FIGS. 53A–53C and FIGS. 54A–54C show the manufacturing process seen along a section A—A in FIG. 45.

First, as shown in FIG. 53A, a resist layer 12001 to become a sacrificial layer is formed on a substrate 1230 which is formed with wiring lines (not shown) necessary for driving the movable plate 1231, and it is provided with openings (not shown) in parts where leg portions 1231*a*, 1231*d* are to be formed. Besides, a resist island 12002 is formed on that part of the resist layer 12001 at which the convex portion 1364 of the movable plate 1231 is to be provided. A silicon nitride film 1361 is formed on the resultant structure, and holes are formed in those parts of the silicon nitride film which correspond to the bottom parts of the openings of the leg portions 1231*a*, 1231*d*. An Al film 1362 is formed on the resultant structure, and it is patterned into the shapes of patterns 1362*a*–1362*d* in FIG. 58. Further, a silicon nitride film 1363 is formed, and a triple-layer film which consists of the silicon nitride film 1361, Al film 1362 and silicon nitride film 1363 is thereafter patterned into the external shape of the movable plate 1231. At the patterning, the U-shaped cuts 1106*a* of the stoppers 1106 are simultaneously formed as shown in FIG. 53A. Thus, the movable plate 1231 having the stoppers 1106 can be finished up.

Incidentally, the patterning of the Al film 1362 and the silicon nitride films 1361, 1363 is performed by photolithography and etching.

Subsequently, a resist layer 1081 is formed on the whole surface of the resultant structure, and it is photolithographically formed with openings 1081*a* and openings 1081*b* at positions where the leg portions 1102*c* of the support portions 1102 are to be formed, and at positions where the support parts 1051 of the unit structural members 1512 of the thin-film multilevel structures 1005 are to be formed, respectively. Subsequently, resist islands 1201 and resist islands 12201 are respectively formed at positions where the joint portions 1104 and the reflection-portion support portion 1105 are to be formed, and at positions where the unit structural members 1512 of the thin-film multilevel structures 1005 are to be formed (FIG. 53B). When the resist islands 1201 and 12201 are formed in this manner, stepped structures can be formed at the edges of the joint portions 1104, reflection-portion support portion 1105 and unit structural member 1512, and the rigidities of these constituents can be heightened.

Subsequently, an Al film 1103*a* to construct the support portions 1103 is formed, and it is patterned into the shapes of the support portions 1103 in FIG. 45 and the shapes of the unit structural members 1512 by photolithography and etching (FIG. 53C).

Subsequently, a silicon nitride film and an Al film 1102*b* are successively formed (FIG. 54A). The formed Al film 1102*b* is patterned into the shapes of the support portions 1102 in FIG. 45, and the shapes of the unit structural members 1512. Further, the silicon nitride film underlying the Al film 1102*b* is patterned into the shapes of the support portions 1102, joint portions 1104, support portions 1103, reflection-portion support portion 1105 and unit structural members 1512 (FIG. 54B). Thus, the silicon nitride films 1103*b* of the support portions 1103, the joint portions 1104 and the reflection-portion support portion 1105 are formed at one time. Besides, the unit structural members 1512 of triple-layer construction in which the Al film, silicon nitride film and Al film are successively stacked can be formed by the steps in FIG. 53C and FIG. 54A.

A resist layer 1141 is formed on the whole surface of the structure in FIG. 54B, and it is respectively formed with openings at positions where the joint portions 1105*b* of the reflection-portion support portion 1105 are to be formed, and at positions where the support parts of the unit structural members 1513 of the thin-film multilevel structures 1005 are to be formed. A resist layer 1082 is further formed on the resultant structure, and it is removed so as to leave the inside shape part of the rim 1101*a* of the reflection portion 1101 and the shape parts of the unit structural members 1513, thereby to form resist islands. Besides, openings are formed at those position of the resist layer 1082 at which the joint portions 1105*b* of the reflection-portion support portion 1105 are to be formed, and at those positions thereof at which the support parts 1051 of the unit structural members 1513 are to be formed. Thereafter, an Al film 1101 is formed on the whole surface of the resultant structure, and it is patterned into the shape of the reflection portion 1101 and the shapes of the unit structural members 1513 (FIG. 54C). Thus, the reflection portion 1101 and the unit structural members 1513 of third stage can be finished up. This state is as shown in FIG. 45.

Further, after a resist layer (not shown) is formed on the whole surface of the resultant structure, it is formed with openings at positions where the support parts 1051 of unit structural members 1514 of fourth stage are to be formed, and resist islands are formed thereon into the shapes of the unit structural members 1514. A silicon nitride film is formed on the whole surface of the resultant structure, and it is patterned into the shapes of the unit structural members 1514. Thus, the unit structural members 1514 of the fourth stage can be finished up.

Lastly, all of the resist layers 1081, 1141, 1082 being sacrificial layers are removed by ashing. Thus, the support portions 1102 and the support portions 1103 bend up, the reflection portion 1101 rises up substantially vertically as shown in FIG. 47, the reflection-portion support portion 1105 comes into touch with the thin-film multilevel structures 1005, and the reflection portion 1101 is located substantially perpendicularly to the substrate 1230. Also the stoppers 1106 bend as shown in FIG. 46, so as to suppress the movement of the reflection-portion support portion 1105 at positions which oppose to the thin-film multilevel structures 1005 through the reflection-portion support portion 1105.

Besides, the movable plate 1231 rises up from the substrate 1230 with the leg portions 1231*a*, 1231*d* used as support portions (FIG. 55B). Thus, the movable plate 1231 is permitted to move the mirror 1118 up and down through a Lorentz force and an electrostatic force by feeding the patterns 1362*a*, 1362*b*, 1362*d* of the Al film 1362 with a current for the Lorentz force and a voltage for the electrostatic force.

In this manner, the twelfth embodiment is so constructed that the reflection portion 1101 made of the thin film is supported as the mirror 1118 substantially vertically by the support portions 1102, 1103 made of the thin films. Therefore, the reflective surface of the reflection portion 1101 can be formed into a smooth surface, and it can be easily endowed with a high reflection factor. Incidentally, the reflection portion 1101 of the mirror 1118 has the tendency that its surface having confronted the side of the movable plate 1231 at a manufactural stage exhibits a higher mirror finishability, accordingly a higher reflection factor. Consequently, the surface of the reflection portion 1101 having confronted the side of the movable plate 1021 at the manufactural stage should preferably be employed as a light reflection surface. Therefore, the mirror 1118 should desirably be mounted on the movable plate 1231 so as to enter light in a direction indicated in FIG. 47.

Besides, the U-shaped cuts 1106*a* are formed in the movable plate 1231 at the manufactural stage, whereby the bent stoppers 1106 can be formed by utilizing the internal stresses of the triple-layer film which constructs the movable plate 1231. Therefore, even in a case where vibrations have been externally imparted, the sense of the reflection portion 1101 of the mirror 1118 can be kept constant.

Incidentally, although the optical switch has been described in this embodiment, the present invention is not restricted thereto. Besides, the reflection portion 1101 can be replaced with a light shield film of low light reflection factor, a polarization film having a polarizing characteristic, or an optical thin film having an optical wavelength filter characteristic. Thus, an optical element such as a light quantity attenuator, a polarizer or a wavelength selector can be constructed.

By the way, in this embodiment, it is also possible to provide convex portions or stepped structures outside the cuts 1106*a* of the movable plate 1231. When the convex portions or stepped structures are provided in this manner, the parts of the movable plate 1231 around the stoppers 1106 can be made rigid, and hence, the flatness of the parts of the movable plate 1231 around the stoppers 1106 can be heightened.

Thirteenth Embodiment

An optical device in the thirteenth embodiment of the present invention will be described with reference to FIG. 48.

The optical device in the thirteenth embodiment differs from the optical device in the twelfth embodiment in the shape of each stopper 1106 which is provided in a movable plate 1231. The remaining construction is the same as in the twelfth embodiment, and shall therefore be omitted from description.

Figure 48:
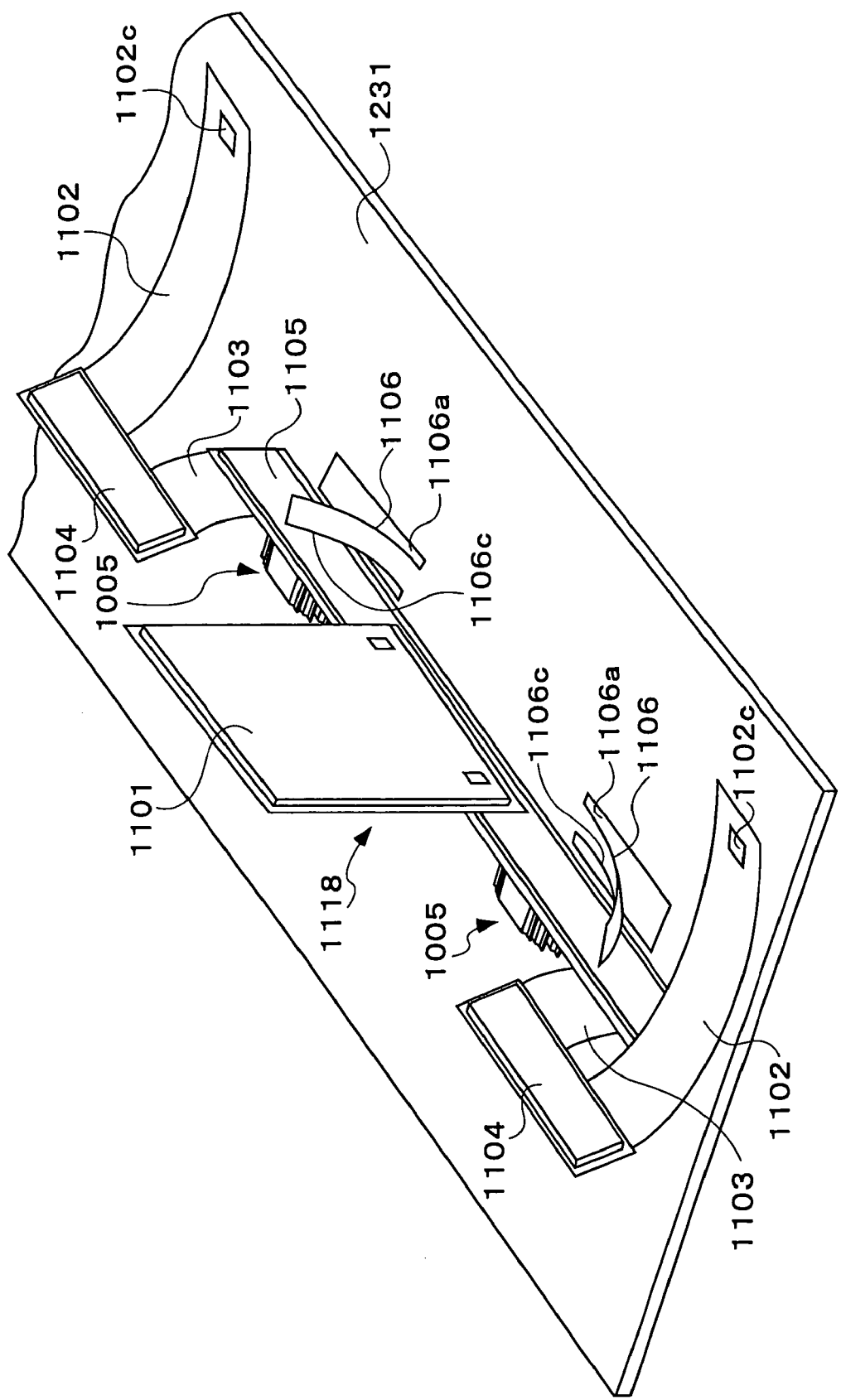
FIG. 48 is a perspective view of the mirror 1118 of an optical device in the thirteenth embodiment of the present invention.

As shown in FIG. 48, each stopper 1106 in the thirteenth embodiment is the same as in the twelfth embodiment in the point that a U-shaped cut 1106*a* is provided in the movable plate 1231, and that a rectangular region inside the cut 1106*a* is bent, but the longitudinal direction of the stopper 1106 differs 90 degrees from that of the stopper 1106 in the second embodiment. The stoppers 1106 in FIG. 48 are such that their longitudinal directions are parallel to a reflection-portion support portion 1105, and that their side surfaces 1106*c* lie in touch with the surface of the reflection-portion support portion 1105, thereby to suppress the positional fluctuation of the reflection-portion support portion 1105. The side surfaces 1106*c* of the stoppers 1106 should preferably touch the reflection-portion support portion 1105 with this portion 1105 held between then and thin-film multilevel structures 1005, but gaps may well exist between the side surfaces 1106 and the reflection-portion support portion 1105 as described in the twelfth embodiment. Even in the existence of the gaps, when the reflection-portion support portion 1105 has moved due to the impartation of external vibrations, the movement can be suppressed in such a way that the side surfaces 1106*c* of the stoppers 1106 come into touch with the reflection-portion support portion 1105.

Fourteenth Embodiment

An optical device in the fourteenth embodiment of the present invention will be described with reference to FIGS. 49A and 49B.

Figure 49:
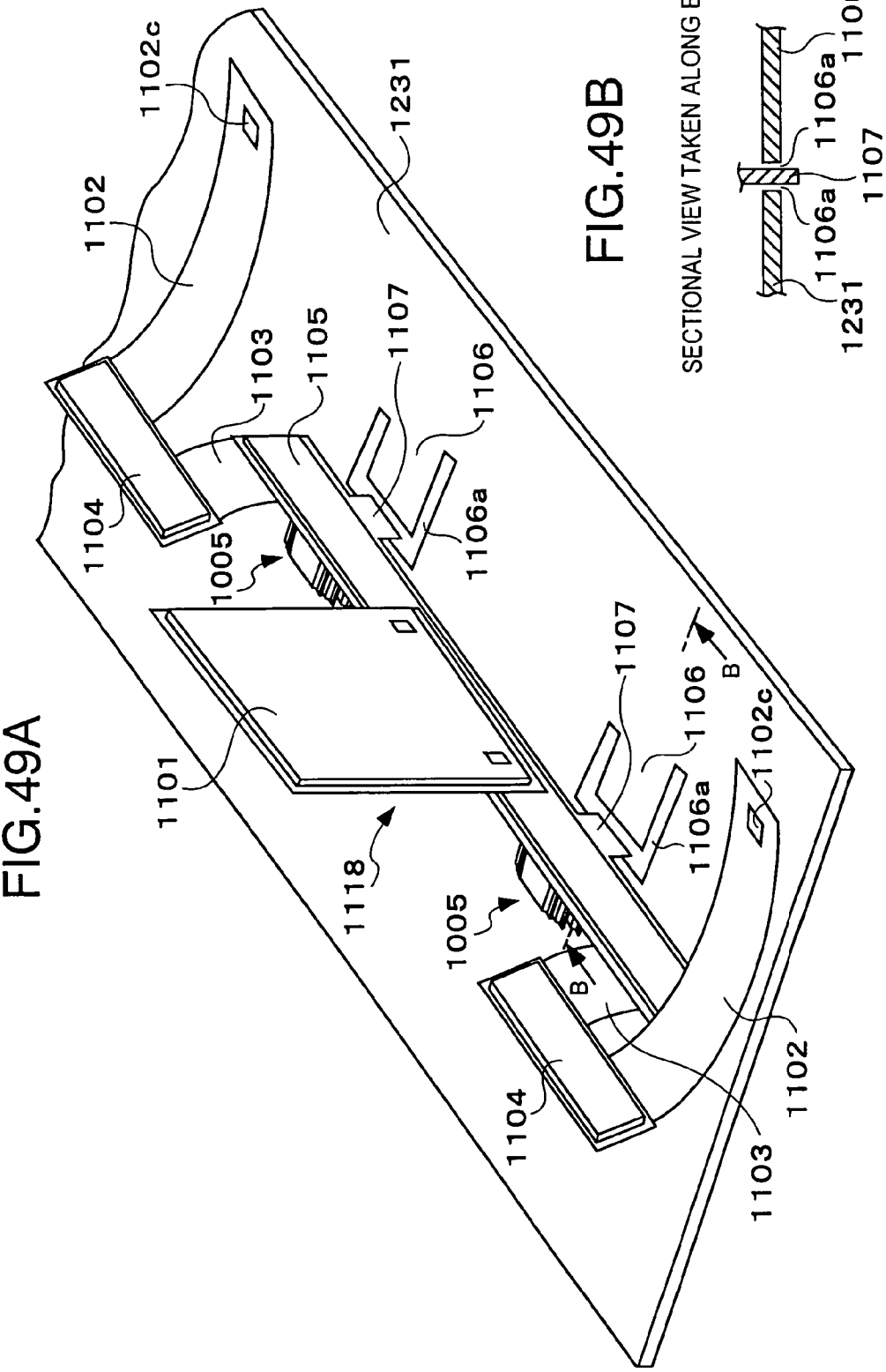

As shown in FIG. 49A, the optical device in the fourteenth embodiment is the same as the optical device in the twelfth embodiment in the point that U-shaped cuts 1106*a* are provided in a movable plate 1231, but the former differs from the latter in the point that stoppers 1106 inside the cuts 1106*a* are made flat without being bent. Besides, protuberant parts 1107 are provided at the lower edge of a reflection-portion support portion 1105, and each of them is inserted into the corresponding cut 1106*a* as shown in FIG. 49B, so as to be snugly fitted. Owing to the snug fit, the movement of the reflection-portion support portion 1105 attributed to external vibrations is suppressed. Each stopper 1106 is flattened for the reason that the clearance between the protuberance 1107 and the stopper 1106 can be made small.

Although the construction of the optical device in the thirteenth embodiment except the stoppers 1106 and the protuberant parts 1107 is the same as in the twelfth embodiment, at least the part of each stopper 1106 is made of a single-layer film by omitting the Al film of a triple-layer film which constructs the movable plate 1231, in order to flatten the stopper 1106.

In the construction of this embodiment, however, each stopper 1106 is not restricted to the flat one, but it can also be bent as in the twelfth embodiment. In the case of bending the stopper 1106, the clearance between this stopper and the protuberant part 1107 becomes larger than in the case of flattening the stopper 1106, and hence, the positional fluctuation of the reflection-portion support portion 1105 attributed to the impartation of external vibrations becomes somewhat larger, but the effect of suppressing the positional fluctuation is attained.

Incidentally, the construction in FIG. 49A is manufactured in such a way that, in patterning the movable plate 1231 in the manufacturing process described in the twelfth embodiment, the cuts 1106a are formed. Besides, in patterning the external shape of the reflection-portion support portion 1105, the protuberant parts 1107 are also patterned. Thus, when the sacrificial layers are removed at the last step, the protuberant parts 1107 are inserted into the corresponding cuts 1106a so as to be snugly fitted, by the action in which support portions 1102, 1103 bend to raise the reflection-portion support portion 1105.

Fifteenth Embodiment

An optical device in the fifteenth embodiment of the present invention will be described with reference to FIGS. 50A and 50B and FIG. 59.

The optical device in the fifteenth embodiment is so constructed that a hook-shaped part 1110 is provided at the distal end of the uppermost-stage unit structural member 1514 of each thin-film multilevel structure 1005, and that the hook-shaped part 1110 is inserted into a corresponding opening provided in a reflection-portion support portion 1105, so as to be snugly fitted. The remaining construction is the same as in the twelfth embodiment.

Figure 59:
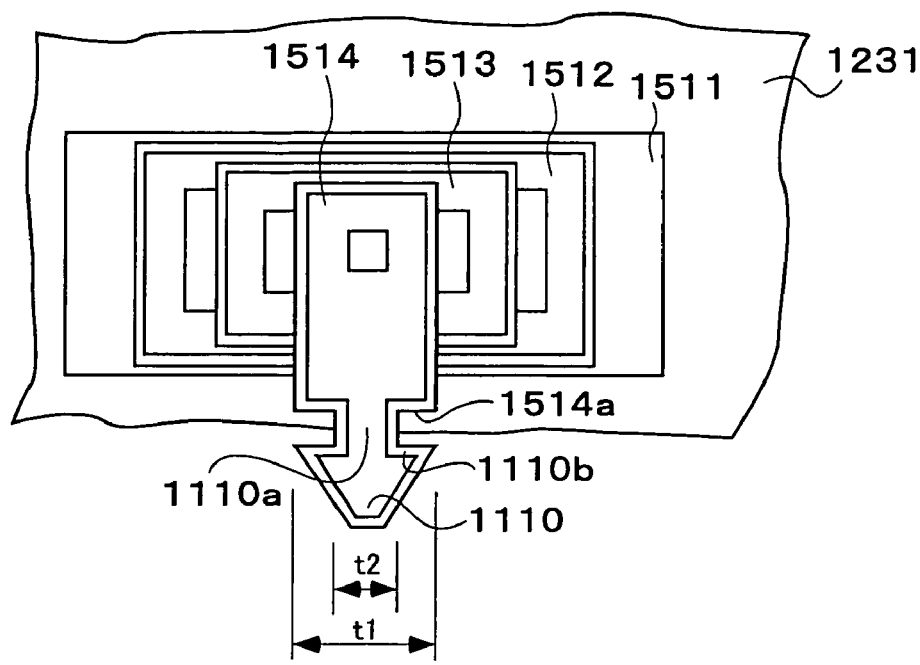
FIG. 59 is a top plan view of each thin-film multilevel structure 1005 which is mounted on a movable plate 1231, in the optical device in the fifteenth embodiment of the present invention.

As shown in FIG. 59, the hook-shaped part 1110 in a shape in which the front vertex of a triangle is removed is provided at the distal end of the uppermost-stage unit structural member 1514 of each thin-film multilevel structure 1005. The hook-shaped part 1110 and the body of the unit structural member 1514 are joined by a neck part 1110a. The hook-shaped part 1110 and the neck part 1110a are formed unitarily with the body of the unit structural member 1514 at the step of forming the unit structural member 1514 of the uppermost stage, in such a way that, in forming the island of a sacrificial layer, and in patterning a thin film which forms the unit structural member 1514, they are respectively formed and patterned into a shape which includes the hook-shaped part 1110 and the neck part 1110a shown in FIG. 59. The height (thickness) of the hook-shaped part 1110 as well as the neck part 1110a is the same as that of the body of the unit structural member 1514.

Each of openings 1109 which are provided in the reflection-portion support portion 1105 is formed having a width w1 which is larger than the width t1 of the hook-shaped part 1110 of the unit structural member 1514. The height of the opening 1109 is made larger than that of the hook-shaped part 1110. Besides, two rectangular spring parts 1111 are provided so as to suspend from the upper end of each opening 1109. The spacing w2 between the two spring parts 1111 is smaller than the width t1 of the hook-shaped part 1110 of the unit structural member 1514, and is larger than the width t2 of the neck part 1110a. The opening 1109 and the spring parts 1111 can be formed at the step of FIG. 54B described before, in such a way that, in patterning the film which constructs the reflection-portion support portion 1105, the constituents 1109 and 1111 are simultaneously patterned.

In this manner, the hook-shaped parts 1110 are provided at the distal ends of the thin-film multilevel structures 1005, and the openings 1109 are formed in the reflection-portion support portion 1105. Thus, when the sacrificial layers are removed at the last step of the manufacturing process, the hook-shaped parts 1110 of the thin-film multilevel structures 1005 are inserted into the corresponding openings 1109 of the reflection-portion support portion 1105, by the action in which the reflection-portion support portion 1105 rises up owing to the bending of support portions 1102, 1103. In the case where each hook-shaped part 1110 is inserted into the corresponding opening 1109, the spring parts 1111 of the opening 1109 are pushed upwards by the hook-shaped part 1110. When the hook-shaped part 1110 has passed the spring parts 1111, these spring parts 1111 come into engagement with both the sides of the neck part 111a. In an ordinary state, accordingly, the spring parts 1111 lie in touch with the respective shoulder parts 1514a of the unit structural member 1514, thereby to suppress the positional fluctuation of the reflection-portion support portion 1105 attributed to a temperature change. Besides, in a case where vibrations have been externally imparted to move the reflection-portion support portion 1105 onto the side of the leg portions 1102c of the support portions 1102, the spring parts 1111 come into touch with the return parts 1110b of the hook-shaped parts 1110, thereby to suppress the positional fluctuation of the reflection-portion support portion 1105.

Figure 50:
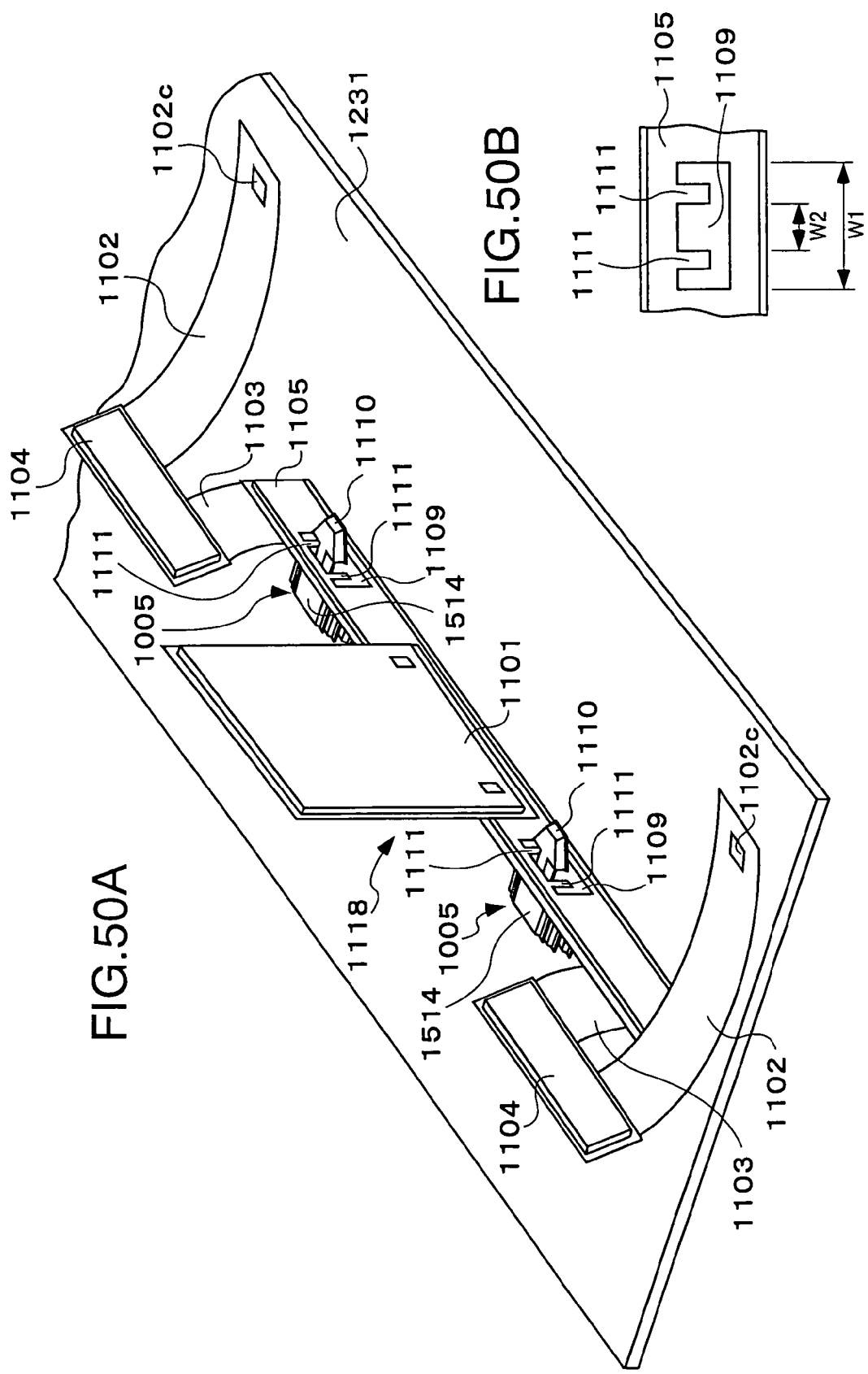
Figure 60:
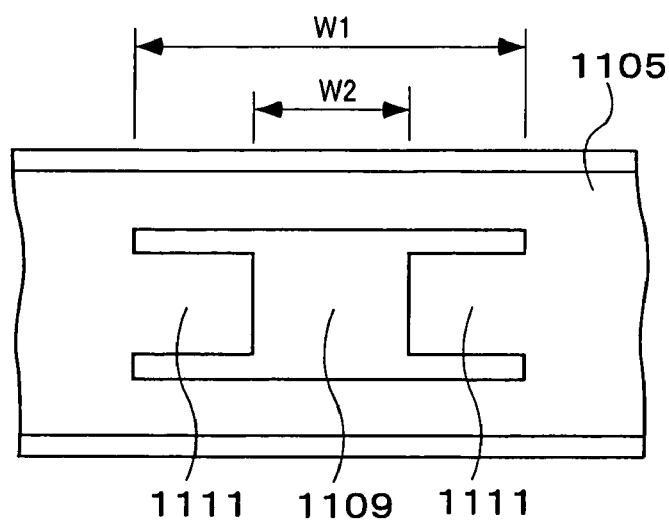
FIG. 60 is a front view showing an example of another shape of each opening 1109 which is provided in the reflection-portion support portion 1105 of the mirror 1118, in the optical device in the fifteenth embodiment of the present invention.

By the way, in the aspect shown in FIG. 50B, the spring parts 1111 in each opening 1109 are arranged in the sense in which they are suspended from the upper part of the opening 1109, but spring parts 1111 can also be arranged in a sense in which they are extended from both the sides of the opening 1109 toward the center thereof, as shown in FIG. 60. As compared with the construction in FIG. 59, the construction in FIG. 60 has the advantage that the mechanical strength of the reflection-portion support portion 1105 is difficult to lower.

Besides, in the construction of this embodiment, the openings 1109 are provided in the reflection-portion support portion 1105, and parts of this reflection-portion support portion 1105 are used as the spring parts 1111. Therefore, the reflection-portion support portion 1105 can also be constructed of a multilayer film of high strength, not the single-layer film, in order to endow the reflection-portion support portion 1105 with rigidity and to heighten the strength of the spring parts 1111.

Sixteenth Embodiment

Figure 51:
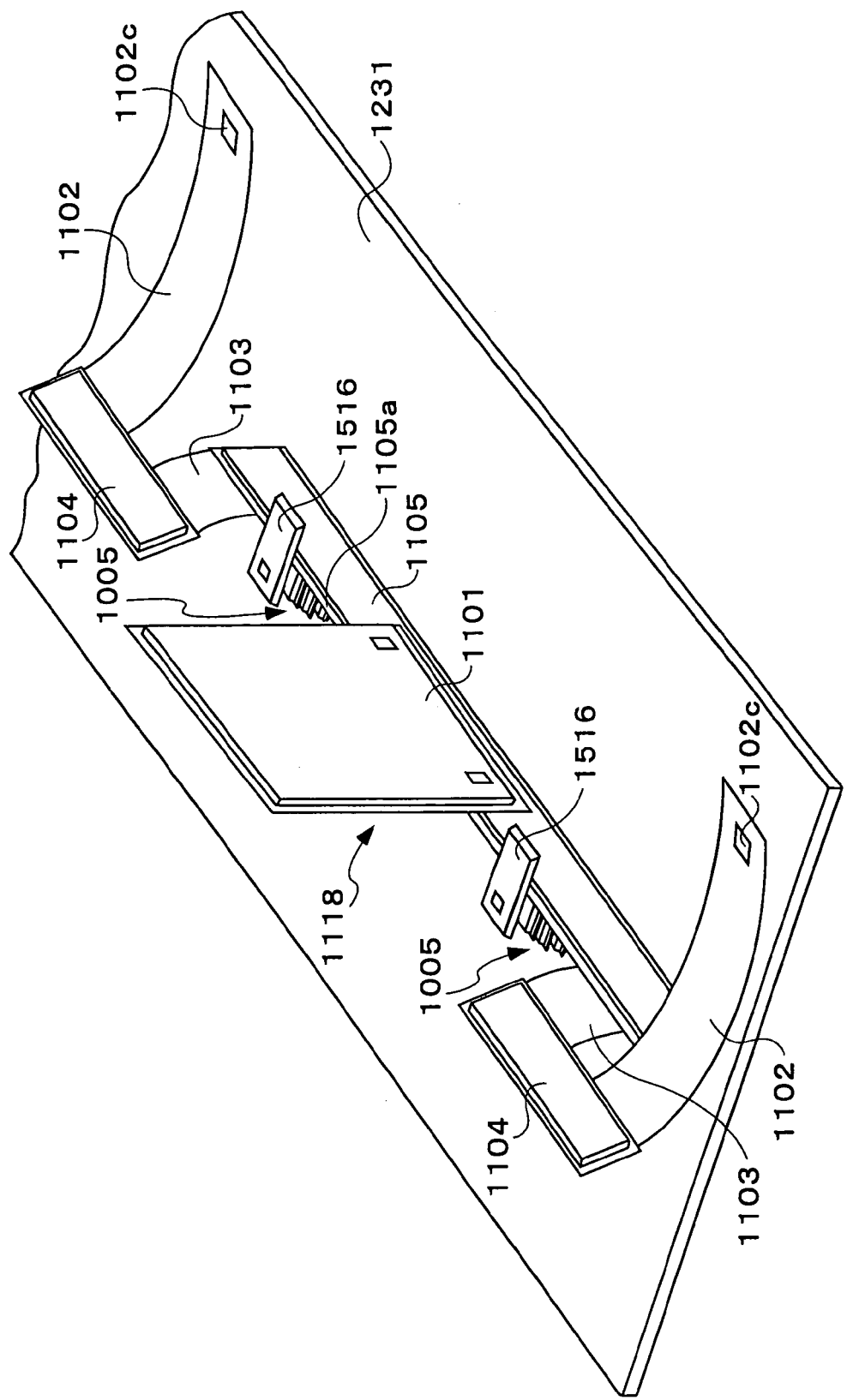
FIG. 51 is a perspective view of the mirror 1118 of an optical device in the sixteenth embodiment of the present invention.

An optical device in the sixteenth embodiment of the present invention will be described with reference to FIG. 51 and FIG. 61.

Figure 61:
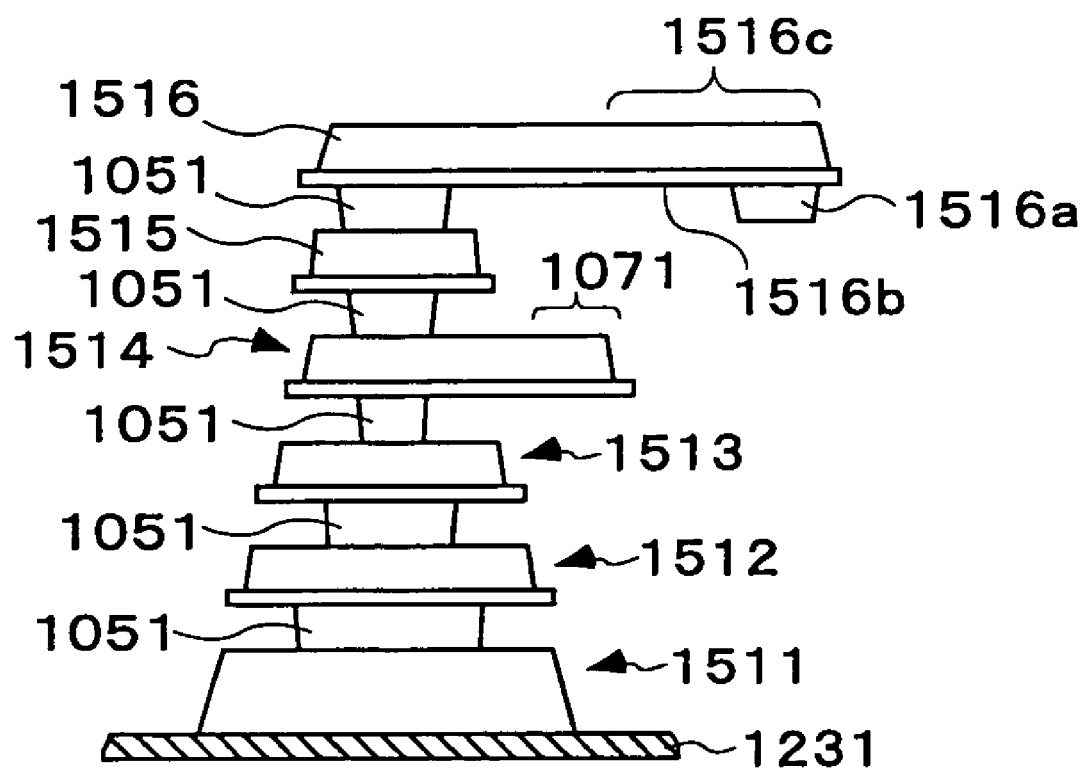
FIG. 61 is a side view of each thin-film multilevel structure 1005 which is mounted on a movable plate 1231, in the optical device in the sixteenth embodiment of the present invention.

As shown in FIG. 61, the optical device in the sixteenth embodiment is such that unit structural members 1515, 1516 are further added on the unit structural member 1514 of each thin-film multilevel structure 1005. The unit structural member 1516 of the uppermost stage is formed so as to greatly extend onto the side of a reflection-portion support portion 1105. As shown in FIG. 51, the lower end 1516b of the extension part 1516c of the unit structural member 1516 lies at a position higher than the upper end 1105a of the reflection-portion support portion 1105. Thus, the extension part 1516c of the unit structural member 1516 is arranged so as to hang over the reflection-portion support portion 1105. Besides, a downward protuberant part 1516a is provided at the distal end of the extension part 1516c. The protuberant part 1516a has the same construction as that of the support part 1051 of the unit structural member 1516, and it is formed simultaneously with the step of forming this support part 1051. The protuberant part 1511*a* is formed so that its distal end may come below the upper end 1105*a* of the reflection-portion support portion 1105. The remaining construction is the same as in the twelfth embodiment.

In this manner, the unit structural members 1515, 1516 are arranged at the upper parts of the respective thin-film multilevel structures 1005, whereby when sacrificial layers are removed at the last step of a manufacturing process, the upper end of the reflection-portion support portion 1105 is interposed between the protuberant part 1071 of the unit structural member 1514 in FIG. 61 and the protuberant part 1516*a* of the unit structural member 1516, by the action in which the reflection-portion support portion 1105 rises up owing to the bending of support portions 1102, 1103. Besides, the surface of the reflection-portion support portion 1105 on the side of the unit structural member 1514 comes into touch with the distal end of the protuberant part 1071 of the unit structural member 1514, thereby to be located and supported.

In an ordinary state, accordingly, the distal ends of the protuberant parts 1071 of the unit structural members 1514 lie in touch with the reflection-portion support portion 1105, thereby to suppress the positional fluctuation of this portion 1105 attributed to a temperature change. Besides, in a case where vibrations have been externally imparted to move the reflection-portion support portion 1105 onto the side of the leg portions 1102*c* of the support portions 1102, the downward protuberant parts 1516*a* of the unit structural members 1516 hanging over the reflection-portion support portion 1105 come into touch with the surface of this reflection-portion support portion 1105 on the side of the leg portions 1102*c*, thereby to suppress the positional fluctuation of the reflection-portion support portion 1105.

Besides, in a case where large external vibrations have been imparted to move the reflection-portion support portion 1105 upwards, this reflection-portion support portion 1105 comes into touch with the lower ends 1516*b* of the unit structural members 1516, whereby the upward movement of this reflection-portion support portion 1105 is suppressed.

Seventeenth Embodiment

An optical device in the seventeenth embodiment of the present invention will be described with reference to FIG. 52.

The seventeenth embodiment resembles the thirteenth embodiment in the point that protuberant parts 1107 are provided at the lower end of a reflection-portion support portion 1105, and that they are inserted into a movable plate 1231. In the seventeenth embodiment, however, the distal end of each protuberant part 1107 is formed into a T-shaped hook part 1107*a*. Besides, openings 1113 are provided in the movable plate 1231. Herein, the opening 1113*a* of each opening 1113 on the side of the leg portion 1102*c* of each support portion 1102 has a width which is larger than that of the hook part 1107*a*, and the opening 1113*b* thereof on the side of the reflection-portion support portion 1105 has a width which is smaller than that of the hook part 1107*a*.

Thus, when the reflection-portion support portion 1105 rises up owing to the bending of support portions 1102, 1103 by removing sacrificial layers at the last step of a manufacturing process, the hook parts 1107*a* of the protuberant parts 1107 are first inserted into the wider openings 1113*a* by the movement of this reflection-portion support portion 1105, respectively. As the reflection-portion support portion 1105 rises up more, the hook parts 1107*a* are moved onto the side of the narrower openings 1113*b*, respectively. In this way, the protuberant parts 1107*a* come into engagement with the corresponding openings 1113*b*.

Unlike any of the foregoing embodiments, the construction of the seventeenth embodiment cannot suppress the movement of the reflection-portion support portion 1105 onto the side of the leg portions 1102*c* of the support portions 1102 when the external vibrations have been imparted. The seventeenth embodiment, however, can suppress the upward movement of the reflection-portion support portion 1105.

As described in each of the twelfth–seventeenth embodiments, according to the present invention, the positional fluctuation of the reflection-portion support portion 1105 attributed to the impartation of the external vibrations can be suppressed, and hence, the optical device furnished with the stable mirror 1118 can be provided.

Incidentally, the construction for suppressing the positional fluctuation of the reflection-portion support portion 1105 is not restricted to the stoppers 1106, protuberant parts 1107, thin-film multilevel structures 1005, etc. described before, but any other construction having the same function can be adopted.

Besides, in each of the twelfth–seventeenth embodiments described above, the suppression means, such as the stoppers 1106, protuberant parts 1107 or thin-film multilevel structures 1005, for suppressing the positional fluctuation of the reflection-portion support portion 1105 are disposed in the number of two for the single mirror 1118, but it is also possible to dispose single suppression means or three or more suppression means.

Besides, the construction of the optical device is not restricted to the constructions described before, but any of the stoppers 1106, etc. in the twelfth–seventeenth embodiments can also be employed as the stoppers for suppressing the positional fluctuation, in an optical device of another construction in which the mirror 1118 is mounted. The construction of each of the twelfth–seventeenth embodiments for suppressing the positional fluctuation can be applied to, for example, an optical device in which the mirror 1118 is mounted on a movable plate 1231 supported on both its sides.

As thus far described, according to the present invention, it is possible to provide an optical element which includes a light reflection portion capable of reflecting a light beam in a desired direction.

What is claimed is:

1. An optical element comprising a plate, a light reflection portion, and a support portion which supports said light reflection portion over said plate;

each of said light reflection portion and said support portion being constructed of at least one film; and said support portion having one end part fixed to said plate and having an other end part joined with the film which constructs said light reflection portion, and bending from said one end part toward said other end part, thereby to support a principal plane of said film constructing said light reflection portion, non-parallelly to a principal plane of said plate, wherein said support portion supports the principal plane of said film constructing said light reflection portion, perpendicularly to the principal plane of said plate.

2. An optical element comprising a plate, a light reflection portion, and a support portion which supports said light reflection portion over said plate;

each of said light reflection portion and said support portion being constructed of at least one film; and said support portion having one end part fixed to said plate and having an other end part joined with the film which constructs said light reflection portion, and bending from said one end part toward said other end part, thereby to support a principal plane of said film constructing said light reflection portion, non-parallelly to a principal plane of said plate, wherein said support portion is constructed of a multilayer film in which at least two films having different coefficients of thermal expansion are stacked.

3. An optical element as defined in claim 2, further comprising a holding portion which keeps constant an angle between the principal plane of said film constructing said light reflection portion and the principal plane of said plate.

4. An optical element as defined in claim 3, wherein:
said holding portion is an angle holding portion which is interposed between said light reflection portion and said plate; and
said angle holding portion includes a film which has one end part fixed to said plate, and which bends from said one end part toward the other end part.

5. An optical element as defined in claim 4, wherein said angle holding portion lies in touch with either said light reflection portion or said support portion, and it includes positional shift prevention means for preventing a relative positional shift between said angle holding portion and said light reflection portion or said support portion, at the touch part of said light reflection portion or said support portion.

6. An optical element as defined in claim 5, wherein said positional shift prevention means is a groovy structure which is formed in said light reflection portion or said support portion.

7. An optical element as defined in claim 4, wherein a film surface of said film of said angle holding portion is perpendicular to said principal plane of said light reflection portion, and a side surface of said film of said angle holding portion lies in touch with said light reflection portion.

8. An optical element as defined in claim 4, wherein:
a sense of the bending of said film of said angle holding portion is reverse to a sense of the bending of said film constructing said support portion; and
a second light reflection portion is joined to said other end part of said film of said angle holding portion, and it is placed on said light reflection portion.

9. An optical element as defined in claim 3, wherein said holding portion is a thin-film multilevel structure which lies in touch with either said light reflection portion or said support portion, said thin-film multilevel structure has a plurality of unit structural members which are successively stacked on said plate, said each unit structural member includes a support part and a flat part supported by said support part, said support part and said flat part are unitarily constructed of a continuous thin film, and the stacked unit structural members have the thin films secured to each other at parts where they touch each other.

10. An optical element as defined in claim 9, wherein said thin-film multilevel structure lies in touch with either said light reflection portion or said support portion, and it includes positional shift prevention means for preventing a relative positional shift between said thin-film multilevel structure and said light reflection portion or said support portion, at the touch part of said light reflection portion or said support portion.

11. An optical element as defined in claim 10, wherein said positional shift prevention means is a groovy structure which is formed in said light reflection portion or said support portion.

12. An optical element as defined in claim 2, wherein said light reflection portion is suspended from said other end of the bent film of said support portion toward said plate.

13. An optical element comprising a plate, a light reflection portion, and a support portion which supports said light reflection portion over said plate;
each of said light reflection portion and said support portion being constructed of at least one film;
said support portion including at least two coupled members, a first member of which has one end part fixed to said plate and has the other end part joined through the other member with the film constructing said light reflection portion, and bends from said one end part toward said other end part, thereby to support a principal plane of said film constructing said light reflection portion, non-parallelly to a principal plane of said plate.

14. An optical element as defined in claim 13, wherein said support portion includes the second member which serves to couple said first member and said film constructing said light reflection portion, said second member is a bent film, and a sense of the bending of said second member is reverse to a sense of the bending of said first member.

15. An optical element comprising a plate, a light reflection portion, and a support portion which supports said light reflection portion over said plate;
each of said light reflection portion and said support portion being constructed of at least one film; and
said support portion having one end part fixed to said plate and having an other end part joined with the film which constructs said light reflection portion, and bending from said one end part toward said other end part, thereby to support a principal plane of said film constructing said light reflection portion, non-parallelly to a principal plane of said plate,
wherein said film constructing said light reflection portion is formed with a stepped structure at its peripheral edge part.

16. An optical element comprising a plate, a light reflection portion, a temperature regulation portion for regulating a temperature of said support portion, and a support portion which supports said light reflection portion over said plate;
each of said light reflection portion and said support portion being constructed of at least one film; and
said support portion having one end part fixed to said plate and having an other end part joined with the film which constructs said light reflection portion, and bending from said one end part toward said other end part, thereby to support a principal plane of said film constructing said light reflection portion, non-parallelly to a principal plane of said plate.

17. An optical switch comprising a mirror portion, and a movable portion on which said mirror portion is mounted;
said mirror portion including a light reflection portion, and a support portion which supports said light reflection portion over said movable portion;
each of said light reflection portion and said support portion being constructed of at least one film;
said support portion having one end part fixed to said movable portion and having the other end part joined with the film which constructs said light reflection portion, and bending from said one end part toward said other end part, thereby to support a principal plane of said film constructing said light reflection portion, non-parallelly to a principal plane of said movable portion.

18. An optical switch comprising a mirror portion, and a movable portion on which said mirror portion is mounted;
said mirror portion including a light reflection portion, and a support portion which supports said light reflection portion over said movable portion;

said light reflection portion being constructed of a film;
said support portion including at least two coupled members, a first member of which has one end part fixed to said movable portion and has the other end part joined through the other member with said film constructing said light reflection portion, and bends from said one end part toward said other end part, thereby to support a principal plane of said film constructing said light reflection portion, non-parallelly to a principal plane of said movable portion.

19. An optical switch comprising a mirror portion which includes a light reflection member, a movable portion on which said mirror portion is mounted, and a holding portion which lies in touch with part of a member constituting said mirror portion, in order to keep an angle of said light reflection member;
said holding portion being a thin-film multilevel structure;
said thin-film multilevel structure having a plurality of unit structural members which are successively stacked on said movable portion;
said each unit structural member including a support part and a flat part supported by said support part, said support part and said flat part being unitarily constructed of a continuous thin film;
the stacked unit structural members having the thin films secured to each other at parts where they touch each other.

20. An optical switch as defined in claim 19, wherein said thin-film multilevel structure lies in touch with either said light reflection portion or said support portion, and it includes positional shift prevention means for preventing a relative shift between said thin-film multilevel structure and said light reflection portion or said support portion, at the touch part of said light reflection portion or said support portion.

21. An optical switch as defined in claim 20, wherein said positional shift prevention means is a groovy structure which is formed in said light reflection portion or said support portion.

22. An optical switch as defined in claim 19, wherein:
said mirror portion includes a support portion in order to support said light reflection member over said movable portion; and
said support portion includes at least two coupled members, a first member of which has one end part fixed to said movable portion and has the other end part joined with said light reflection member through the other member, and bends from said one end part toward said other end part, thereby to support said light reflection member non-parallelly to a principal plane of said movable portion.

23. An optical switch as defined in claim 19, wherein said thin film constructing said each unit structural member is formed with a stepped structure at its peripheral edge.

24. An optical switch as defined in claim 19, wherein said support part of the unit structural member located at an upper stage is mounted on said flat part of the unit structural member at an immediately lower stage.

25. An optical switch as defined in claim 24, wherein in the stacked unit structural members, said unit structural member located at the upper stage is smaller in the number of the support parts.

26. An optical switch as defined in claim 19, wherein in said plurality of unit structural members, the unit structural member of lowermost stage is constructed unitarily with said movable portion.

27. An optical switch as defined in claim 19, wherein at least one of said plurality of unit structural members is constructed by patterning the same thin film as a thin film which forms said member constituting said mirror portion.

28. An optical switch as defined in claim 19, wherein said thin film constructing said each unit structural member is a triple-layer film, in which a film of uppermost layer and a film of lowermost layer are of the same material.

29. An optical switch comprising a mirror portion which includes a light reflection member, a movable portion on which said mirror portion is mounted, and a holding portion which lies in touch with part of a member constituting said mirror portion, in order to keep an angle of said light reflection member;
said holding portion being a thin-film multilevel structure;
said thin-film multilevel structure having a plurality of unit structural members which are successively stacked on said movable portion;
said each unit structural member including a support part which has a hollow opening, a flat part which covers said opening, and a filling material with which said hollow opening of said support portion is filled up, each of said support part and said flat part being formed of a thin film;
the stacked unit structural members being such that said support part of the unit structural member located at an upper stage is mounted on said flat part of the unit structural member at an immediately lower stage.

30. An optical switch as defined in claim 29, wherein said thin-film multilevel structure lies in touch with either said light reflection portion or said support portion, and it includes positional shift prevention means for preventing a relative shift between said thin-film multilevel structure and said light reflection portion or said support portion, at the touch part of said light reflection portion or said support portion.

31. An optical switch as defined in claim 30, wherein said positional shift prevention means is a groovy structure which is formed in said light reflection portion or said support portion.

32. An optical switch as defined in claim 29, wherein said thin film which constructs said support part of the unit structural member located at an upper stage, and said thin film which constructs said flat part of the unit structural member at a lower stage for mounting said support part are secured to each other.

33. An optical switch comprising a substrate, a movable portion one end part of which is fixed to said substrate, and a mirror portion which is mounted on a side of the other end part of said movable portion;
said movable portion being constructed of at least two films, and being bent by internal stresses of said at least two films, thereby to raise the other end part bearing said mirror portion, over said substrate;
said mirror portion including a light reflection member which is mounted on said movable portion so that a light reflection surface may be directed perpendicularly to a principal plane of said substrate;
said light reflection member being inclinedly mounted on said movable portion so that its upper end edge may become parallel to said substrate in a state where said movable portion has raised said mirror portion.

34. An optical device comprising an optical element, a movable portion on which said optical element is mounted, and a plate which holds said movable portion;
said movable portion being made of at least one film, having one end part fixed to said plate and having said optical element mounted on a side of the other end part, at least a part near the fixed end part being formed of a stacked structure in which at least two films are stacked, said stacked structure being bent by an internal stress, thereby to support said other end part at a position remote from said plate;

said movable portion being formed with a stepped structure along a peripheral edge of its part bearing said optical element.

35. An optical device as defined in claim 34, wherein in order to form said stepped structure, said movable portion is formed with a convex portion along the peripheral edge of its part bearing said optical element.

36. An optical device as defined in claim 34, wherein:

said optical element includes an optical film which has a desired optical characteristic, and a support portion which supports said optical film over said movable portion;

said support portion being constructed of at least one film;

said support portion having one end part fixed to said plate and having the other end part joined with a film constructing said optical film, directly or through another member, and bending from said one end part toward said other end part, thereby to support a principal plane of said film constructing said optical film, non-parallelly to a principal plane of said plate.

37. An optical device comprising an optical element, a movable portion on which said optical element is mounted, and a plate which holds said movable portion;

said movable portion being, at least partially, a stacked structure made of at least two films, having one end part fixed to said plate and having said optical element mounted on a side of the other end part, said stacked structure being bent by an internal stress, thereby to support said other end part at a position remote from said plate;

said stacked structure including a metal film, said metal film being patterned into a predetermined pattern, said pattern including an electrode pattern for an electrostatic force as acts as an electrode for driving said movable portion by the electrostatic force.

38. An optical device as defined in claim 37, wherein said pattern of said metal film further includes a current path pattern for a Lorentz force as acts as a current path for driving said movable portion by the Lorentz force.

39. An optical device as defined in claim 38, wherein said electrode pattern for said electrostatic force and said current path pattern for said Lorentz force are respectively connected to voltage applying wiring lines and current feeding wiring lines of said plate through said one end part fixed to said plate.

40. An optical device comprising a plate, an optical element which is mounted on said plate, and a suppression portion which serves to suppress a positional fluctuation of said optical element;

said optical element including an optical film which has a desired optical characteristic, and a support portion which supports said optical film, said support portion including a bent film member, said film member having one end part fixed to said plate and having the other end part raised by said bent film member, thereby to support a principal plane of said optical film non-parallelly to a principal plane of said plate;

said suppression portion suppressing a positional fluctuation of said optical film in a normal direction of said optical film or in an upward direction, wherein said support portion includes not only said bent film member, but also a second bent film member, a joint portion, and an optical-film support portion on which said optical film is mounted;

said joint portion being joined to said other end part of the first-mentioned film member, said second film member having one end part joined to said joint portion and having said optical-film support portion joined to the other end part hanging down from said joint portion; and said suppression portion suppressing a positional fluctuation of said optical-film support portion in order to suppress the positional fluctuation of said optical film.

41. An optical device as defined in claim 40, wherein said suppression portion is a member which is formed by cutting and bending part of said plate.

42. An optical device as defined in claim 40, wherein said suppression portion is a multistage multilevel structure which is formed by stacking multilevel structures constructed of thin films, a plurality of stages.

43. An optical device as defined in claim 42, wherein said multistage multilevel structure has a hook-shaped part, and said hook-shaped part is inserted into an opening provided in said optical-film support portion.

44. An optical device as defined in claim 42, wherein said multistage multilevel structure has an extension part which hangs over said optical-film support portion.

45. An optical device as defined in claim 40, wherein said suppression portion includes a protuberant part which is provided from said optical-film support portion toward said plate, and an opening which is provided in said plate, and said protuberant part is snugly fitted in said opening.

46. An optical device comprising a plate, an optical element which is mounted on said plate, and a suppression portion which serves to suppress a positional fluctuation of said optical element;

said optical element including an optical film which has a desired optical characteristic, and a support portion which supports said optical film, said support portion including a bent film member, said film member having one end part fixed to said plate and having the other end part raised by said bent film member, thereby to support a principal plane of said optical film non-parallelly to a principal plane of said plate; and said suppression portion suppressing a positional fluctuation of said optical film in a normal direction of said optical film or in an upward direction, wherein said plate is a movable plate for moving said optical element, and it is constructed of at least one film.

* * * * *